(12) United States Patent
Forutanpour et al.

(10) Patent No.: US 10,621,767 B2
(45) Date of Patent: Apr. 14, 2020

(54) FISHEYE IMAGE STITCHING FOR MOVABLE CAMERAS

(71) Applicant: QUALCOMM Incorporated, San Diego, CA (US)

(72) Inventors: Bijan Forutanpour, San Diego, CA (US); Phi Hung Le Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 15/868,463

(22) Filed: Jan. 11, 2018

(65) Prior Publication Data

US 2018/0357804 A1 Dec. 13, 2018

Related U.S. Application Data

(60) Provisional application No. 62/518,428, filed on Jun. 12, 2017.

(51) Int. Cl.
| | |
|---|---|
| *G06T 11/60* | (2006.01) |
| *G06T 7/40* | (2017.01) |
| *H04N 5/247* | (2006.01) |
| *H04N 5/232* | (2006.01) |
| *H04N 5/262* | (2006.01) |
| *G06T 3/00* | (2006.01) |
| *H04N 17/00* | (2006.01) |

(52) U.S. Cl.
CPC ............ *G06T 11/60* (2013.01); *G06T 3/0037* (2013.01); *G06T 7/40* (2013.01); *H04N 5/23238* (2013.01); *H04N 5/23293* (2013.01); *H04N 5/247* (2013.01); *H04N 5/2628* (2013.01); *H04N 17/002* (2013.01)

(58) Field of Classification Search
CPC ....... G06T 11/60; G06T 7/40; H04N 5/23238; H04N 5/23293; H04N 5/247
See application file for complete search history.

(56) References Cited

U.S. PATENT DOCUMENTS

| | | | | |
|---|---|---|---|---|
| 2010/0017123 A1* | 1/2010 | Dropps | ................... | G01C 21/00 701/455 |
| 2015/0172544 A1* | 6/2015 | Deng | ..................... | G06T 9/001 348/36 |
| 2018/0018807 A1* | 1/2018 | Lu | ........................... | G06T 15/04 |
| 2018/0227484 A1* | 8/2018 | Hung | ................. | H04N 5/23238 |

\* cited by examiner

*Primary Examiner* — Michael E Teitelbaum

(74) *Attorney, Agent, or Firm* — Shumaker & Sieffert, P.A.

(57) ABSTRACT

Examples are described for mapping primitives in circular images, generated from texture coordinate that compensate for rotation of cameras, onto respective mesh models to generate images representative of a 360-degree video or image. Portions of the rectangular images are blended to generate a stitched rectangular image, and image content for display is generated based on the stitched rectangular image.

30 Claims, 35 Drawing Sheets

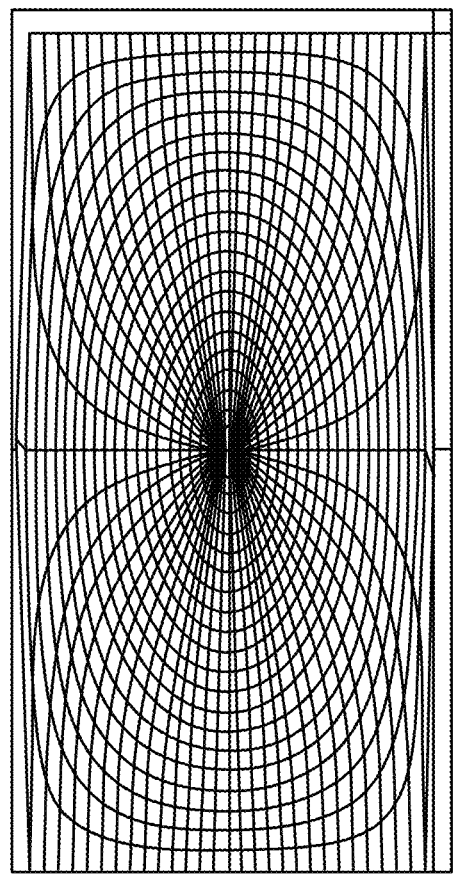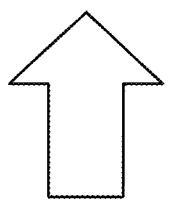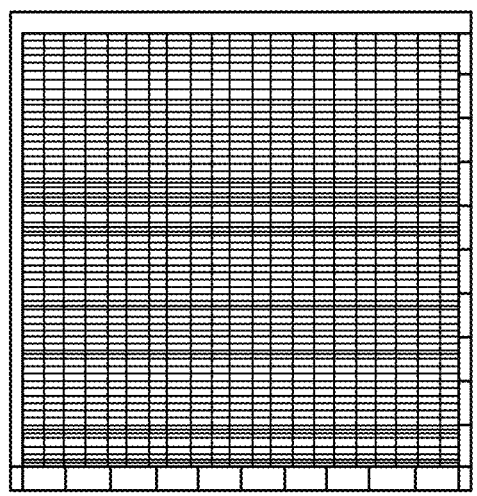
FIG. 15

FISHEYE IMAGE STITCHING FOR MOVABLE CAMERAS

This application claims the benefit of U.S. Provisional Application No. 62/518,428, filed Jun. 12, 2017, the entire content of which is hereby incorporated by reference.

TECHNICAL FIELD

The disclosure relates to spherical image rendering.

BACKGROUND

In certain types of image rendering, such as rendering a 360-degree video/image, a viewer can perceive multiple different views of image content. For instance, while a viewer is viewing the image content on a display, the viewer can select a different view from which to view the content.

SUMMARY

In general, this disclosure describes techniques for generating 360-degree image content by stitching together image content captured by two cameras, each camera having a fisheye lens. The two cameras together capture 360-degrees of image content (e.g., a sphere of image content). In examples described in this disclosure, each camera may capture more than half of the sphere, and the overlapping portion from each of the captured images is used to determine the manner in which to stitch the captured images.

A graphics processing unit (GPU) may utilize texture mapping techniques to generate images from the image content captured by the fisheye lenses. The GPU may define vertex coordinates for primitives arranged in concentric rings in the image content from each of the fisheye lens, and textured render the image content onto the meshes to generate a first image and a second image.

Also, in some cases, the cameras that include the fisheye lenses may be rotated or shifted relative to one another. Accordingly, the vertex texture coordinates for primitives arranged in the concentric rings may be modified (e.g., by the GPU or some other processing circuitry) to account for the rotation or shift of the cameras. The GPU may then perform texture mapping to produce a textured render of the image content defined by the modified vertex texture coordinates onto mesh models to generate a first image and a second image.

In one example, the disclosure describes a method of generating image content, the method comprising receiving calibration parameters of a first camera, wherein the first camera is one of two or more cameras, and the calibration parameters are indicative of a position or rotation of at least one of the first camera or a sensor of the first camera relative to a second camera or a sensor of the second camera, modifying texture coordinates of texture primitives based on the calibration parameters to generate modified texture coordinates, determining primitives in an image captured by the first camera based on the modified texture coordinates, and generating a textured image based on a mapping of the primitives in the image onto a mesh model.

In one example, the disclosure describes a device for generating image content, the device comprising a memory configured to store calibration parameters of a first camera and an image captured by the first camera, and processing circuitry. The processing circuitry is configured to receive the calibration parameters of the first camera from the memory, wherein the first camera is one of two or more cameras, and the calibration parameters are indicative of a position or rotation of at least one of the first camera or a sensor of the first camera relative to a second camera or a sensor of the second camera, modify texture coordinates of texture primitives based on the calibration parameters to generate modified texture coordinates, determine primitives in the image captured by the first camera based on the modified texture coordinates, and generate a textured image based on a mapping of the primitives in the image onto a mesh model.

In one example, the disclosure describes a device for generating image content, the device comprising means for receiving calibration parameters of a first camera, wherein the first camera is one of two or more cameras, and the calibration parameters are indicative of a position or rotation of at least one of the first camera or a sensor of the first camera relative to a second camera or a sensor of the second camera, means for modifying texture coordinates of texture primitives based on the calibration parameters to generate modified texture coordinates, means for determining primitives in an image captured by the first camera based on the modified texture coordinates, and means for generating a textured image based on a mapping of the primitives in the image onto a mesh model.

In one example, the disclosure describes a computer-readable storage medium storing instructions that when executed cause one or more processors to receive calibration parameters of a first camera, wherein the first camera is one of two or more cameras, and the calibration parameters are indicative of a position or rotation of at least one of the first camera or a sensor of the first camera relative to a second camera or a sensor of the second camera, modify texture coordinates of texture primitives based on the calibration parameters to generate modified texture coordinates, determine primitives in an image captured by the first camera based on the modified texture coordinates, and generate a textured image based on a mapping of the primitives in the image onto a mesh model.

The details of one or more examples are set forth in the accompanying drawings and the description below. Other features, objects, and advantages will be apparent from the description, drawings, and claims.

BRIEF DESCRIPTION OF DRAWINGS

FIG. 15 is a conceptual diagram illustrating mesh model used to convert the image of FIG. 14A to generate the image of FIG. 14B.

DETAILED DESCRIPTION

Figure 1:
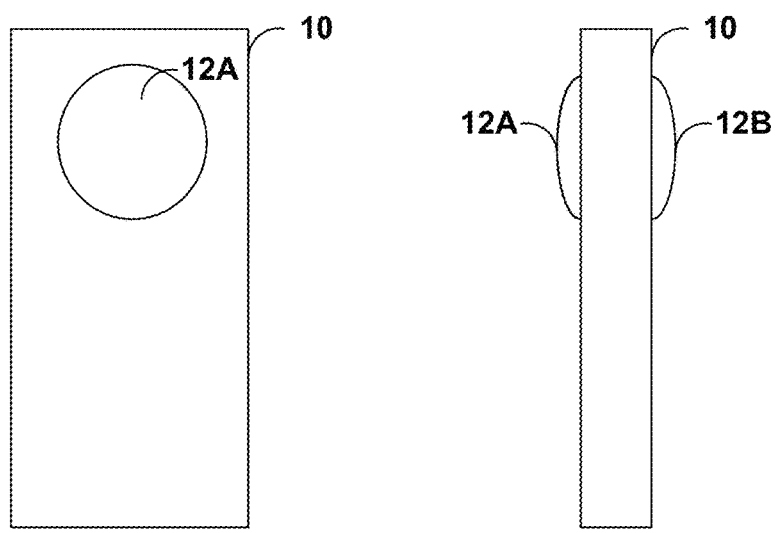
FIG. 1 is a block diagram illustrating an example device for capturing 360-degree image content in accordance with one or more example techniques described in this disclosure.

The example techniques described in this disclosure are related to generating a 360-degree video or image. In a 360-degree video or image, the video/image content forms a conceptual sphere around the viewer. The viewer can view image content from multiple perspectives (e.g., in front, behind, above, and all around), and such image content is called a 360-degree image.

In this disclosure, an image that includes 360-degrees of image content or viewable content means that the image includes content for all perspectives (e.g., content above, below, behind, in front, and on each sides). For instance, conventional images capture slightly less than 180-degree of image content, and do not capture content on the sides of the camera.

In general, a 360-degree video is formed from a sequence of 360-degree images. Accordingly, the example techniques described in this disclosure are described with respect to generating 360-degree image content. Then, for 360-degree video content, these 360-degree images can be displayed sequentially. In some examples, a user may desire to take only a 360-degree image (e.g., as a snapshot of the entire 360-degree surrounding of the user), and the techniques described in this disclosure are applicable to such example cases as well.

The techniques may be applicable to captured video content, virtual reality, and generally to video and image displaying. The techniques may be used in mobile devices, but the techniques should not be considered limited to mobile applications. In general, the techniques may be for virtual reality applications, video game applications, or other applications where a 360-degree spherical video/image environment is desired.

The 360-degree image content may be captured with a camera device that includes two fisheye lenses (e.g., positioned to capture opposite portions of the sphere of image content). The two fisheye lenses capture respective portions of the full sphere of the 360-degree video. However, the images generated by the captured portions are circular images (e.g., one image frame includes two circular images).

As described above, a camera device includes a plurality of fisheye lenses. Some example camera devices include two fisheye lenses, but the example techniques are not limited to two fisheye lenses. One example camera device may include 16 lenses (e.g., 16-camera array for filming 3D VR content). Another example camera device may include eight lenses, each with 195-degree angle of view (e.g., each lens captures 195 degrees of the 360 degrees of image content). Other example camera devices include three or four lenses. Some examples may include a 360-degree lens that captures 360-degrees of image content.

The example techniques described in this disclosure are generally described with respect to two fisheye lenses capturing a 360-degree image/video. However, the example techniques are no so limited. The example techniques may be applicable to example camera devices that include a plurality of lenses (e.g., two or more) even if the lenses are not fisheye lenses, and a plurality of fisheye lenses. For instance, the example techniques describe ways to stitch captured images, and the techniques may be applicable to examples where there are a plurality of captured images from a plurality of lenses (which may be fisheye lenses, as an example). While the example techniques are described with respect to two fisheye lenses, the example techniques are not so limited, and are applicable to the various camera types used for capturing 360-degree images/videos.

In general, the example techniques described in this disclosure describes ways to generate a 360-degree image using the two circular images. A graphics processing unit (GPU) utilizes texture mapping techniques to generate equirectangular projection images. Equirectangular projection refers to an example orientation of images generally used in the industry.

As one example way of generating an equirectangular projection, the spherical (e.g., circular) image that is being projected is divided into primitives with longitudinal and latitudinal lines. For instance, the image content that is to be projected is divided with curved vertical lines with end points on the top and bottom of the image (e.g., longitudinal lines), and curved horizontal lines with end points on the center left and right of the image (e.g., latitudinal lines). These longitudinal and latitudinal lines intersect over the image forming primitives in the image content.

The primitives formed by the longitudinal and latitudinal lines are mapped to a rectangular surface that includes intersections of vertical and horizontal lines. For example, one primitive from the image is mapped to one rectangle formed by the intersection of vertical and horizontal lines. The resulting image is an equirectangular projection image.

For image content generated from fisheye lenses, there may be certain issues with using primitives generated from longitudinal and latitudinal lines to generate equirectangular projection images. For the fisheye lenses example, there are two circular images generated by images captured by respective fisheye lenses that includes a portion of the full sphere of image content. To generate the sphere of image content, these two images should be stitched together. If each of the circular images are converted into equirectangular projection images using primitives formed with longitudinal and latitudinal lines, then there are two equirectangular projection images.

To stitch the two equirectangular projection images, it may be beneficial to perform such stitching where there is minimal distortion or blurring in the equirectangular projection images and where there is overlapping image content in the equirectangular projection images. For equirectangular projection images generated from primitives defined with longitudinal and latitudinal lines, there may be distortion and blurring where there is overlapping image content, leading to potentially less quality in the final image after the stitching.

The example techniques described in this disclosure relate to generating rectangular images from the image content captured by the fisheye lenses that are used for generating the final image for display. However, the GPU may generate the two rectangular images such that the two rectangular images are better suited for stitching. For example, the GPU may utilize primitives arranged in concentric circles in the image content captured by the fisheye lenses, and generate the rectangular images based on the primitives being arranged in concentric circles.

The primitives arranged in concentric circles may be different than primitives arranged via the intersection of longitudinal and latitudinal lines. For instance, in the concentric circles, the circular image may be considered as being cut into a plurality of concentric circular bands, and each band is divided into primitives. In the longitudinal and latitudinal lines, the circular image is not divided into bands. For instance, there is a convergence of longitudinal and latitudinal lines at top, bottom, left, and right points on the circular image, which may not exist in concentric circles.

As one example using the concentric circles of this disclosure, the GPU may generate a first rectangular image by overlaying (e.g., mapping) first primitives that reside along a perimeter of a first image generated by the first fisheye lens to a bottom border of a first mesh model as part of generating a first rectangular image, and by overlaying second primitives that reside along a perimeter of a second image generated by the second fisheye lens to a top border of a second mesh model as part of generating a second rectangular image. The overlapping image content in the first image generated by the first fisheye lens and the second image generated by the second fisheye lens tends to be located along the perimeters of the respective first and second images.

By mapping (e.g., overlaying) the content along the perimeter of the first image to a bottom border of the first mesh model and content along the perimeter of the second image to a top border of the second mesh model, the overlapping image content may be located at the bottom border of the first rectangular image and at a top border of the second rectangular image. Accordingly, the bottom border of the first rectangular image and the top border of the second rectangular image form a very suitable seam along which to stitch the first and second rectangular images because the image content along these borders is approximately the same (e.g., due to the overlapping nature of the image content).

After the stitching of the first and second rectangular images, the resulting rectangular image may be in an intermediate projection format and not in equirectangular projection format. If the application that is to display the image content does not require equirectangular projection images and images in this intermediate projection format are sufficient, then the resulting rectangular image in this intermediate projection format may be sufficient for further processing. If, however, the application that is to display the image content uses equirectangular projection images, then the GPU may perform another round of mapping to map the rectangular image having the intermediate projection to a mesh model that results in a rectangular image having the equirectangular projection.

In the above example, to arrive to the equirectangular projection, the GPU first mapped primitives arranged in concentric circles in the first and second images from the first and second fisheye lenses and generated rectangular images having an intermediate projection, and then generated a rectangular image having an equirectangular projection from the rectangular images having the intermediate projection. In some examples, the GPU may directly (e.g., in one step) map primitives arranged in concentric circles in the first and second images from the first and second fisheye lenses to first and second rectangular images having an equirectangular projection. The GPU may stitch the first and second rectangular images having the equirectangular projection to generate the final rectangular image having the equirectangular projection.

Although not necessary, by bypassing the intermediate projection, the direct mapping techniques may result in faster generation of the rectangular images as compared to example techniques that use the intermediate projection. In such examples, because the intermediate projection operation is skipped, the portions along which the overlapping areas exist may be different. For example, the overlapping areas may be around respective borders of the two rectangular images. The GPU may blend along the borders of the two rectangular images to stitch the two images.

In the above examples, the primitives in the images generated by the fisheye lenses and the mesh models may be uniformly spaced. For example, the angular distance covered by a primitive (in the image or in the mesh model) represents a certain amount of degrees of image content (e.g., between 0-degrees and 360-degrees). If the primitives are spaced such that each primitive covers the same angular distance, the primitives may be considered as being uniformly spaced.

In some examples, the primitives in the images generated by the fisheye lenses and the mesh models may not be uniformly spaced. For example, a first set of primitives may cover a first amount of angular distance, a second set of primitives may cover a second amount of angular distance, and so forth. By having primitives covering larger angular distance, the number of primitives in the circles or on the mesh model reduces, thereby reducing processing time because there are fewer primitives to process.

However, having primitives that cover larger angular distances may result in less quality for the corresponding image content. For instance, in performing the mapping, the GPU may perform interpolation (e.g., linear interpolation) because the primitives in the circles do not map perfectly with the primitives on the mesh model. If the primitives in the circles cover a larger angular distance, then the area needed to interpolate is greater than the area needed to interpolate for primitives that cover smaller angular distances. As the area that needs interpolation becomes larger, and there are not additional points to use for interpolation, the image quality of the interpolated area becomes poorer as compared to when the area that needs interpolation is smaller (e.g., linear interpolation of a long curved line using two points is a poorer approximation of the curved line as compared to linear interpolation of a shorter curved line using two points).

By interspersing primitives with different angular distances, the resulting images may include areas with different image quality. If the angular distance for primitives that correspond to image content with low viewer interest are increased relative to the angular distance for primitives that correspond to image content with high viewer interest, then the reduction in image quality may occur in portions with low viewer interest. Accordingly, in this example using non-uniform angular spacing, there may be a reduction in processing time as compared to examples with intermediate rectangular projection and direct equirectangular projection with uniform angular spacing, and there may not be substantial change in viewer experience because image quality for portions with high viewer interest is preserved.

Similar to above, the GPU may stitch the image content along the borders of the two rectangular images having the equirectangular projection. The resulting image may be the equirectangular image for display.

In the above examples, the GPU utilized primitives arranged as concentric circles in the image content captured by the first and second fisheye lenses. In some examples, the GPU may utilize primitives arranged with the longitudinal and latitudinal lines. For such examples, the GPU may map these primitives to a mesh model such that primitives along a perimeter of the first image are located at a bottom border of the first rectangular image and primitive along a perimeter of the second image are located at a top border of the second rectangular image. The GPU may blend along the top and bottom border of the first and second rectangular images to stitch the first and second rectangular images, and then perform another mapping to generate a rectangular image having the equirectangular projection. For ease, the techniques are described with respect to primitives arranged in concentric circles rather than primitives arranged with the longitudinal and latitudinal lines.

The above example techniques may be considered as image based stitching. In some examples, the techniques described in this disclosure may be extended to calibration based stitching techniques. In calibration based stitching, the device stores information indicative of rotation and/or location of cameras. As one example, the device may store calibration parameters such as information indicative of at least one of the lens or sensor of a first camera relative to a lens or sensor of a second camera (e.g., roll, pitch, and yaw). There should be little to no difference in the roll, pitch, and yaw of the first and second cameras such that the cameras are back-to-back. However, achieving ideal back-to-back alignment may not be practical and there may be tolerances for deviation from the ideal.

In some examples, a central processing unit (CPU) or GPU may modify texture coordinates of the primitives arranged in concentric rings based on the calibration parameters to account for the deviation in the pan, tilt, and roll. Pan refers to Y-rotation, tilt refers to X-rotation, and roll refers to Z-rotation. In some examples, the CPU or GPU may further modify the modified texture coordinates to account for warping that may occur with compensating for the roll and pitch. The GPU may then use the modified texture coordinates or the further modified texture coordinates to map (e.g., overlay) image content from the images (e.g., circular images) onto the mesh model to generate a first textured image (e.g., a textured render of the image content). In some examples, the GPU may blend a portion of the first textured image with a portion of a second textured image to generate a stitched image, and generate image content for display based on the stitched image.

FIG. 1 is a block diagram illustrating an example device for capturing 360-degree image content in accordance with one or more example techniques described in this disclosure. There is a new class of camera entering the marketplace where two fisheye lenses capture and record a 360 spherical environment and creates two fisheye video streams. As illustrated, computing device 10 is a video capture device that includes fisheye lens 12A and fisheye lens 12B located on opposite sides of computing device 10 to capture full 360-degree video content. Other orientations of fisheye lens 12A and 12B may be possible. As described above, the 360-degree video content may be considered as a sequence of 360-degree images (e.g., frames of the video). The example techniques described in this disclosure describe techniques related to the images, which can be used for purposes of still images (e.g., a 360-degree snapshot) or for images that form a video (e.g., a 360-degree video).

A viewer may interact with computing device 10 to capture the 360-degree video/image, where each one of fisheye lens 12A and 12B captures a portion of the 360-degree video/image, and the two video/image streams from the fisheye lens 12A and 12B are blended together to create a stitched 360-degree video/image. In some cases, the blending together of the video/image streams may cause a visible seam between the two streams.

There may be various ways in which a viewer interacts with computing device 10. As one example, the viewer may interact with computing device 10 with a push button located on computing device 10. As another example, a viewer may interact with computing device 10 via a displayed interface (e.g., graphical user interface (GUI)).

In some examples, computing device 10 may be a camera device (e.g., fisheye camera device) that provides no display and may or may not have onboard processing capabilities. In some examples, computing device 10 outputs the captured image to another device for processing (e.g., a processing device). This processing device may provide the primary or secondary mechanism for viewer interaction. For example, the viewer may execute an application on the processing device that causes computing device 10 to sink with the processing device, where the processing device is the master and computing device 10 is the slave. The viewer may then, via the processing device, cause computing device 10 to capture a 360-degree image, and computing device 10 outputs the images back to the processing device for display. In some examples, even when a processing device is used to capture the 360-degree image, the viewer may still interact with computing device 10 for capturing the 360-degree image but computing device 10 will output the image to the processing device for display.

Figures 2A, 2B:
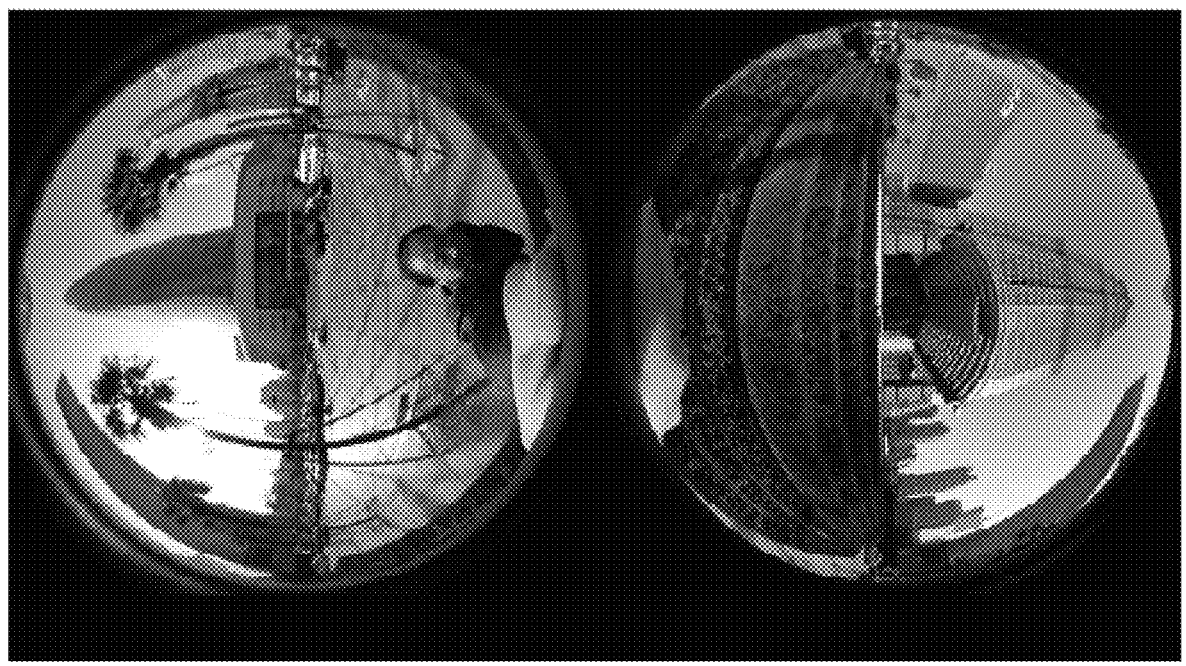
FIGS. 2A and 2B are pictorial diagrams illustrating images captured from the device of FIG. 1.

FIGS. 2A and 2B are pictorial diagrams illustrating an image captured from the device of FIG. 1. As illustrated, the output of the two images captured by lenses 12A and 12B are circular images (e.g., round images). For example, FIG. 2A represents the image captured by lens 12A, and FIG. 2B represents the image captured by lens 12B. In response to a viewer interaction to capture an image, a camera processor, illustrated in FIG. 3, receives the image content captured by lens 12A and 12B and processes the image content to generate FIGS. 2A and 2B. In some examples, FIGS. 2A and 2B may be part of a common image frame.

As illustrated, FIGS. 2A and 2B are circular images illustrating image content that appears bubble-like. If the two circular images are stitched together, the resulting image content would be for the entire sphere of image content (e.g., 360-degree of viewable content).

However, the images captured by lenses 12A and 12B encompass more than half of the 360-degree of viewable content. To capture half of the 360-degree of viewable content, lens 12A would have captured 180-degree of the 360-degrees of viewable content, and lens 12B would have captured the other 180-degree of the 360-degrees of viewable content. In some examples, lenses 12A and 12B may each capture more than 180-degrees of the 360-degrees of viewable content. For instance, lenses 12A and 12B may capture approximately 200-degrees of the viewable content (e.g., content slightly behind the side of computing device 10 and extending all around).

Figure 3:
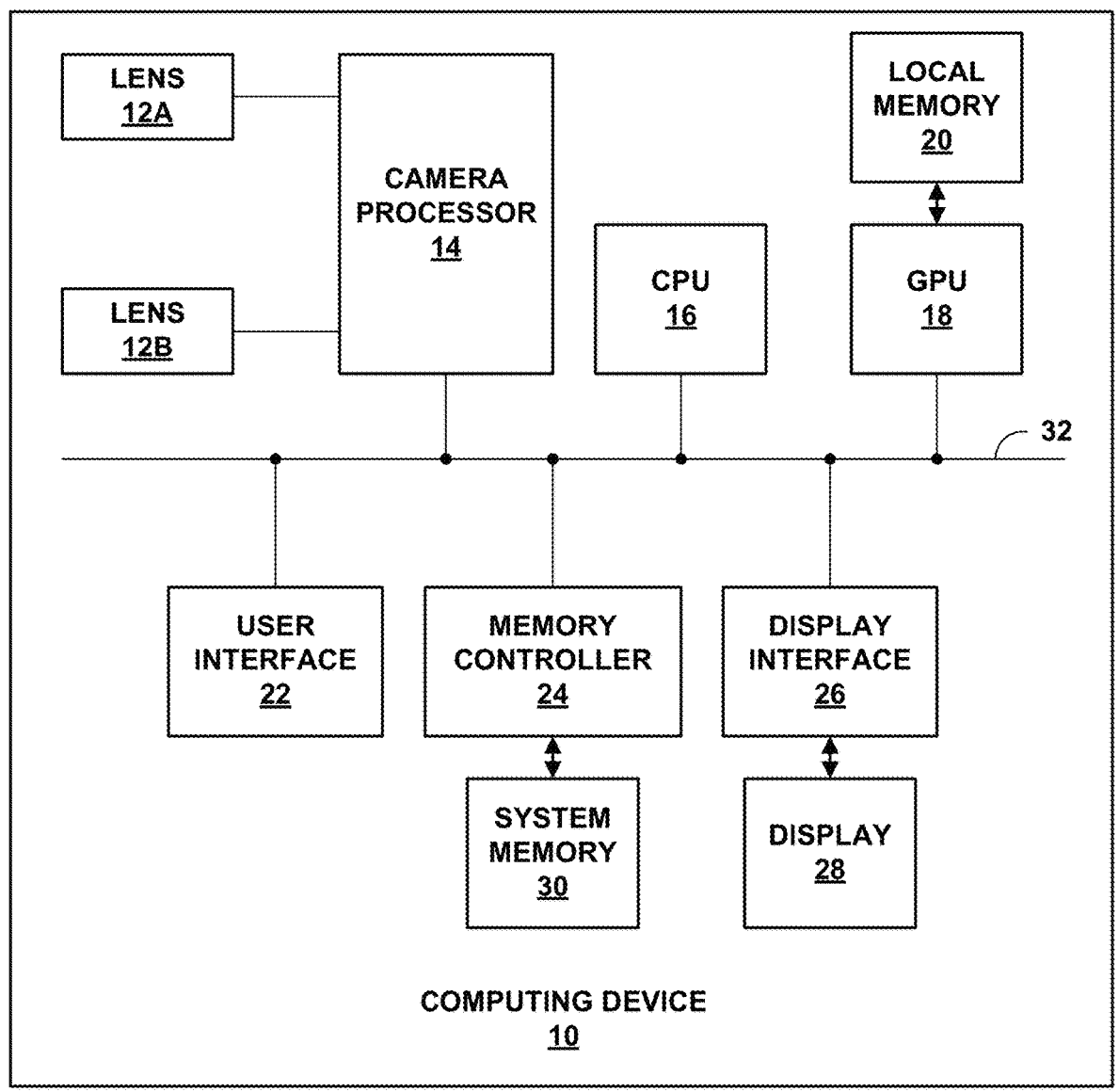
FIG. 3 is a block diagram of a device configured to perform one or more of the example techniques described in this disclosure.

Because each of lenses 12A and 12B capture more than 180-degrees of the 360-degrees of viewable content, there is some image content overlap in the images generated from the content captured by lenses 12A and 12B. In the example techniques described in this disclosure, a graphics processing unit (GPU), as illustrated in FIG. 3, may utilize this overlap in image content to blend the image content from each of lenses 12A and 12B to generate a stitched image for display.

The GPU that generates the sphere of image content for display based on the captured images from lenses 12A and 12B may be on the same device as lenses 12A and 12B (e.g., part of computing device 10 where computing device 10 is a fisheye camera device), or may be in a separate processing device (e.g., a separate handheld device or a fixed device). In examples, where the GPU is in a separate processing device, computing device 10 may output the image content of FIGS. 2A and 2B to the processing device. Computing device 10 and the processing device may be coupled wirelessly, through a wired link, or via a network (e.g., Internet or LAN). The processing device may then render the captured images, and blend the resulting rendered images, for display in accordance with the example techniques described in this disclosure.

In some examples, computing device 10 may capture the images and generate a plurality of images in the form consumable by other devices. For example, computing device 10 may generate circular images illustrated in FIGS. 2A and 2B, and process the images to generate a rectangular image that includes the image content of the circular images.

Computing device 10 may output the rectangular image (e.g., the image generated from the circular images in FIGS. 2A and 2B) to a server. The processing device may download the rectangular images for display. As an example, an individual may capture a 360-degree video (e.g., a sequence of 360-degree images) using computing device 10 of an area of interest (e.g., a concert, a new football stadium, a national park, and the like). Computing device 10 may generate the rectangular images for the captured video. The individual may cause computing device 10 to store the captured rectangular images as the 360-degree video to a server, and another individual interested in the captured 360-degree video may cause the processing device to download from the server, and generate the images for display.

The process of generating the rectangular images may potentially be performed by the processing device, in some examples. For instance, computing device 10 may output the captured images, such as circular images illustrated in FIGS. 2A and 2B to a server for later download by the processing device. The processing device in turn performs the example techniques described in this disclosure to generate the images for display.

For ease of description, as described in more detail, the examples are described with respect to computing device 10 capturing the 360-degree image and displaying the 360-degree image. For example, computing device 10 includes the GPU that renders and blends the captured images for display in accordance with the example techniques described in this disclosure. However, the example techniques are not so limited and examples where computing device 10 captures the 360-degree image, generates a rectangular image that includes the 360-degree image content, and outputs the rectangular image to another processing device are contemplated as well.

As can be seen from FIGS. 2A and 2B, there may be certain artifacts in the captured images. For instance, due to the bubble-like nature of the circular images illustrated in FIGS. 2A and 2B, the image content on the edges (e.g., along the circumference or perimeter of the images) becomes compressed. Without compensating for the compression, the resulting sphere of image content may not appear smooth and may include compressed image content. As described in more detail, the GPU may utilize texture mapping techniques with different sized texture primitives to stretch out the compressed image content.

The techniques described in this disclosure should not be confused with panoramic imaging techniques. In panoramic imagining, a viewer takes a plurality of rectangular images by moving the camera device around, where each image captures less than 180-degree of image content. The camera device then stitches these different images together. In the examples described in disclosure, the circular images include more than 180-degree image content and may have, but not necessarily has, image compression along the circumference of the image. Although panoramic imaging and capturing spheres of image content with fisheye lenses 12A and 12B are different, the example techniques may be used for panoramic imaging as well.

This disclosure describes examples techniques to provide a high performance, high quality combination of the two streams of video data generated by the two cameras. The result may have minimal or non-existent visual seams, and be tolerant to motion by the user and environment.

In the example techniques described in this disclosure, processing circuitry of the GPU may blend the video content from the two portions of the image content captured by lenses 12A and 12B. As described above, the GPU may be within computing device 10 or may be in another device that receives the image content captured by lenses 12A and 12B.

FIG. 3 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of computing device 10 include a personal music player, a video player, a display device, a camera, a television, a set-top box, a broadcast receiver device, a server, an intermediate network device, a mainframe computer or any other type of device that processes and/or displays graphical data.

As illustrated in the example of FIG. 3, computing device 10 includes first fisheye lens 12A and second fisheye lens 12B, at least one camera processor 14, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28. Although FIG. 3 illustrates fisheye lenses 12A and 12B as part of the same device that includes GPU 18, the techniques described in this disclosure are not so limited. In some examples, GPU 18 and many of the various other components illustrated in FIG. 3 may be on a different device (e.g., a processing device), where the captured video content from lenses 12A and 12B is outputted to the processing device that includes GPU 18 for post-processing and blending of the image content to generate the 360-degree video/image.

While the example techniques are described with respect to two fisheye lenses, the example techniques are not so limited, and applicable to the various camera types used for capturing 360-degree images/videos. In some examples, computing device 10 may include a plurality of fisheye lenses (e.g., more than fisheye lenses 12A and 12B).

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 3.

The various components illustrated in FIG. 3 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 3 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI)bus) or another type of bus or device interconnect. It should be noted that the specific configuration of buses and communication interfaces between the different components shown in FIG. 3 is merely exemplary, and other configurations of computing devices and/or other image processing systems with the same or different components may be used to implement the techniques of this disclosure.

Camera processor 14 may be external to computing device 10; however, it may be possible for camera processor 14 to be internal to computing device 10, as illustrated. For ease of description, the examples are described with respect to the configuration illustrated in FIG. 3.

Camera processor 14 is configured to receive the electrical currents as sensor signals from respective pixels of lens 12A and 12B and process the electrical currents to generate pixel data of respective fisheye images (e.g., the circular images). Although one camera processor 14 is illustrated, in some examples, there may be a plurality of camera processors (e.g., one for lens 12A and one for lens 12B). Accordingly, in some examples, there may be one or more camera processors like camera processor 14 in computing device 10.

In some examples, camera processor 14 may be configured as a single-input-multiple-data (SIMD) architecture. Camera processor 14 may perform the same operations on current received from each of the pixels on each of lens 12A and 12B. Each lane of the SIMD architecture may include an image pipeline. The image pipeline includes hardwire circuitry and/or programmable circuitry (e.g., at least one of fixed-function or programmable circuitry) to process the output of the pixels.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples.

Camera processor 14 outputs the resulting images (e.g., pixel values for each of the image pixels) to system memory 30 via memory controller 24. Each of the images may be a combined together to form the 360-degree video/images. For example, GPU 18 or some other processing unit including camera processor 14 itself may perform the blending to generate the video content. For ease of description, the examples are described with respect to the processing circuitry of GPU 18 performing the operations. However, other processing circuitry may be configured to perform the example techniques. In some cases, GPU 18 may combine the images and generate the 360-degree video/images in real-time, but in other examples, the operations of combining the images to generate the 360-degree video/images need not be in real-time.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor 14 to process the images captured by lens 12A and 12B in the user-defined manner.

The software applications that execute on CPU 16 may include one or more graphics rendering instructions that instruct CPU 16 to cause the rendering of graphics data for storage in system memory 30 and/or for display on display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, the user may execute the camera application and interact with computing device 10 to capture the 360-degree video. After camera processor 14 stores the resulting images (e.g., the circular images of FIGS. 2A and 2B) in system memory 30, the camera application may cause CPU 16 to instruct GPU 18 to render and blend the images. The camera application may use software instructions that conform to an example API, such as the OpenGL API, to instruct GPU 18 to render and blend the images. As an example, the camera application may issue texture mapping instructions according to the OpenGL API to cause GPU 18 to render and blend the images.

In response to the received instructions, GPU 18 may receive the image content of the circular images and blend the image content to generate the 360-degree images/video. GPU 18 may store the resulting images in system memory 30 and/or output the images to a server via wired or wireless techniques. In some examples, display 28 displays the 360-degree images/video. The user may interact with user interface 22 to modify the viewing perspective so that the viewer can view the full 360-degree video (e.g., view above, behind, in front, and all angles of the 360 sphere).

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 3 as being a processing circuitry that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In example techniques described in this disclosure, GPU 18 includes a graphics processing pipeline that includes processing circuitry (e.g., programmable circuitry and/or fixed-function circuitry). For example, GPU 18 may include texture hardware circuitry used for performing the operations of the example techniques. GPU 18 may also include processing circuitry for the blending and mask generation for performing the operations of the example techniques.

For instance, GPU 18 may use textured rendering techniques to generate the image content that is to be rendered and blended. Textured rendering generally refers to the process by which an image is overlaid on-top-of (also referred to as "glued" to) a geometry. The image that is to be overlaid may be referred to as a color texture or simply texture, and CPU 16 may define the geometry. The color texture may be a two-dimensional (2D) image that is overlaid onto a 3D mesh model, but other dimensions of the color texture are possible such as 3D image. Also, the mesh model need not necessarily be a 3D mesh model, and may be a 2D mesh model (e.g., a 3D mesh model where the z-coordinate is set equal to zero).

As an example to assist with understanding textured rendering (also called texture mapping) in general, the 3D mesh model may be an interconnection of a plurality of primitives that forms a wall, and the color texture may be a 2D image of a mural image. In this example, the geometry on which color texture is overlaid is the wall, and the color texture in the mural image. In texture mapping, CPU 16 outputs instructions to GPU 18 that correspond to (e.g., associate) 3D coordinates (e.g., x, y, z) of vertices of the primitives that form the wall with texture coordinates of the color texture. In this example, the texture coordinates of the color texture are the image pixel coordinates of the mural image normalized to be between 0 and 1.

Figure 4:
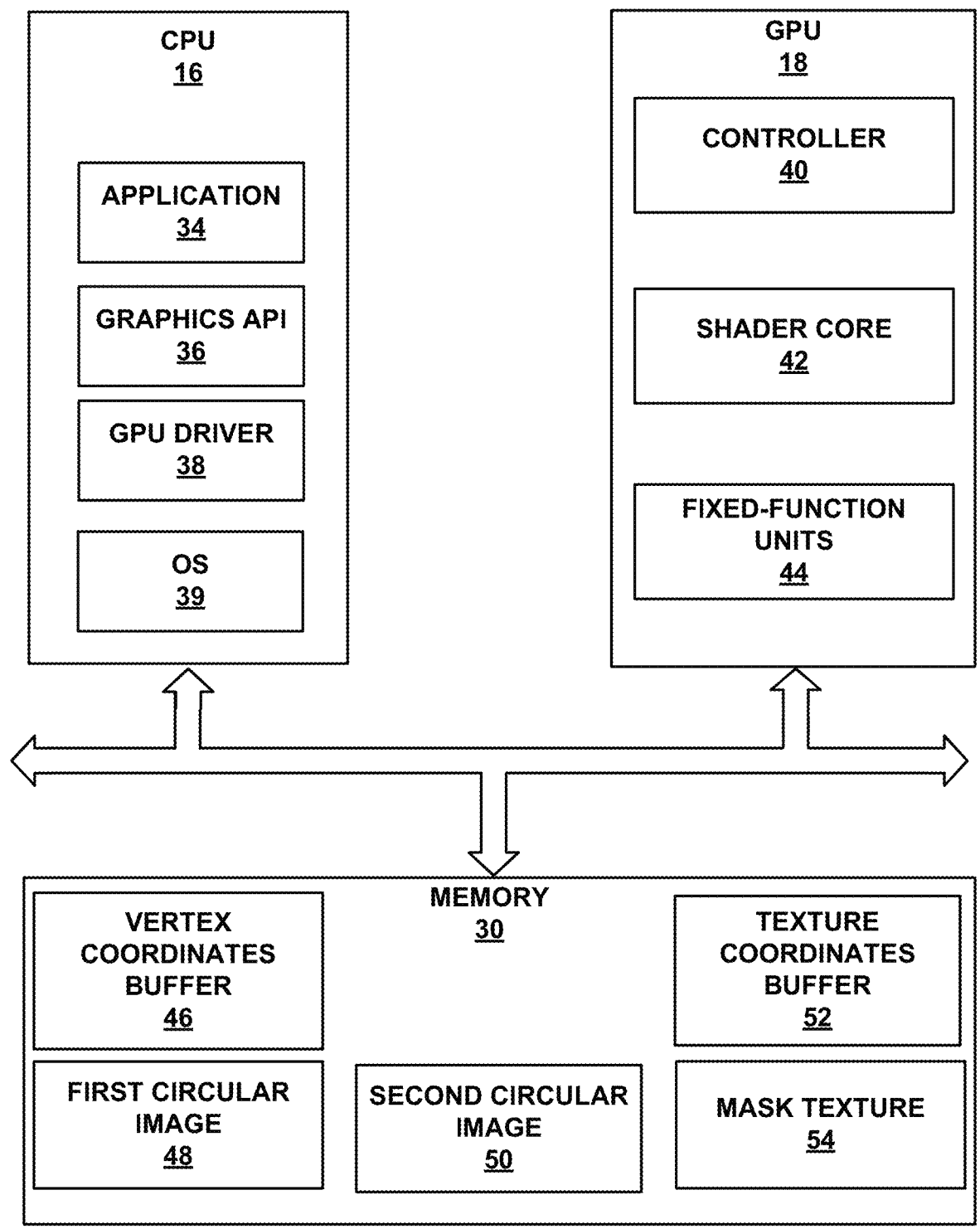
FIG. 4 is a block diagram illustrating a CPU, a GPU and a memory of the computing device of FIG. 3 in further detail.

In the example techniques described in this disclosure, the image generated from content captured by lenses 12A and 12B (e.g., as illustrated in FIGS. 2A and 2B) form a color texture, which may be represented as a bitmap. The texture hardware circuit of GPU 18 performs color texture mapping with the texture coordinates (e.g., as illustrated in FIG. 4). OpenGL uses the bitmap with the texture coordinates, vertex coordinates of the geometry, and connectivity information to generate the video content for the portions of the image content.

CPU 16 may determine the texture coordinates, the vertex coordinates of the geometry on which the color texture is overlaid, and the connectivity information. One example of the geometry on which the color texture is overlaid is a mesh model. In examples described in this disclosure, the shape of the mesh model may be a rectangle.

One of the reasons for the mesh model being a rectangle is so that the blended image is a rectangular image having an equirectangular projection, referred to as an equirectangular image. An equirectangular image includes the image content of a sphere in a rectangular form where longitudinal and latitudinal points on a sphere are equally spaced on the equirectangular image.

For example, on a sphere or a half-sphere, a longitudinal line starts from the top center point on the sphere or half-sphere and curves to the bottom center point on the sphere or half-sphere. All longitudinal lines vertically extend starting from the top center point on the sphere or half-sphere and with varying curvatures curve to the bottom center point on the sphere or half-sphere. A latitudinal line starts from a point on the left on the sphere or half-sphere and curves to a corresponding point on the right of the sphere or half-sphere. For example, a first latitudinal line starts from a center on the left end of the sphere or half-sphere and curves to the center point on the right end of the sphere or half-sphere. Additional latitudinal lines curve around horizontally on the sphere or half-sphere.

This intersection of the longitudinal and latitudinal lines form primitives where the intersection of a longitudinal and latitudinal line forms a vertex. For example, one of the circular images of FIG. 2A or 2B may be divided into longitudinal and latitudinal lines that form primitives of the image content of the circular image, where the intersection of longitudinal and latitudinal lines form vertices used to define the primitives.

In equirectangular projection, each one of these primitives is mapped to rectangular portion on the rectangular mesh. For example, the rectangular mesh may include a plurality of x and y coordinates that each correspond to a point on the sphere or half-sphere. As one example, the equation to determine the x-coordinate on the rectangular mesh that corresponds to point on the sphere or half-sphere is $x=(lambda-lambda0)*cos(phi1)$, where lambda refers to the longitude of the point (e.g., the longitudinal line on which the point resides), lambda0 refers to the central longitudinal line (also called central meridian), and phi1 refers to the standard parallels. The equation to determine the y-coordinate on the rectangular mesh that corresponds to a point on the sphere or half-sphere is $y=(phi-phi1)$, where phi refers to the latitude of the point (e.g., the latitudinal line on which the point resides).

Therefore, for each vertex on the circular image, there is a corresponding (x,y) coordinate on the rectangular mesh. By mapping each vertex on the circular image to its corresponding (x,y) location on the rectangular mesh, the result is a mapping of the circular image onto the rectangular mesh, resulting in the a so-called equirectangular image or rectangular image having equirectangular projection (e.g., sphere or half-sphere is projected).

Generally, equirectangular images are widely used because the equirectangular projection has been known for many years. However, for 360-degree images/video with images captured from fisheye lenses 12A and 12B, generating equirectangular images using longitudinal and latitudinal lines may not result in high visual quality.

As described above, each of the circular images from fisheye lenses 12A and 12B include overlapping image content. To stitch the image content from the circular images from fisheye lenses 12A and 12B, GPU 18 may blend together the overlapping image content. Blending at the overlapping image content may be beneficial because there are limited drastic changes or distortion in the overlapping image content allowing for a smooth blend between the two images to form a single stitched image.

However, if the first circular image from fisheye lens 12A (e.g., FIG. 2A) is projected as a first equirectangular image based on the first circular image being divided by longitudinal and latitudinal lines, and the second circular image from fisheye lens 12B (e.g., FIG. 2B) is projected as a second equirectangular image based on the second circular image being divided by longitudinal and latitudinal lines, the overlapping portions may not located in the first and second equirectangular images where GPU 18 can easily blend the first and second equirectangular images. Therefore, GPU 18 may stitch the first and second equirectangular images in such a way that there is distortion in the final image that negatively impacts visual quality. For example, GPU 18 may place the first and second equirectangular images side-by-side and perform panoramic stitching, which may result in distorted images.

In the example techniques described in this disclosure, GPU 18 may utilize primitives arranged in concentric circles to overlay (e.g., map) the image content from the circular images onto a rectangular mesh model. By utilizing primitives arranged in concentric circles, GPU 18 may overlay a first set of primitives (e.g., primitives along the perimeter) of a first circular image onto a first (e.g., bottom) border of a first rectangular mesh model, overlay a second set of primitives (e.g., primitives connected to a center of the first circular image) onto a second (e.g., top) border of the first rectangular mesh model, and overlay the other primitives in the first circular image onto respective positions in the first rectangular mesh model. GPU 18 may overlay a first set of primitives (e.g. primitives along the perimeter) of a second circular image to a first (e.g., top) border of a second rectangular mesh model, overlay a second set of primitives (e.g., primitives connected to a center of the second circular image) to a second (e.g., bottom) border of the second rectangular mesh model, and overlay the other primitives in the second circular image to respective positions in the second rectangular mesh model.

The overlapping portions in the first circular image and the second circular image are generally along the perimeter of the circular images. In the above example, GPU 18 overlaid the primitives along the perimeter of the first circular image onto the bottom of the first rectangular image, and overlaid the primitives along the perimeter of the second circular image onto the top of the second rectangular image. Therefore, the image content along the bottom of the first rectangular image and the image content along the top of the second rectangular image are similar (e.g., overlapping image content). GPU 18 may blend a portion of the first rectangular image with a portion of the second rectangular image to generate a stitched rectangular image. For example, GPU 18 may blend the image content on the bottom of the first rectangular image with the image content on the top of the second rectangular image to generate a stitched rectangular image.

This stitched rectangular image may not include the image distortions that potentially existed in examples where longitudinal and latitudinal primitives are used instead of primitives in concentric circles. However, the stitched rectangular image may not be an equirectangular image (e.g., a rectangular image having an equirectangular projection). For example, in an equirectangular image, the (0, 0) coordinate on the top-left refers to 0-degrees longitude, and 0-degrees latitude. In the stitched rectangular image, the 0-degrees longitude and 0-degrees latitude point is not at the (0, 0) coordinate on the top-left of the stitched rectangular image. Rather, the (0,0) coordinate on the top-left of the stitched rectangular image corresponds to either 90-degrees or −90-degrees longitude and 0-degrees latitude. In other words, the stitched rectangular image is 90-degrees rotated along the x-axis.

In examples where equirectangular images are not necessary, the stitched rectangular image may be sufficient for further processing. However, in examples where equirect- angular images are used, then GPU 18 may perform additional steps to rotate the stitched rectangular images 90-degrees in the x-axis. For example, GPU 18 may perform trigonometric functions on the coordinates of each of the pixels in the blended rectangular images to rotate the coordinates of each pixel by 90-degrees.

Performing per-pixel trigonometric functions for determining the rotated coordinates may be computationally extensive. In some examples, rather than performing per-pixel trigonometric operations, GPU 18 may map primitives from the stitched rectangular image to another mesh model such that the resulting image is an equirectangular image.

For example, GPU 18 may map primitives from the stitched rectangular image to primitives in this other mesh model that are rotated 90-degrees along the x-axis relative to the primitives in the stitched rectangular image. After performing the mapping, GPU 18 generated an equirectangular image that can be for display or used by another application that uses equirectangular image as an input.

For instance, GPU 18 may store the equirectangular images in system memory 30, and computing device 10 may store the equirectangular images from system memory 30 to a server for later download. Another application executing on another device (e.g., processing device) may access the images stored on the server. This application may use equirectangular images as the input for display, and by GPU 18 generating equirectangular images for display, this application may receive images in the form the application was designed for.

In the above example, the stitched rectangular image formed as an intermediate image that was further processed to generate the equirectangular image. In the above example technique, GPU 18 may overlay first primitives, arranged as first concentric circles, in a first circular image to a first mesh model to generate a first rectangular image, and overlay second primitives, arranged as second concentric circles, in a second circular image to a second mesh model to generate a second rectangular image. Although not necessary, the first and second mesh model may be same mesh model (e.g., GPU 18 is utilizing different instances of the same mesh model to generate the first and second rectangular image). In the overlaying, GPU 18 may overlay image content along the perimeter to top or bottom portions of the mesh models, so that there is a seam of overlapping image content along which GPU 18 can blend the first and second rectangular images to stitch the images together. The result of the blend is an intermediate image (e.g., stitched image), and GPU 18 may overlay this intermediate image to a third mesh model to generate an equirectangular image.

This example technique for generating the equirectangular image is a first algorithm for generating the equirectangular image. There may be additional algorithms to generate the equirectangular image.

As an example of a second algorithm for generating the equirectangular image, GPU 18 may bypass the generation of an intermediate image. Rather, GPU 18 may overlay first primitives, arranged as first concentric circles, in the first circular image to a first mesh model such that the result of the overlaying is a first equirectangular image, and overlay second primitives, arranged as second concentric circles, in the second circular image to a second mesh model such that the result of the overlaying is a second equirectangular image. As above, the first and second mesh models may be different instances of the same mesh model.

In the second algorithm, the first equirectangular image means that the pixels in the first equirectangular image are in the same positions as they would be had the first equirectangular image been generated from longitudinal and latitudinal primitives. However, the first equirectangular image is generated from primitives of the first circular image that are arranged in concentric circles. Similarly, the second equirectangular image means that the pixels in the second equirectangular image are in the same positions as they would be had the second equirectangular image been generated from longitudinal and latitudinal primitives. However, like the first equirectangular image, the second equirectangular image is generated from primitives of the second circular image that are arranged in concentric circles. Accordingly, the first and second equirectangular images conform to an equirectangular projection but need not be generated from primitives defined by longitudinal and latitudinal coordinates.

GPU 18 may blend the first and second equirectangular images to generate a stitched equirectangular image for display. To generate the stitched equirectangular image, GPU 18 may not have needed to generate an intermediate image because GPU 18 directly generated first and second equirectangular images. However, the blending may be different as compared to the first algorithm because the overlapping image content in the first and second rectangular images may not be at top and bottom borders, as was the case with the first algorithm.

In the second algorithm, the overlapping image content may be present along the four borders of the first and second equirectangular images. For example, GPU 18, via the first and second mesh models, may map primitives along the perimeter of the first and second circular images along the borders for the first and second equirectangular images. GPU 18 may blend along the borders of the first and second equirectangular images to generate the stitched equirectangular image. Because the second algorithm may not include generation of an intermediate image, GPU 18 may be able to perform the second algorithm in less time than and consume less power than the first algorithm.

In the first and second algorithms, the primitives in the concentric rings and mesh models may be distributed uniformly in their angular distance. Angular distance refers to a distance covered by a primitive in terms of angle. For instance, the primitives in the concentric circles encompass a full 360-degree angular distance. If the concentric circles are swept at a fixed angular distance (e.g., 10-degrees), then the number of primitives in a concentric circle is equal to 36.

In a third algorithm, GPU 18 may perform operations similar to those of the first and second algorithm, but rather than the primitives being distributed uniformly in their angular distance (e.g., each primitive having the same size), the primitives may be distributed non-uniformly. For example, rather than each primitive encompassing 10-degrees, some primitives may encompass more than 10-degrees, other primitives may encompass 10-degrees, and some primitives may encompass less than 10-degrees. Because each of the primitives in the concentric circles maps to a primitive on the mesh model, the primitives in the mesh model may not be uniformly distributed.

The amount of time and power that GPU 18 expends on processing the primitives is directly correlated to the number of primitives that need processing. In the third algorithm, there may be an overall reduction in the number of primitives that need processing as compared to the first and second algorithms. For example, if assumed that the size of the primitives is 10-degrees in the first and second algorithms, then in the third algorithm, there may be some primitives that are 20-degrees and some primitives that are 10-degrees. Because there are some primitives that are 20-degrees, then there is a reduction in the number of primitives because some primitives sweep across 20-degrees. In other words, if a first set of primitives is twice as big as a second set of primitives, fewer total primitives are needed for the same 360-degree area than if all primitives were of the size of the second set of primitives.

As an example, if all primitives encompassed 10-degrees, then there would be 36 primitives in a circle (360/10). If all primitives encompassed 20-degrees, then there would be 18 primitives in a circle (360/20). If half of the primitives are at 20-degrees and other half are at 10-degrees, then there would 24 primitives (12 primitives that each encompass 10-degrees, and 12 primitives that each encompass 20-degrees). Therefore, GPU 18 may expend less processing time processing the 24 primitives in the example where half of the primitives are 20-degrees and half of the primitives are 10-degrees than the example where there are 36 primitives and all primitives are 10-degrees. GPU 18 may expend the least amount of time in the example where there are 18 primitives because all primitives are 20-degrees.

The size of each primitive may be inversely correlated to the image quality. For example, having smaller sized primitives results in higher image quality as there are more primitives to interpolate across, and having larger sized primitives results in lower image quality as there are fewer primitives to interpolate across. In the first and second algorithms, because the primitives are uniform, the image quality throughout the final equirectangular image may be uniform. With varying sizes for the primitives, the image quality in the third algorithm may be different.

CPU 16 may generate the primitives for the concentric circles and the mesh models based on desired image quality for different portions, in the third algorithm. For example, for portions of the image content that are of less viewer interest, CPU 16 may define primitives having larger size (e.g., cover more angular distance), and for portions of the image content that are of more viewer interest, CPU 16 may define primitives having smaller size (e.g., cover less angular distance). CPU 16 may determine portions of different interest based on information provided by the application that generated the image content.

For the third algorithm, GPU 18 may perform either the first algorithm or the second algorithm, but with non-uniformly distributed primitives. The result may be faster generation of the equirectangular images with less power consumption and with minimal impact to viewer experience. For example, because the portions with low viewer interest have lower image quality, the viewer may not be affected with the lower image quality. Because portions with high viewer interest have higher image quality, the viewer may not perceive any change in experience as compared to the first and second algorithms.

As described above, to perform the operations of the first, second, and third algorithms, GPU 18 maps image content from the first and second circular images to first and second mesh models, and for the first algorithm, further maps image content from the intermediate image to a third mesh model. One example way to perform such mapping is via textured rendering techniques. As described above, textured rendering overlays (e.g., glues) image content from the circular images onto to the mesh models.

CPU 16 may define the primitives arranged in concentric circles via a texture map. For example, the texture map includes a plurality of primitives arranged in concentric circles. If the texture map is placed on top of the circular images (e.g., of FIGS. 2A and 2B), the texture map divides the circular images into a plurality of primitives arranged as concentric circles.

In textured rendering, the image content that is being overlaid is referred to as texture or color texture. Therefore, the circular images are each color textures. The texture map therefore divides the color textures into a plurality of texture primitives. As part of textured rendering, GPU 18 overlays each one of these texture primitives onto corresponding primitives in the mesh models.

CPU 16 (e.g., via the camera application executing on CPU 16 or via information pre-generated and stored) may define the mesh models as formed with a plurality of primitives (e.g., square primitives). For instance, CPU 16 may define the x, y, z coordinates for vertices of plurality of primitives of the mesh model. The z-coordinate may be zero.

GPU 18 may overlay a first color texture (e.g., one of FIG. 2A or 2B) onto a first mesh model to generate a first rectangular image. For example, GPU 18 may overlay first primitives, arranged as first concentric circles, in a first circular image (e.g., one of FIG. 2A or 2B) onto a first mesh model to generate a first rectangular image. The first rectangular image includes a portion of the entire sphere of image content (e.g., portion of the 360-degree image). For the first algorithm, the first rectangular image may not be in an equirectangular projection, and for the second algorithm, the first rectangular image may be in the equirectangular projection. GPU 18 may repeat this procedure but with a second color texture (e.g., other one of FIG. 2A or 2B) onto a second mesh model to generate a second rectangular image. For example, GPU 18 may overlay second primitives, arranged as second concentric circles, in a second circular image (e.g., other one of FIG. 2A or 2B) onto a second mesh model to generate a second rectangular image. The second rectangular image includes the other portion of the entire sphere of image content (e.g., the remaining portion of the 360-degree image). For the first algorithm, the second rectangular image may not be in an equirectangular projection, and for the second algorithm, the second rectangular image may be in the equirectangular projection. The first and second mesh models may be the same mesh model but used for rendering different portions of the sphere of image content.

To overlay the color textures (e.g., first and second circular images) onto the mesh models, CPU 16 may define texture coordinates for the image pixels within circular images. The image pixels are generally normalized to be between 0 and 1. One example manner in which CPU 16 may define the texture coordinates is based on polar coordinates. For instance, the texture map may include a plurality of texture primitives that form concentric circles. One example of the texture coordinates is the coordinates of the vertices of the texture primitives. In some examples, the coordinates of the vertices of the texture primitives may be defined in polar coordinates instead of Cartesian coordinates, but the example techniques are not so limited.

The texture map having the plurality of texture primitives that form concentric circles can be considered as dividing up the circular images into a plurality of primitives in concentric circles. For instance, the coordinates of the vertices of the texture primitives can be used to refer to coordinates of pixels in the circular images. In other words, CPU 16 divides the circular image into a plurality of primitives, where the size and shape of a primitive is defined by the texture map, which in this case, means that CPU 16 divides the circular image into a plurality of primitives that form concentric circles. An example of such a texture map and ways in which the texture map is generated is described with respect to FIGS. 5, 8, 9, and 10.

The mesh model having a rectangular shape, which forms the geometry on which the color texture is overlaid, includes a set of vertex coordinates for the plurality of primitives that form the mesh model. The circular image generated from one of lens 12A or 12B (e.g., one of FIG. 2A or 2B), which forms the color texture that is overlaid on the geometry, includes a set of texture coordinates.

As an example, for textured rendering, GPU 18 may overlay texture primitives onto the primitives of the mesh model on a primitive-by-primitive basis. The texture primitives and the primitives of the mesh model may be quadrilaterals, as a non-limiting example. CPU 16 may output instructions to GPU 18 that correspond the four texture coordinates vertices of a texture primitive to the four vertex coordinates of a primitive of the mesh model. CPU 16 may also output instructions that cause GPU 18 to overlay (e.g., glue) the texture primitive onto the primitive of the mesh model. CPU 16 and GPU 18 may repeat these operations on a primitive-by-primitive basis for all primitives in the mesh model.

The manner in which the vertices of texture primitives correspond to vertices of primitives on the mesh model may be pre-computed and stored, but it is possible for CPU 16 to determine the how these primitives correspond during runtime. For example, system memory 30 may store a table with the information of which primitive corresponds to which primitive. CPU 16 may access the table to determine which vertex of a texture primitive corresponds to which vertex of the primitives on the mesh model. The equations to determine how the primitives correspond to one another are described in more detail below.

The result of this textured rendering operation is a first rectangular image that includes a portion of a sphere of image content. For example, if CPU 16 and GPU 18 started with the circular image of FIG. 2A, then the result would be a first rectangular mesh model on which the circular image of FIG. 2A is overlaid, forming a first rectangular image that is a portion of the entire viewable content. CPU 16 and GPU 18 may repeat these operations on the second circular image (e.g., the circular image of FIG. 2B) to generate a second rectangular image that includes the other portion of the sphere of image content. These portions, which are rectangular images, include the entire image content that forms the sphere of image content (e.g., the 360-degrees of viewable content).

For the second algorithm, the first and second rectangular images are equirectangular images that are then blended to form the stitched equirectangular image. For the first algorithm, the first and second rectangular images are not equirectangular images, and after blending, the stitched image (e.g., intermediate image) should be converted (e.g., rotated 90-degrees along x-axis) to an equirectangular image. Rather than performing trigonometric functions to perform the rotation, GPU 18 may textured render the intermediate image onto a third mesh model, where the vertices of the primitives in the third mesh model are rotated 90-degrees relative to the vertices in the intermediate image.

The stitched equirectangular image of the second algorithm and the stitched image of the first algorithm are both rectangular images, and hence, stitched rectangular image may generically refer to the rectangular image resulting from the blending in the first or second algorithms. For the first algorithm, the stitched rectangular image may be further processed (e.g., rotated 90-degrees) to be in equirectangular image form. For the second algorithm, the stitched rectangular image may already be in equirectangular image form.

For the first algorithm, CPU 16 may define another texture map for the intermediate image (e.g., stitched image), and the intermediate image may form another color texture. In this case, the texture map may be a rectangular texture map, and the vertices of the primitives of this texture map may be vertices of texture primitives of the color texture (e.g., intermediate image). CPU 16 may issue textured rendering commands to GPU 18, and provide information indicating which vertices on the texture primitives (e.g., vertices for primitives in the intermediate image) are mapped to which vertices in the third mesh model. For example, system memory 30 may store a table that includes information of which vertices of the texture primitive corresponds to which vertices of the third mesh model. Ways to generate the information indicating how vertices correspond is described in more detail below. The result of the textured rendering from the intermediate image to the third mesh model is an equirectangular image.

In addition to generating equirectangular images, the example techniques described in this disclosure may correct for compression in the circular images generated by the fisheye lenses 12A and 12B. In some examples, the image content along the perimeter (e.g., circumference) of the circular images generated from image content captured by lens 12A and 12B appears compressed. In some examples, CPU 16 and GPU 18 may utilize the textured rendering to stretch out the compressed image content.

The width of the primitives in the concentric circles may be variable, but the angular distance may be the same, at least for the first and second algorithms. The primitives in the concentric circles are two-dimensional primitives. In one dimension, the primitives set an angular distance (e.g., number of degrees swept by the primitive), and the other dimension may set the width of the primitives. For the first and second algorithms, the angular distance may be uniform in all of the primitives, but the width may be different. For the third algorithm, which sets the primitives of the texture map that is used for the first and second algorithm, the angular distance of the primitives may not be uniform, and the width may not be uniform.

In some examples, the width of the primitives in one or more of the outer circles may be less than the width of the primitives in the other circles. As one example, the width of the primitives in the outer most circle may be less than the width of all other circles. The width of the next to most outer circle may be less than the width of all other circles except the outer most circle, and so forth. In some examples, the width of primitives in most of the circles may be the same except for just the outer most circle or the last few outer circles.

The difference in the widths of the primitives results in different amounts of stretching when mapped to the corresponding primitives in the mesh model. As described above, the texture primitive refers to a group of image pixels in a circular image that encompass the area formed by the texture coordinates of the texture primitive. For example, assume that a size and shape of a texture primitive is the same as a size and shape of a corresponding primitive on the mesh model. This assumption need not necessarily be true, and is provided to assist with understanding. In this case, when GPU 18 textured renders the texture primitive to the corresponding primitive on the mesh model, the mapping is one-to-one (e.g., GPU 18 can directly overlay the texture primitive on-top of the corresponding primitive of the mesh model).

In another example, assume that a size and shape of a texture primitive is less than a size and shape of a corresponding primitive on the mesh model. In particular, assume that the width of the texture primitive is less than the width of the corresponding primitive on the mesh model. For instance, if the texture primitive and the primitive in the mesh model were both rectangles, then the width of the texture primitive would be less than the width of the primitive in the mesh model, and the length may be the same. In this case, when GPU 18 textured render the texture primitive to the corresponding primitive on the mesh mode, the mapping is not one-to-one. Rather, GPU 18 stretches out the texture primitive width-wise to overlay the texture primitive on-top-of the corresponding primitive in the mesh model. As an example, if the width of the texture primitive were half the width of the primitive of the mesh model, then the image content in the texture primitive would stretch by a factor of two so that the image content is overlaid on the primitive in the mesh model.

In examples described in this disclosure, the texture primitives in one or more outer circles of the texture map correspond to image content along the perimeter (e.g., circumference) of the circular images (e.g., along the circumference of the images illustrated as FIGS. 2A and 2B). Also, as noted above, the image content along the circumference of the circular images tends to be compressed. Therefore, because the width of the texture primitives in one or more of the outer circles is less than the width of the other texture primitives, when GPU 18 overlays the image content from the circular images onto the corresponding primitives of the mesh model, there may be more stretching of the image content along the circumference of the circular images than for other image content in the circular images.

In this way, CPU 16 and GPU 18 may utilize textured rendering techniques to compensate for the image content compression that occurs when lenses 12A and 12B capture image content and camera processor 14 generates the circular images. Such techniques for compensating image content compression are not necessary in all examples. For instance, CPU 16 may define a texture map with equal widths or adjust the primitives of the mesh model so that there is not stretching.

As described, GPU 18 performs the textured rendering (also called texture mapping) to overlay a first circular image (e.g., circular image illustrated in FIG. 2A) onto a first mesh model to generate a first rectangular image that includes a first portion of image content, and performs the textured rendering to overlay a second circular image (e.g., circular image illustrated in FIG. 2B) onto a second mesh model to generate a second rectangular image that includes a second portion of the image content. The first and second mesh models may be instances of the same rectangular mesh model, or may be different mesh models. In the first algorithm, the first and second rectangular images may not be equirectangular images.

In the second algorithm, the first and second rectangular images may be equirectangular images. For example, the location of pixels in the first and second rectangular images may be in the same location if the first and second rectangular images were generated from longitudinal and latitudinal primitives, but are generated from primitives arranged in concentric circles.

In both the first and second algorithm, GPU 18 may also blend the first and second rectangular images, and there may be various ways in which GPU 18 may blend the first and second rectangular images. As one example, GPU 18 may blend the first and second rectangular images based on the overlapping portion in the first and second rectangular images. As described above, the image content in each of the first and second rectangular images is more than 180-degrees of image content, meaning that there is some overlapping image content (e.g., image content that appears in both) in the first and second rectangular images.

In the first algorithm, this overlapping content occurs along the bottom border of the first rectangular image and along the top border of the second rectangular image. As described above, in the first algorithm, GPU 18 textured rendered primitives along the perimeter of the first circular image to a bottom border of the first mesh model so that the primitives along the perimeter of the first circular image are located along the bottom border of the first rectangular image. Also, GPU 18 textured rendered primitives along the perimeter of the second circular image to a top border of the second mesh model so that the primitives along the perimeter of the second circular image are located along the top border of the second rectangular image. GPU 18 may blend the image content located at the bottom of the first rectangular image with the image content located at the top of the second rectangular image (e.g., the first rectangular image is on top of the second rectangular image, with the overlapping portions overlapping one another for blending).

It should be understood that although the techniques are described with respect to the primitives along the perimeter of the first circular image being mapped to bottom of first rectangular image, and primitives along the perimeter of the second circular image being mapped to top of the second rectangular image, the techniques may similarly apply to mapping primitives along the perimeter of the first circular image to top of the first rectangular image, and primitives along the perimeter of the second circular image to bottom of the second rectangular image. In this example, the blending may occur with the second rectangular image on top and the first rectangular image on the bottom.

This overlapping content occurs along the seams of the first and second rectangular images (e.g., along the bottom of first rectangular image and top of second rectangular image). GPU 18 may blend the overlapping portions so that the same image content does not appear twice in the final rectangular image.

In the second algorithm, the overlapping content occurs along the borders of the first and second equirectangular images. For example, the overlapping content may form like a "picture-frame" around the first and second rectangular images. At the corners, the overlapping content may curve along the corner, rather than make a perfect bend. GPU 18 may blend the overlapping portions so that the same image content does not appear twice in the equirectangular image.

As one example of blending for the first and second algorithm, GPU 18 may perform alpha blending along the overlapping portions of the two rectangular images. Alpha blending is a way to assign weighting that indicates the percentage of video content used from each of the rectangular images when blending.

For the first algorithm, the alpha blending weighs contributions of image content from the first and second rectangular images of the image content. For instance, with alpha blending in the overlapping area, there is a weighted contribution of overlapping pixels. If on the top of the overlapping seam, but still overlapping, GPU 18 weights the pixels on first rectangular image more than those on the second rectangular image (e.g., more weight to pixels on first rectangular image than second rectangular image). If on the bottom of the overlapping seam, but still overlapping, GPU 18 weights the pixels on the second rectangular image more than those on the first rectangular image (e.g., more weight to pixels on the second rectangular image than the first rectangular image). The weighting for the blending changes progressively through the overlapping seam.

As one example way to perform the alpha blending, GPU 18 may perform another texturing pass to generate a mask texture. GPU 18 may use this mask texture with the color texture to generate the video content for the 360-degree video.

For example, CPU 16 may define a mask texture. The primitives that form the mask texture may be the same size and shape as the primitives that form color texture. In other words, the mask texture map may be the same as the color texture map used to define the texture coordinates for the pixels in the circular images. However, the values of the mask texture map may indicate the weighting used in the blending of the first and second rectangular images. Unlike the color textures (e.g., the circular images), the mask texture is not an actual image with image content. Rather, the mask texture is a way to define the opacity of pixels within the first and second rectangular images.

The mask texture map may be conceptually considered as being a gray-scale image with values ranging from 0 to 1, where 1 represents that 100% of a rectangular image is used in the blending, and 0 represents that 0% of the rectangular image is used in the blending. If the value in the mask texture map is between 0 and 1, then that value indicates the weighting applied to a corresponding pixel in the rectangular image, and the remainder weighting is applied to a corresponding pixel in the other rectangular image (e.g., blending between the two rectangular images).

For instance, assume that a value in the mask texture map when applied to the first rectangular image is 0.4. This means that GPU 18 weights a pixel on the first rectangular image by 40%, and weights a corresponding pixel on the second rectangular image by 60%.

Because the overlapping in the first and second rectangular images occurs along the seam where the first and second rectangular images couple to one another, in the first algorithm, the mask texture that CPU 16 generates may indicate a weighting of "one" for the values in the center of the mask texture. This is because mask texture primitives in the center of the mask texture correspond to locations on the first and second rectangular images where there is no overlap. In the mask texture map, for the values in the mask texture map that correspond to locations on the first and second rectangular images where there is overlap, the values may be less than "one" and greater than "zero." For instance, for values closer and closer to the same mask texture, the values may become smaller and smaller, until the values reach "zero."

Using a mask texture to determine the alpha blending is merely one example way in which to perform the alpha blending. As another example way to perform alpha blending, when CPU 16 issues the instruction that indicates which vertices of which primitives correspond to one another, CPU 16 may also generate an opacity value indicative of the weighting of each pixel in the blending. For example, for vertices in the overlapping portion, CPU 16 may assign a first value between 0 and 1 to vertices in the first rectangular image and assign a second value equal to 1 minus the first value to corresponding vertices in the second rectangular image. Here, corresponding vertices refer to vertices that are for primitives that belong in both the first and second rectangular images (e.g., vertices for primitives that are overlapping).

In blending, GPU 18 may weigh the contribution of each vertex based on the opacity value defined by CPU 16. For example, if a vertex is assigned an opacity value of 0.8 in the first rectangular image, and 0.2 for a corresponding vertex in the second rectangular image, then GPU 18 may weighted average the color values for these vertices by weighting the vertex in the first rectangular image by 0.8, and weighting the vertex in the second rectangular image by 0.2.

In the example where CPU 16 defines opacity values as another parameter for the vertices, the alpha blending may occur on a per-vertex basis. GPU 18 may interpolate the alpha blending values on a per-pixel basis based on the opacity values defined by CPU 16 for the vertices. There may be other ways to perform alpha blending and the example techniques should not be considered limited to these examples.

In one or more examples, where color texture and mask texture is used, CPU 16 and GPU 18 may utilize three different textures for rendering the circular images generated by the image content captured by fisheye lenses 12A and 12B. In a first textured rendering operation, a first texture is a first color texture, which is one of the circular images. GPU 18 performs textured rendering using the first color texture to overlay a first circular image onto a first mesh model, defined by CPU 16, to generate a first rectangular image (non-equirectangular in first algorithm or equirectangular in second algorithm). An example shape of the first mesh model is a rectangle, but other shapes are possible. In a second textured rendering operation, a second texture is a second color texture, which is the other one of the circular images. GPU 18 performs textured rendering using the second color texture to overlay a second circular image onto a second mesh model, defined by CPU 16. An example shape of the second mesh model is a rectangle, but other shapes are possible. The first and second mesh models may be instances of the same mesh model or different mesh models.

In some examples, a width of primitives in one of circles (e.g., a first circle) in the first and second circular images is less than a width of primitives in another one of the circles (e.g., a second circle) in the first and second circular images. As described above, during the textured rendering, GPU 18 may stretch portions of the image content that were compressed in the circular images generated from the image content captured by lenses 12A and 12B.

As one way to perform alpha blending, GPU 18 may assign blending factors to the first and second portions of the image content. For example, GPU 18 performs a third textured rendering operation using a mask texture. This mask texture is not an image itself but rather is a mechanism to define the blending factors (e.g., weighting applied to pixels in the first and second portions as part of the blending). During this third textured rendering operation, where GPU 18 is using values from the texture map, GPU 18 may be assigning the opacity to each of the pixels in the first and second rectangular images. The opacity may define how to blend the overlapping portions of the first and second rectangular images (e.g., how much each of the first and second rectangular images contributes to the final sphere of image content). A blender circuit of GPU 18 may then blend the first and second rectangular images to generate a rectangular image of 360-degree of image content.

As another way to perform alpha blending, CPU 16 defines opacity values for each of the primitives. A blender circuit uses the opacity values of each of the primitives to blend the first and second rectangular images. For example, the first rectangular image may be on top of the second rectangular image, for the first algorithm, and the blender circuit may blend the first rectangular image and the second rectangular image along the bottom and top borders to generate a single continuous rectangular image as a way to stitch the first and second rectangular images.

GPU 18 may similarly perform alpha blending for the second algorithm. For example, GPU 18 may determine opacity for each pixel or for each primitive via mask texture or based on opacity values assigned by CPU 16 for each pixel or primitive in first and second equirectangular image. GPU 18 may then blend the overlapping portions to form the single equirectangular image.

For example, to stitch the first and second equirectangular images, GPU 18 may stitch along a border that forms if the first and second equirectangular images are placed next to one another (or on top of one another based on orientation). As one example, the border between the two equirectangular images may be a vertical border. GPU 18 and CPU 16 may determine the opacity values for the pixels along the vertical border using a mask texture or based on values assigned by CPU 16.

GPU 18 may then blend the first and second equirectangular images along this border to generate a single stitched equirectangular image. As described above, the overlapping portions may be along the perimeter of the first and second circular images. In the first and second equirectangular example, the overlapping portion may be along a border, and GPU 18 may blend along the border to generate a single equirectangular image. There may be other ways to perform the stitching and the example techniques are not limited in the above way to perform the stitching. In general, any technique to stitch the two equirectangular images via blending may be possible in the second algorithm, and possibly in the first and third algorithms as well.

For the first algorithm, after the blending, GPU 18 may perform another textured rendering operation to generate the equirectangular image. For the second algorithm, the result of the blending may be the equirectangular image. For the third algorithm, if used with the first algorithm, another textured rendering operation may be used to generate the equirectangular image, and if used with the second algorithm, the result may be an equirectangular image. GPU 18 may output the result of the rendering and blending to system memory 30.

In some examples, CPU 16 may retrieve the image content from system memory 30 and output, with transmitting circuitry (not illustrated) of computing device 10, the image content to a server. The transmitting circuitry may provide for wireless and wired communication. Another processing device may retrieve the image content for display.

In some examples, display interface 26 may retrieve the image content from system memory 30 and display the resulting image content on display 28. Display 28 may display a portion of the entire sphere, and the viewer may interface with computing device 10 (e.g., via display 28) to select which portion of the sphere to view.

In some examples, prior to blending, a seam may appear where the first and second rectangular images are coupled together (e.g., at bottom and top borders for the first algorithm, or along the four borders for the second algorithm). The seam may manifest as a sudden change in image content or a misalignment in image content. For example, if the first and second rectangular images are not aligned, then even with blending there may be sudden change in image content. GPU 18 may detect such a seam and perform further processing to correct for the seam, and in some examples, perform such processing prior to blending.

One example way to detect a seam is to compare similarity in the overlapping areas. For example, assume that overlapping portions in the first and second rectangular images are N×M pixels. Processing circuitry of GPU 18, such as arithmetic logic units (ALUs) or elementary function units (EFUs) may subtract the color values of the N×M pixels from the first and second rectangular images. The processing circuitry may determine the similarity based on the subtraction of the color values.

In some examples, GPU 18 may implement a Maximum of Absolute Differences (MAD) technique to determine similarity in overlapping image content. For instance, the processing circuitry of GPU 18 may subtract the color values of the N×M pixels from the first and second portions. The processing circuitry may determine an absolute value of the results from the subtraction, and may determine a maximum value from the absolute values. Having a maximum value closer to 0 indicates that there is high similarity between the overlapping image content of the first and second rectangular images. If the maximum value is less than a threshold value (e.g., pre-stored or determined threshold value), GPU 18 may determine that there is proper alignment in the first and second portions (e.g., there is similarity between the overlapping image content).

If, however, there is not similarity between the overlapping image content, CPU 16 and GPU 18 may repeat the process of generating a portion of image content but with adjusted texture coordinates. For example, CPU 16 may utilize a different texture map to determine coordinates for the color texture. This different texture map may be like the original texture map except the texture primitives may be warped or shifted, or a portion of the texture primitives may be changed. GPU 18 may map one of the first or second circular images using the texture coordinates from this different texture map onto the mesh model, and GPU 18 may render the resulting portion of the image content. GPU 18 may determine similarity between this resulting portion and the other portion to determine whether there is similarity between their overlapping image content. CPU 16 and GPU 18 may repeat these operations until the similarity between the overlapping image content is greater than the threshold value.

CPU 16 may adjust texture coordinates of the texture primitives used to generate the first and second rectangular images by either selecting a different texture map or may adjust texture coordinates by calculating on the fly the new texture coordinates. For example, CPU 16 may change the angle of the primitives in the texture map to adjust the texture coordinates, and determine the texture coordinates for these adjusted primitives.

As described above, the misalignment occurs in the overlapping image content. The overlapping image content, in the first or second algorithms, corresponds to the primitives along the perimeter of the circular images. Accordingly, in some examples, in adjusting texture coordinates, CPU 16 may adjust the texture coordinates of primitives along one or more circles that are closest to the perimeter, and may not adjust coordinates of other primitives.

GPU 18 may then repeat the operations of overlaying the circular images to mesh models and determine if the overlapping portions are similar. In some examples, GPU 18 may not need to textured render the entire first and second circular images. Rather, GPU 18 may textured render only those primitives for which CPU 16 changed the texture primitives. GPU 18 may then determine if there is sufficient similarity based on those newly rendered portions. If there is sufficient similarly, GPU 18 may overwrite the image content of the overlapping portion stored in memory 30.

For the rest of the image content, since none of that image content changed, that image content may remain in memory 30. For example, memory 30 may store the first and second rectangular images. GPU 18 may have rendered new image content for the bottom border of the first rectangular image and top border of the second rectangular image. If there is sufficient similarity, GPU 18 may overwrite the bottom border of the first rectangular image and the top border of the second rectangular image, and perform blending. In this way, GPU 18 may correct for any misalignment, and may not need to textured render the entire image every time. Rather, GPU 18 may only textured render the overlapping portion where the misalignment occurs.

There may be other ways in which to determine the similarity between overlapping image content in the first and second portions, and the above is one example way to determine the similarity. Also, the above provides one example for how to adjust the texture coordinates of the texture primitives in the color texture, and other ways to adjust the texture coordinates of the texture primitives in the color texture are possible.

In general, GPU 18 or CPU 16 may determine similarly between the overlapping image content in the first rectangular image and the second rectangular image. CPU 16 may adjust size or shape of primitives arranged as concentric circles in the first circular image or size or shape of primitives arranged as concentric circles in the first and second circular images. GPU 18 may overlay the adjusted primitives in the first circular image generate a first adjusted rectangular image, or the adjust primitives in the first and second circular images generate the first adjusted rectangular image and a second adjusted rectangular image. CPU 16 and GPU 18 may repeat the adjusting and overlaying until similarity between overlapping image content in the first and second adjusted rectangular images is within a similarity threshold. To blend the portions of the first rectangular image with the portion of the second rectangular image, GPU 18 may blend a portion of the first adjusted rectangular image with one of a portion of the second adjusted rectangular image or the portion of the second rectangular image.

In some examples, after GPU 18 generates the equirectangular image, there may be some remaining artifacts in the equirectangular image. CPU 16 may output information to GPU 18 indicating the portions where there may be some visual artifact. For example, via prior testing, CPU 16 may determine areas that tend to include artifacts (e.g., generally in the middle of the image). GPU 18 may execute instances of a pixel shader that may interpolate the actual color values for pixels in the identified portions based on the color values that were determined as part of the textured rendering and the color values of neighboring pixels. However, there may be other ways to determine the color values for the pixels in the identified portions such as based on the color values of pixels in the original circular images that correspond to the pixels in the identified portions.

Also, although GPU 18 is described as executing instances of a pixel shader to correct for the visual artifacts on the equirectangular image, the techniques are not so limited. In some examples, GPU 18 may execute instances of a pixel shader to correct for visual artifacts on the first and second rectangular images. GPU 18 may then perform blending and other operations on the first and second rectangular images after the visual artifacts have been corrected in the first and second rectangular images.

FIG. 4 is a block diagram illustrating CPU 16, GPU 18 and memory 30 of computing device 10 of FIG. 3 in further detail. As shown in FIG. 4, CPU 16 is communicatively coupled to GPU 18 and memory 30, and GPU 18 is communicatively coupled to CPU 16 and memory 30. GPU 18 may, in some examples, be integrated onto a motherboard with CPU 16. In additional examples, GPU 18 may be implemented on a graphics card that is installed in a port of a motherboard that includes CPU 16. In further examples, GPU 18 may be incorporated within a peripheral device that is configured to interoperate with CPU 16. In additional examples, GPU 18 may be located on the same microchip as CPU 16, e.g., forming a system on a chip (SoC).

CPU 16 is configured to execute application 34, a graphics API 36, and a GPU driver 38, and an operating system 39. GPU 18 includes a controller 40, shader core 42, and one or more fixed-function units 44.

Software application 34 may include at least some of one or more instructions that cause graphic content to be displayed or one or more instructions that cause a non-graphics task (e.g., a general-purpose computing task) to be performed on GPU 18. As an example, software application 34 may cause CPU 16 to cause camera processor 14 and lenses 12A and 12B to capture 360-degree video or images, and cause GPU 18 to render the 360-degree video or images for display or for output to a server for eventual display. Software application 34 may issue instructions to graphics API 36. Graphics API 36 may be a runtime service that translates the instructions received from software application 34 into a format that is consumable by GPU driver 38. In some examples, graphics API 36 and GPU driver 38 may be part of the same software service.

GPU driver 38 receives the instructions from software application 34, via graphics API 36, and controls the operation of GPU 18 to service the instructions. For example, GPU driver 38 may formulate one or more command streams, place the command streams into memory 30, and instruct GPU 18 to execute command streams. GPU driver 38 may place the command streams into memory 30 and communicate with GPU 18 via operating system 39 (e.g., via one or more system calls).

Controller 40 of GPU 18 is configured to retrieve the commands stored in the command streams, and dispatch the commands for execution on shader core 42 and one or more fixed-function units 44. Controller 40 may dispatch commands from a command stream for execution on one or more fixed-function units 44 or a subset of shader core 42 and one or more fixed-function units 44. Controller 40 may be hardware-based fixed-function circuitry of GPU 18, may be programmable circuitry of GPU 18 for executing software or firmware, or a combination of both fixed-function circuitry and programmable circuitry.

Shader core 42 includes programmable circuitry (e.g., processing cores on which software executes). One or more fixed-function units 44 include fixed function circuitry configured to perform limited operations with minimal functional flexibility. Shader core 42 and one or more fixed-function units 44 together form a graphics pipeline configured to perform graphics processing.

Shader core 42 may be configured to execute one or more shader programs that are downloaded onto GPU 18 from CPU 16. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 42 may include a plurality of processing units that are configured to operate in parallel (e.g., a SIMD pipeline). Shader core 42 may have a program memory that stores shader program instructions and an execution state register (e.g., a program counter register) that indicates the current instruction in the program memory being executed or the next instruction to be fetched. Examples of shader programs that execute on shader core 42 include, for example, vertex shaders, pixel shaders (also referred to as fragment shaders), geometry shaders, hull shaders, domain shaders, compute shaders, and/or unified shaders.

Fixed-function units 44 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 44 may include, for example, processing units that perform raster operations (e.g., depth testing, scissors testing, alpha blending, etc.).

GPU driver 38 of CPU 16 may be configured to write the command streams to memory 30, and controller 40 of GPU 18 may be configured to read the one or more commands of command streams from memory 30. In some examples, one or both of command streams may be stored as a ring buffer in memory 30. A ring buffer may be a buffer with a circular addressing scheme where CPU 16 and GPU 18 maintain synchronized state variables associated with the writing of data to and reading of data from the ring buffer. For example, if the first command stream is a ring buffer, each of CPU 16 and GPU 18 may store a write pointer indicating the next address to be written to in the ring buffer, and a read pointer indicating the next address to be read from the ring buffer.

When CPU 16 writes a new command to the ring buffer, CPU 16 may update the write pointer in CPU 16 and instruct GPU 18 to update the write pointer in GPU 18. Similarly, when GPU 18 reads a new command from the ring buffer, GPU 18 may update the read pointer in GPU 18 and instruct CPU 16 to update the read pointer in CPU 16. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 38 and an example GPU controller 40 is now described with respect to FIG. 4. GPU driver 38 receives one or more instructions from software application 34 that specify graphics operations and/or general-purpose computing operations to be performed by GPU 18. GPU driver 38 places the output command stream into memory 30, which is accessible by GPU controller 40. GPU driver 38 notifies GPU controller 40 that the command stream corresponding to software application 34 is available for processing. For example, GPU driver 38 may write to a GPU register (e.g., a GPU hardware register polled by GPU 18 and/or a GPU memory-mapped register polled by GPU 18) one or more values indicating that the command stream is ready for execution.

Upon notification that the command stream is ready for execution, controller 40 of GPU 18 may determine if resources are currently available on GPU 18 to begin executing the command stream. If resources are available, controller 40 begins to dispatch the commands in the command stream.

As part of graphics processing, CPU 16 may offload certain graphics processing tasks to GPU 18. For instance, application 34 may generate attribute data for attributes of a plurality of vertices of primitives that interconnect to form a graphical object. Application 34 may store the attribute data in a vertex buffer in memory 30 (e.g., vertex coordinates buffer 46). GPU driver 38 may instruct controller 40 to retrieve the attribute data for the attributes of the vertices for processing to generate graphics data for display (e.g., for immediate display or for outputting to a server for display at a later time).

As an example operation, application 34 may cause lenses 12A and 12B to capture image content, and cause camera processor 14 to generate and store first circular image 48 and second circular image 50 in memory 30. Application 34, via graphics API 36 and GPU driver 38, may generate a command stream instructing GPU 18 to perform the example techniques described in this disclosure.

For example, application 34 may generate a mesh model, and store the vertex coordinates of the primitives of the mesh model in vertex coordinates buffer 46 in memory 30. In some examples, vertex coordinates for the primitives of the mesh model may be pre-stored in vertex coordinates buffer 46. One example way to generate the vertex coordinates is described below. Similarly, application 34 may define and store the texture coordinates for a color texture map in texture coordinates buffer 52, or the texture coordinates for the color texture map may be pre-stored in texture coordinates buffer 52. One example way to generate the texture coordinates is described below.

To perform texture mapping, CPU 16 may indicate to GPU 18 which texture coordinates correspond to which vertex coordinates of the mesh model. One example way to indicate which coordinates correspond is through the vertex shader that is to execute on the circuitry of shader core 42. The function of a vertex shader is to perform processing on vertices of the mesh model. To perform such processing, application 34, via graphics API 36 and GPU driver 38, instructs controller 40 to retrieve batches of vertex coordinates (e.g., vertex coordinates for a primitive of the mesh model) from vertex coordinates buffer 46. In addition, application 34, via graphics API 36 and GPU driver 38, may instruct controller 40 to retrieve texture coordinates from texture coordinates buffer 52 that correspond to the vertex coordinates retrieved from vertex coordinates buffer 46.

Which vertex coordinates of the texture primitives correspond to which vertex coordinates of the mesh model may be pre-calculated and stored or calculated on the fly. The mathematical relationship between the polar coordinates of the texture primitives to the x, y, z coordinates of the mesh model are described in more detail below. Because there is a mathematical relationship, application 34 may determine which primitives correspond based on the mathematical relationship on the fly (e.g., during operation), or the information indicating which coordinates correspond may be pre-stored and access by application 34.

Controller 40 may provide the x, y, z coordinates of the vertex coordinates for a primitive of the mesh model and the u, v coordinates of the texture coordinates for a corresponding color texture primitive to the vertex buffer as input for processing. In addition, application 34, via graphics API 36 and GPU driver 38, instructs a texture hardware circuit, which is an example of fixed-function units 44, to retrieve a texture primitive located at the texture coordinates within first circular image 48 and store the texture primitive in local memory 20 (local memory 20 is illustrated in FIG. 3).

Application 34, via graphics API 36 and GPU driver 38, may issue commands to the texture hardware circuit instructing the texture hardware circuit to overlay the texture primitive (e.g., from the first circular image) onto the mesh model primitive. Texture hardware circuit may stretch or otherwise resize, as instructed by application 34, the texture primitive so that texture primitive fits within the primitive of the mesh model (e.g., via interpolation, filtering, and other mathematical operations to scale the texture primitive). The texture hardware circuit may assign the vertex attributes (e.g., color and opacity values) to the vertices of the mesh model based on the vertex attributes of the texture primitives.

Fixed-function units 44 of GPU 18 may rasterize the output from the vertex shader, and output the rasterized primitive to a pixel shader. Application 34, via graphics API 36 and GPU driver 38, may cause controller 40 of GPU 18 to execute the pixel shader (also called fragment shader) on the circuitry of shader core 42. The pixel shader may assign the pixel values from the texture primitive to the corresponding pixels in the rasterized primitive to render image content.

CPU 16 and GPU 18 may repeat these steps for all of the primitives of the mesh model and the color texture primitives using first circular image 48 to generate a first rectangular image of the 360-degree image content. CPU 16 and GPU 18 may repeat these steps, but with second circular image 50 forming the color texture to generate a second rectangular image of the 360-degree image content.

GPU 18 may compare the similarity of the overlapping portions. As described above, if the similarity, as determined on a maximum difference calculation, is outside a similarity threshold, CPU 16 may adjust the texture primitives. As one example, texture coordinates buffer 52 may store a plurality of different texture maps. Each texture map may generally be similar except one or more primitives in the circles near the perimeter may be adjusted (e.g., warped, bent, etc.). CPU 16 and GPU 18 may use a different texture map and repeat the above operations of adjusting texture primitives and overlaying by using different texture maps until the similarity is within the threshold. In some examples, CPU 16 may determine the adjustment in the size or shape of the primitives in real-time.

In some examples, where the similarity is not within the threshold, CPU 16 and GPU 18 may only render the portions corresponding the overlapping portions. Further, CPU 16 and GPU 18 may only render one of the first or second circular images and not both. In other words, one of the first or second rectangular image may remain constant, and GPU 18 may render the other one of the first and second rectangular image to determine whether the overlapping portions are aligned. Therefore, when CPU 16 adjusts the size or shape of primitives arranged as concentric circles, CPU 16 may adjust size or shape of primitives arranged as concentric circles in the first circular image 48, and/or adjust size or shape of primitives arranged as concentric circles in the second circular image 50 (e.g., adjust size or shape of both the primitives for the first and second circular images, or for one of the primitives for the first and second circular images).

Application 34, via graphics API and GPU driver 38, may then instruct controller 40 to cause fixed-function units 44 to alpha blend the first and second rectangular images. For example, application 34 may generate mask texture 54 and store mask texture 54 in memory 30, or mask texture 54 may be pre-generated and stored in memory 30. Mask texture 54 may include values that are used to indicate the opacity of pixels in the first and second rectangular images.

Controller 40 may receive instructions from application 34 to use mask texture 54 as part of another pass of texture mapping where mask texture 54 forms a texture that the texture hardware circuit of GPU 18 maps to the first and second rectangular images. In some examples, application 34 may use the same texture coordinates stored in texture coordinates buffer 52 used for texture mapping first circular image 48 and second circular image 50. For example, shader core 42 may execute a vertex shader with the vertex coordinates of the first and second rectangular images as inputs along with corresponding coordinates for mask texture 54, and the texture hardware circuit of GPU 18 may perform texture mapping as described above.

One possible advantage of using the texture coordinates stored in texture coordinates buffer 52 for the texture coordinates for first circular image 48 and second circular image 50 and for mask texture 54 is that texture mapping may be very precise. Mask texture 54 indicates the opacity. By using the texture coordinates of texture coordinates buffer 52, the correct opacity value will be assigned to the correct pixel in the first and second rectangular portions. In this way, a very precise mask may be generated by rendering a color per vertex leveraging texture hardware circuit of GPU 18.

In some examples, only one mask texture 54 may be needed. For example, the texture hardware circuit of GPU 18 may use mask texture 54 for assigning the opacity values to the first rectangular image, and use mask texture 54 for assigning the opacity value to the second rectangular image. For example, the values of mask texture 54 may be 0.0 (for black or transparent) to 1.0 (for white or opaque), with the middle being 0.5. The mask texture value is referred to as alpha. GPU 18 may texture map mask texture 54 to one of the first portion or the second rectangular image, and for the other one, the mask texture value may be 1-alpha. For instance, if mask texture 54 defines the alpha value as 0.4 for a pixel in the first rectangular image, then the alpha value applied to the pixel in the second rectangular image is 0.6.

After assigning the opacity values, fixed-function units 44 may blend the two portions, disabling depth culling, and using alpha blending. The result of the rendering is the 360-degree image that is displayed by display 28.

Using mask texture 54 is one example way of assigning opacity (also called alpha) values to the pixels. There may be other ways as well. For example, CPU 16 may define the opacity on a per vertex basis. CPU 16 may include the opacity value in the instruction that causes GPU 18 to overlay the circular image onto the mesh model. In such examples, after overlaying the first circular image onto the first mesh model, each of the vertices in the first mesh model will have an opacity value useable for alpha blending. Similarly, after overlaying the second circular image onto the second mesh model, each of the vertices in the second mesh model will have an opacity value useable for alpha blending. GPU 18 may interpolate the opacity values for the pixels in the primitives based on the opacity values for the vertices.

The rendered first and second rectangular images may be individually displayable, but their display would not appear to be a 360-video/image until the first rectangular image and second rectangular image are stitched together. One way to stitch the first rendered portion and the second rendered portion is by alpha blending across the overlapping portion. This results in a continuous single rectangular image.

For example, because there is overlapping image content in the first rectangular image and the second rectangular image, there are a plurality of pixels in the first rectangular image having the same <x,y> coordinates as pixels in the second rectangular image (e.g., there are overlapping pixels in each of the first and second rectangular images). Also, each of the pixels in the first rectangular image and the second rectangular image are assigned an opacity value (also called alpha value) as part of the texture mapping based on mask texture 54, or GPU 18 determines the opacity value for vertices as assigned by CPU 16 and interpolates the opacity values for the other pixels in the primitives from the assigned opacity values.

The blender circuit of fixed-function units 44 may utilize the opacity value for alpha blending. For example, the opacity value may indicate the percentage that a pixel contributes to the final sphere of image content. The blender circuit may scale the pixel values based on the opacity (or alpha) values for the first rectangular image and the second rectangular image, and assign a new value based on the scaling of the pixel values to the pixels in the overlapping portion. GPU 18 may output these new pixel values for the pixels in the overlapping portion as the pixel values for the sphere of image content.

For example, for the pixels in the first and second rectangular images that do not overlap, their respective opacity values will indicate to the blender circuit that no blending is needed (e.g., all contribution from one of the first or second rectangular image and no contribution from the other rectangular image). For pixels in the first and second rectangular images that do overlap, their respective opacity values indicate respective contribution of pixels to the final image content. Accordingly, GPU 18 may generate a blended rectangular image at least in part by blending, via the blender circuit, the first rectangular image and the second rectangular image based on the overlapping image content.

As an example, assume that the first rectangular image is referred to as A with pixels having ColorA, and the second rectangular image is referred to as B with pixels having ColorB. The formula for the alpha blending may be ColorFinal=(Ca*AlphaA+Cb*AlphaB(1−AlphaA))/(AlphaA+AlphaB(1−AlphaA)), where ColorFinal is the result of the operation, Ca is the color of the pixel in the first rectangular image, Cb is the color of the pixel in the second rectangular image, AlphaA and AlphaB are the alpha of pixels in respective ones of the first and second rectangular images. If it is assumed that all color values are pre-multiplied by their alpha values, ColorFinal=ColorA+ColorB*(1−AlphaA). In this example, GPU 18 may be considered as performing A over B compositing, and not necessarily in, out, atop, and xor compositing, although such additional compositing may be possible.

For the first algorithm, GPU 18 may rotate the image content of the stitched rectangular image (e.g., intermediate rectangular image) along an x-axis by 90-degrees to generate an equirectangular image. One way to perform the rotation is via trigonometric functions on each pixel. Another way to perform the rotation is via textured rendering.

For example, application 34 may then instruct GPU 18 to perform another textured rendering operation. In this texture rendering operation, the stitched rectangular image forms an intermediate rectangular image that is textured rendered onto a third mesh model. The third mesh model includes primitives having vertex coordinates that are same as vertex coordinates of primitives in the blended rectangular image rotated along the x-axis by 90-degrees.

In the first, second, or third algorithm, there is a possibility that there are certain portions in the equirectangular image for which there are visual artifacts. CPU 16 may determine portions of the image content that is for display (e.g., equirectangular images) having the visual artifacts and output information to GPU 18 indicating where the portions are located.

In some examples, the portions in the equirectangular image where there are visual artifacts may be determined previously. For instance, the portions in the equirectangular image where there are visual artifacts may be based on the concentric circles and the rectangular mesh. During manufacturing of device 10 or after, based on a plurality of test images, a technician may view the results and determine areas where visual artifacts are present. These same areas may include visual artifacts when in device 10 is in use. The portions having visual artifacts may change for different examples of device 10 (e.g., slightly above, left, right, and/or below). However, by defining a sufficiently large portion, respective ones of GPU 18 may be able to correct for the visual artifacts across different examples of device 10.

GPU 18 may execute one or more instances of a pixel shader for each pixel in the determined portions. The pixel shader may be configured to determine color values for a pixel in the determined portions based on color values determined for the pixels and color values of neighboring pixels.

Accordingly, in the example illustrated in FIG. 4, system memory 30 may configured to store first circular image 48 and second circular image 50. GPU 18, which includes at least one fixed-function circuitry or programmable circuitry, may be configured to overlay first primitives, arranged as first concentric circles, in first circular image 48 stored in system memory 30 onto a first mesh model (e.g., based on texture coordinates buffer 52) to generate a first rectangular image, and overlay second primitives, arranged as second concentric circles, in second circular image 50 stored in system memory 30 onto a second mesh model (e.g., based on texture coordinates buffer 52) to generate a second rectangular image. GPU 18 may blend a portion of the first rectangular image with a portion of the second rectangular image (e.g., bottom border of first rectangular image and top border of second rectangular image for the first algorithm) to generated a stitched rectangular image, and generate image content for display based on the stitched rectangular image.

Figure 5:
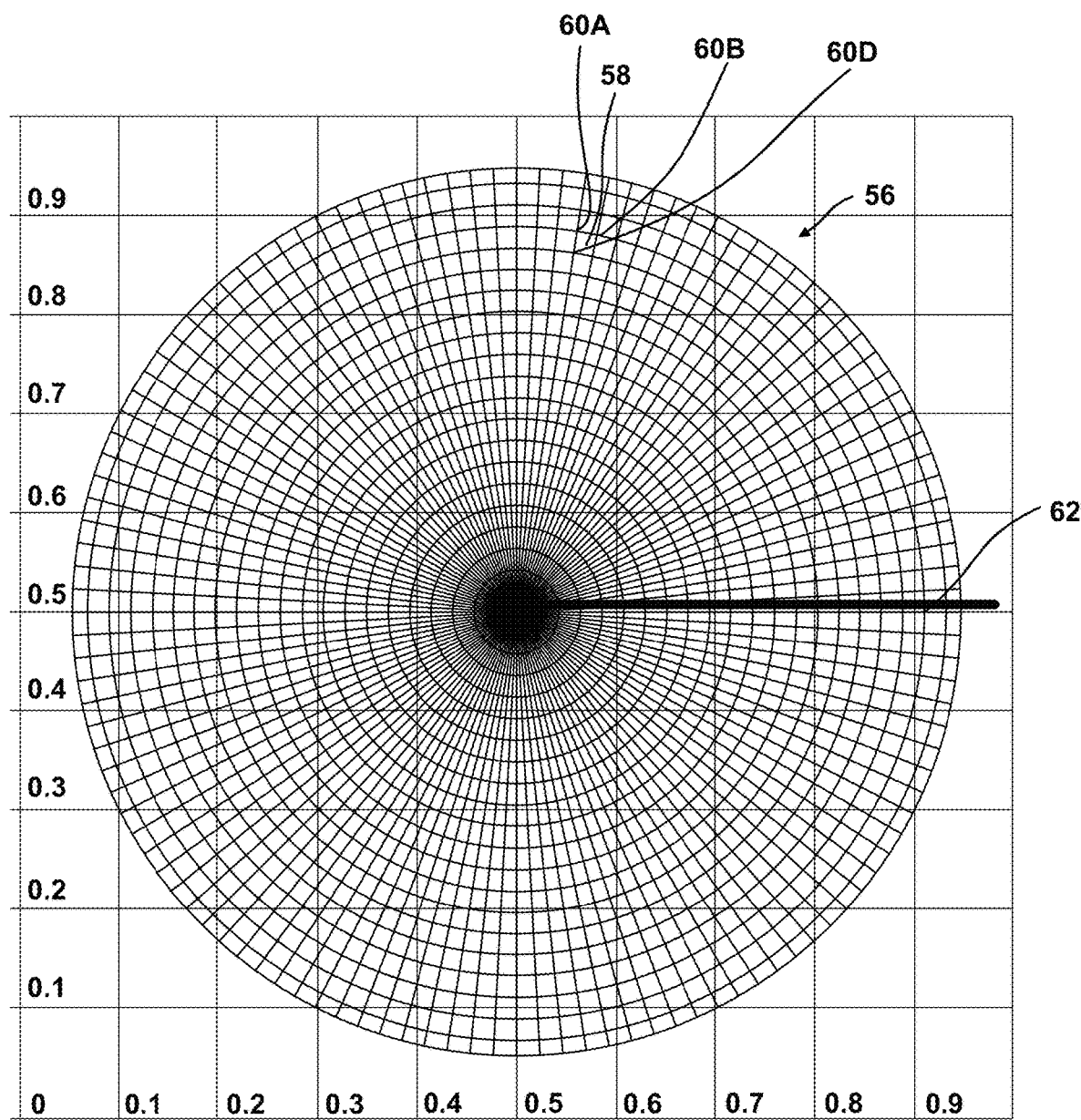
FIG. 5 is a conceptual diagram illustrating an example of two-dimensional (2D) texture coordinates.

FIG. 5 is a conceptual diagram illustrating an example of two-dimensional (2D) texture coordinates. For instance, FIG. 5 illustrates one example of texture map 56 having texture primitives with texture coordinates stored in texture coordinates buffer 52. The texture coordinates may be configured in the pattern illustrated in FIG. 5 (e.g., as blocks of concentric circles in texture map 56). The number of concentric circles in texture map 56, and the size of the primitives in may be pre-defined or defined during operation. Also, the primitives are illustrated as being square-like, but the examples are not limited to such primitives.

For example, FIG. 5 illustrates texture primitive 58, as an illustrative example to assist with understanding. Texture primitive 58 is a quadrilateral, and in this example, square-like. Texture primitive includes four vertices: vertex 60A-60D. Texture coordinates buffer 52 may store the vertex coordinates for vertex 60A-60D for texture primitive 58. Texture coordinates buffer 52 may similarly store vertex coordinates for other primitives, like primitive 58, of texture map 56. In this example, because texture map 56 includes a plurality of concentric circles, the vertex coordinates for vertex 60A-60D of primitive 58 may be defined in polar coordinates.

In some examples, in addition to providing first circular image 48 and second circular image 50, camera processor 14 may output information indicating camera image parameters of lenses 12A and 12B. For example, the camera image parameters may indicate the amount of image content captured by lenses 12A and 12B (e.g., 200-degrees of image content). CPU 16 may utilize the camera image parameters to determine the illustrated texture map 56 (e.g., the positions of vertex 60A-60D, and all other vertices of texture map 56). As an example, memory 30 or a local memory of CPU 16 may store a look-up table that indicates how much image content is captured for different types of lenses and size of images. For example, the look-up table includes lens type information and degrees of image content and size of images captured for each lens type. CPU 16 may compare the information indicating the camera image parameters with information indicating degrees of image content captured and size of images.

Access to the camera image parameters is not necessary in every example. In examples where access to the camera image parameters is not available, CPU 16 may utilize a default texture map 56. Accordingly, the techniques described in this disclosure should not be considered limited to examples where camera image parameters are used.

In some examples, rather than CPU 16 dynamically determining texture map 56 (e.g., such as where all of camera image parameters are not available), various different texture maps may be pre-generated and pre-stored in memory 30. For example, via a trial-and-error process to determine which texture maps result in desirable image quality for different lens types, a user may store different texture maps in memory 30 associated with the different lens types in a look-up table. CPU 16 may utilize this look-up table to determine which texture map to use. In some examples, no camera image parameters may be available, and for such cases, CPU 16 may utilize a default look-up table.

In this disclosure, the generation of texture map 56 may be controlled by application 34 or some other application executing on CPU 16. For instance, operating system (OS) 39 may execute an application that determines texture map 56 in response to a user executing application 34. The other application may then provide information to application 34 indicating which texture map is to be used. As another example, this other application may provide the texture coordinates as inputs to application 34, and in turn, application 34 includes the texture coordinates as inputs to the instructions that the vertex shader is to execute.

FIG. 5 illustrates line 62, which may assist with understanding the first algorithm. Line 62 is a conceptual indicator used to illustrate the relationship between texture map 56 and the mesh models to which the circular images will be overlaid. For example, if texture map 56 were cut at line 62 and fanned open to a rectangle, the result may be one example of the mesh model. For example, primitives residing along the perimeter of texture map 56 may map to a top or bottom border (e.g., based on whether texture map 56 is fanned open from the top or bottom), and the primitives connected to the center of texture map 56 may map to the other border.

Figure 6A:
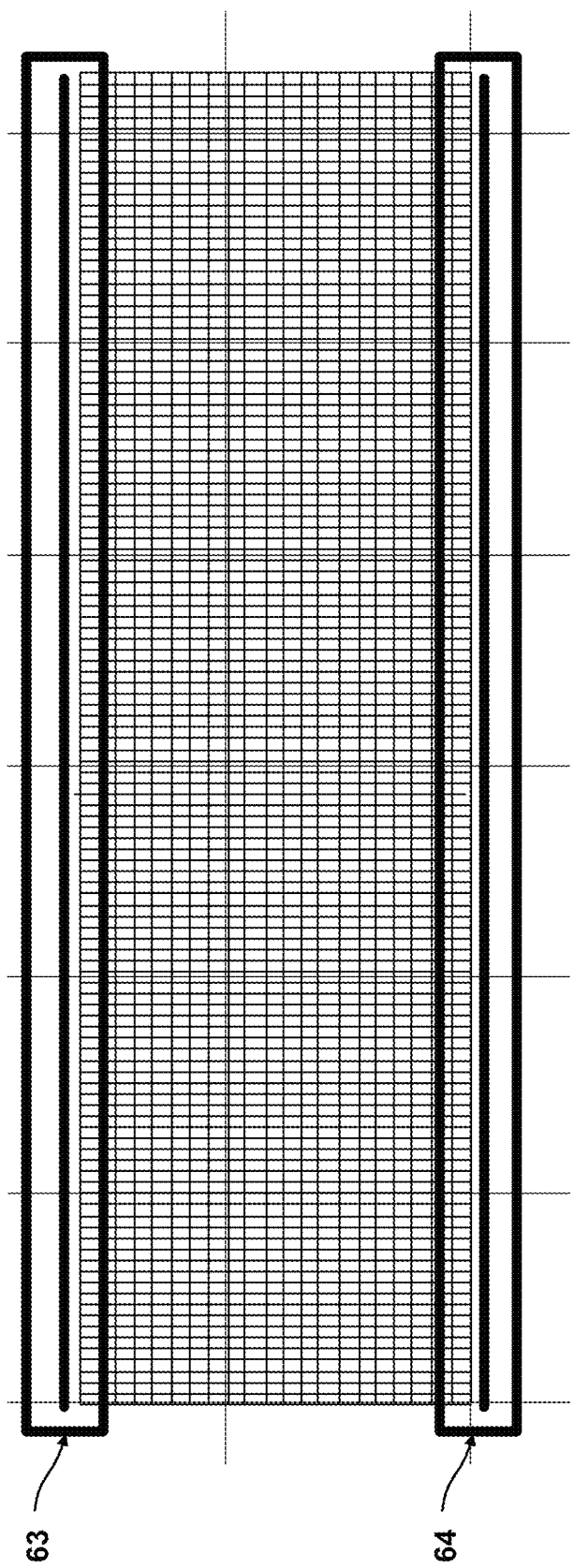
FIGS. 6A and 6B are conceptual diagrams illustrating a mesh model on which image content is mapped.
Figure 6B:
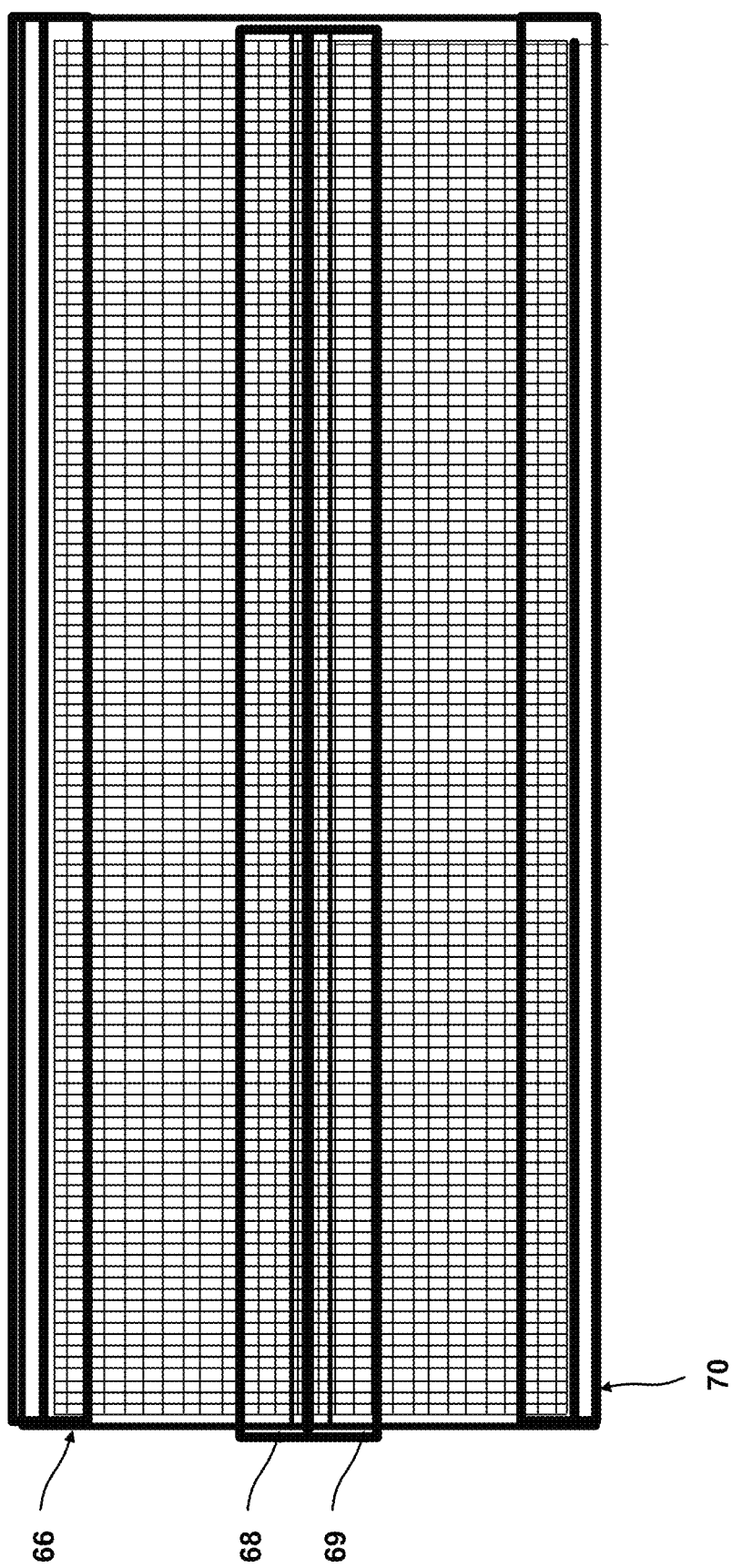

FIGS. 6A and 6B are conceptual diagrams illustrating a mesh model on which image content is mapped. For example, FIG. 6A illustrates a rectangular mesh model where the perimeter of the image content from fisheye lens 12A or 12B maps to the bottom 64, and the center of the image content from the other one of fisheye lens 12A or 12B maps to the top 63. FIG. 6B illustrates a rectangular mesh model where the perimeter of the image content from fisheye lens 12A or 12B maps to the top 69, and the center of the image content from the other one of fisheye lens 12A or 12B maps to the bottom 70. Reference numerals 66 and 68 refer to the perimeter and center of the other of fisheye lenses 12A or 12B. FIG. 6B also illustrates how when a mesh model is placed above the other mesh model, the image content along the perimeter of the fisheye lenses 12A and 12B is next to one another allowing for blending over the overlapping portions. For example, GPU 18 may perform the blending over the bottom 68 and the top 69.

The example illustrated in FIGS. 6A and 6B may be for the first algorithm. For example, overlaying a circular image onto the mesh model illustrated in FIG. 6A or 6B may be the same as converting the polar coordinates of the primitives arranged in concentric circles to a latitude and longitude coordinates. While latitude and longitude coordinates are useful for equirectangular projection, equirectangular projection uses latitude and longitude (0, 0) being at the top-left. However, the latitude and longitude coordinates (0, 0) after the mapping from polar coordinates of primitives arranged in concentric circles may not be at the top-left. Rather, the (0, 0) may be located on the left-middle, meaning that the first and second rectangular images for the first algorithm are 90-degrees rotated in the x-axis relative to the equirectangular projection.

There is a mathematical relationship between primitives arranged in concentric circles and the primitives of the mesh model. As described above, memory 30 may store a table indicating which coordinates in the primitive arranged in concentric circles corresponds to which primitives mesh model, or the CPU 16 may determine which coordinates in the primitive arranged in concentric circles corresponds to which primitives mesh model in run-time. The following describes the mathematical relationship.

The polar coordinates of the texture primitives are given by u, v. The angle theta is normalized is theta/360. The value u equals theta*cos(phi), and the v equals theta*sin(phi). The u and v values are normalized around u=0.5 and v=0.5 using the following equations: u=(u/2.0)+0.5, and v=(v/2.0)+0.5. In these equations, phi equals the x coordinate in the mesh model, and theta equals the y coordinate in the mesh model. The z coordinate in the mesh model is set equal to 0. With this mathematical relationship, for any (u, v) coordinate, CPU 16 or some other device may pre-store (x, y, z) coordinates for the mesh model. Therefore, if system memory 30 stores (u,v) coordinates for the vertices of the texture primitive, system memory 30 may also store the (x, y, z) coordinates that correspond to the (u, v) coordinates that CPU 16 uses to output an instruction to GPU 18 that cause GPU 18 to overlay texture primitives of the circular images on the mesh models.

Figure 7:
FIG. 7 is a pictorial diagram illustrating two rectangular images used to generate an equirectangular image.

FIG. 7 is a pictorial diagram illustrating two rectangular images used to generate an equirectangular image. For example, the top rectangular image in FIG. 7 is the result of GPU 18 textured rendering a first circular image on to a first mesh model to generate a first rectangular image, and the bottom rectangular image in FIG. 7 is the result of GPU 18 textured rendering a second circular image on to a second mesh model to generate a second rectangular image. While the first and second rectangular images may not be correct equirectangular images, they do produce images that are very amenable to feature detection (e.g., similarity detection) and stitching. At the seam 71, there is a similar pixel density (pixel-per-area) because the seam maps to perimeters of the first and second circular images. Stitching via the blending may be more accurate as compared to other techniques.

Figure 8:
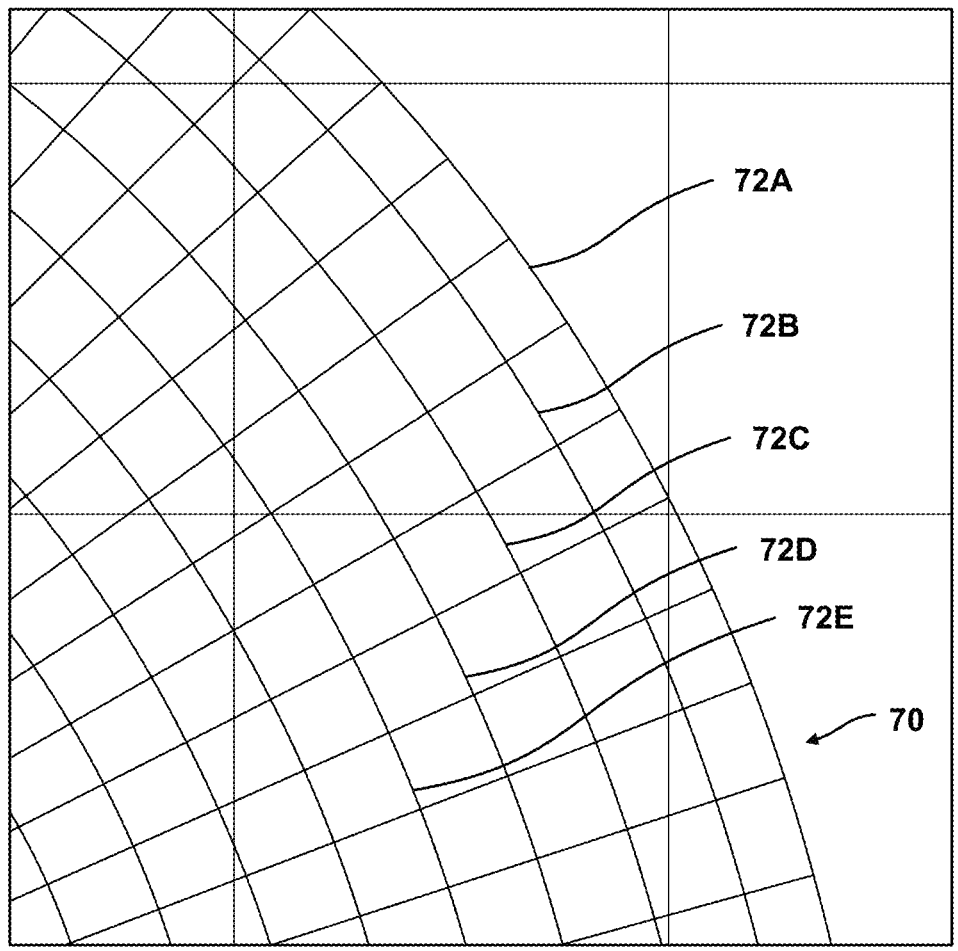
FIG. 8 is a conceptual diagram illustrating zoomed in 2D texture coordinates including a last ring of the 2D texture coordinates.

FIG. 8 is a conceptual diagram illustrating a zoomed in view 70 of 2D texture map 56 of FIG. 5. In particular, FIG. 8 illustrates concentric circles 72A-72E of FIG. 5. There are more concentric circles in texture map 56 than concentric circles 72A-72E, and in some examples, there may be fewer concentric circles. Therefore, the discussion of concentric circles 72A-72E is provided for purposes of discussion only.

In the example illustrate in FIG. 8, the last "circle" of texture map 56, as illustrated in zoomed in view 70, is circle 72A. In the illustrated example, the width of circle 72A is less than the width of circle 72B-72E. Circles 72A-72E include a plurality of texture primitives (similar to primitive 58) arranged in a circle, and a plurality of circles may be ordered concentrically. The texture coordinates may be the vertices (like vertex 60A-60D) of these circles.

In some examples, each one of circles 72A-72E (e.g., all of the circles of texture map 56) include circles having the same width. However, as noted above, in some examples, circle 72A has a shorter width relative to the other circles.

All circles 72A-72E except the last circle 72A do not have to be same length, and in some examples, it is possible for the last circle 72A to not necessarily be less wide than all other circles 72B-72E. For example, one of circles 72B-72D in the example of FIG. 8 may be the least wide circle instead of circle 72A. Circle 72A may be kept at a relatively small width. However, keeping circle 72A at a relatively small width may not be necessary in all examples. Also, one or more of the last circles (e.g., outer circles) may be smaller than earlier lengths (e.g., 72A is smaller than 72B-72E; 72B is smaller than 72C-72E; 72C is smaller than 72D and 72E, and so forth).

Figure 9:
FIG. 9 is a pictorial diagram illustrating image content.

FIG. 9 is a pictorial diagram illustrating image content 74. Image content 74 is part of a circular image that one of fisheye lens 12A or 12B would generate. For example, image content 74 is a zoomed in version of the circular image that one of fisheye lens 12A or 12B would generate. As described above, at the edges of the circular image (e.g., perimeter or circumference of the circular images) appear to be compressed relative to other parts of the circular image. For instance, compression portion 76 includes content of image content 74 that appears more compressed relative to other portions of image content 74. The example techniques described in this disclosure account for compression portion 76. For instance, as part of the texture mapping, GPU 18 stretches compression portion 76 to that the image content is no longer compressed.

In the example illustrated in FIG. 8, a given camera lens field of view of 200 degrees may be shortened to be 23% shorter than others (e.g., the width of circle 72A is 23% less than the width of circle 72B-72E). The 3D positions of these points (e.g., image pixels that correspond to the texture) retain their 3D spacing, and may not be compressed. This causes stretching of compressed areas, compensating for compression portion 76.

For example, in the images captured by lenses 12A and 12B, the edges of the images appear compressed (e.g., as illustrated by compression portion 76). In the 360-degree video, the compressed image content may negatively impact viewer experience. By reducing the size of the outer circles, the number of pixels in outer circles is reduced relative to the other circles. However, the positions of these points that fall within the circles having the reduced size retain their spacing. When these points are rendered, the rendering causes the points to stretch out and overcome the compression that occurs from the way the image is captured.

Figure 10:
FIG. 10 is a pictorial diagram illustrating a relationship between texture coordinates and image pixels.

FIG. 10 is a pictorial diagram illustrating a relationship between texture coordinates and image pixels. For instance, FIG. 10 illustrates image portion of image content 74 of FIG. 9 with texture coordinates of texture map 56 on-top-of image portion of image content 74. As described above, the texture coordinates (e.g., texture coordinates of vertex 60A-60D) define texture primitives, where the texture primitives are primitives of the circular image. Image content 74 of FIG. 10 may be considered as illustrating one of first circular image 48 or second circular image 50, and the texture primitives formed by texture map 56 on-top-of image content 74 are the texture primitives that texture hardware circuit of GPU 18 overlays on the mesh model to generate a first rectangular image or a second rectangular image.

The following describes some of the operations that may be performed to pre-store information indicating which texture vertex corresponds to which mesh vertex. For all texture coordinate circles except for the last circle, a constant value may be used for the primitive width. For the last circle, the radius increment is reduced by a certain factor. This "last radius increment" is determined visually, manually, for a given fisheye lens and depends on the field of view of the fisheye lens. For a 200-degree field of view lens, a value of approximately 0.77 was found to be appropriate. This value may be used to automatically determine appropriate values for different lenses based on known field of view.

Scale is used to adjust the radius. The radius may need to be reduced to avoid using pixels that may be undesirable. Undesirable pixels may be due to extreme compression, lack of detail, chromatic aberration, occlusion by camera body, or other reasons. This scale factor for a 200-degree field of view lens was manually found to be 0.954. Other values may be manually determined for other lens configurations, and used to extrapolate values for any lens. The values may be stored in a look-up table and selected based on parameters of lenses 12A and 12B, may be pre-generated and stored, or may be user selected as well.

Vertex positions in the mesh model are calculated in the same order and as the texture coordinates are calculated; therefore the 1 to 1 correspondence is available. The connecting of the vertices is done by connecting neighboring vertices in a given circle together, along with the 2 corresponding vertices in the next adjacent circle of larger radius. These 4 vertices create a polygon in the mesh model.

The above was described with respect to manual adjustment to generate a texture map similar to that of FIG. 5. However, in some examples, CPU 16 or some other device may generate a texture map based on the camera parameters of lens 12A and 12B. For example, CPU 16 or some other device may use a black and white checkerboard and a process described in Scaramuzza, "OCamCalib: Omnidirectional Camera Calibration Toolbox for Matlab," the contents of which are incorporated by reference in their entirety to determine a "calibrated" texture map, versus the manual adjusted texture map illustrated in FIG. 5.

The calibrated texture map may be similar to the manual adjusted texture map illustrated in FIG. 5 (e.g., texture map 56). However, the width of the rings of the calibrated texture map may differ than those illustrated in texture map 56 of FIG. 5. For example, the width of some of the inner rings may be wider or narrower than the width of some of the outer rings. As an example, in the calibrated texture map, it may be possible for an outer ring to be wider than an inner ring. In general, in the calibrated texture map, the width of the rings may vary (e.g., some may be relatively narrower and some may be relatively wider). In examples, where a calibrated texture map is generated, the texture coordinates for the calibrated texture map may be stored in texture coordinates buffer 52 of memory 30, and used similar to texture map 56 illustrated in FIG. 5.

Figure 11:
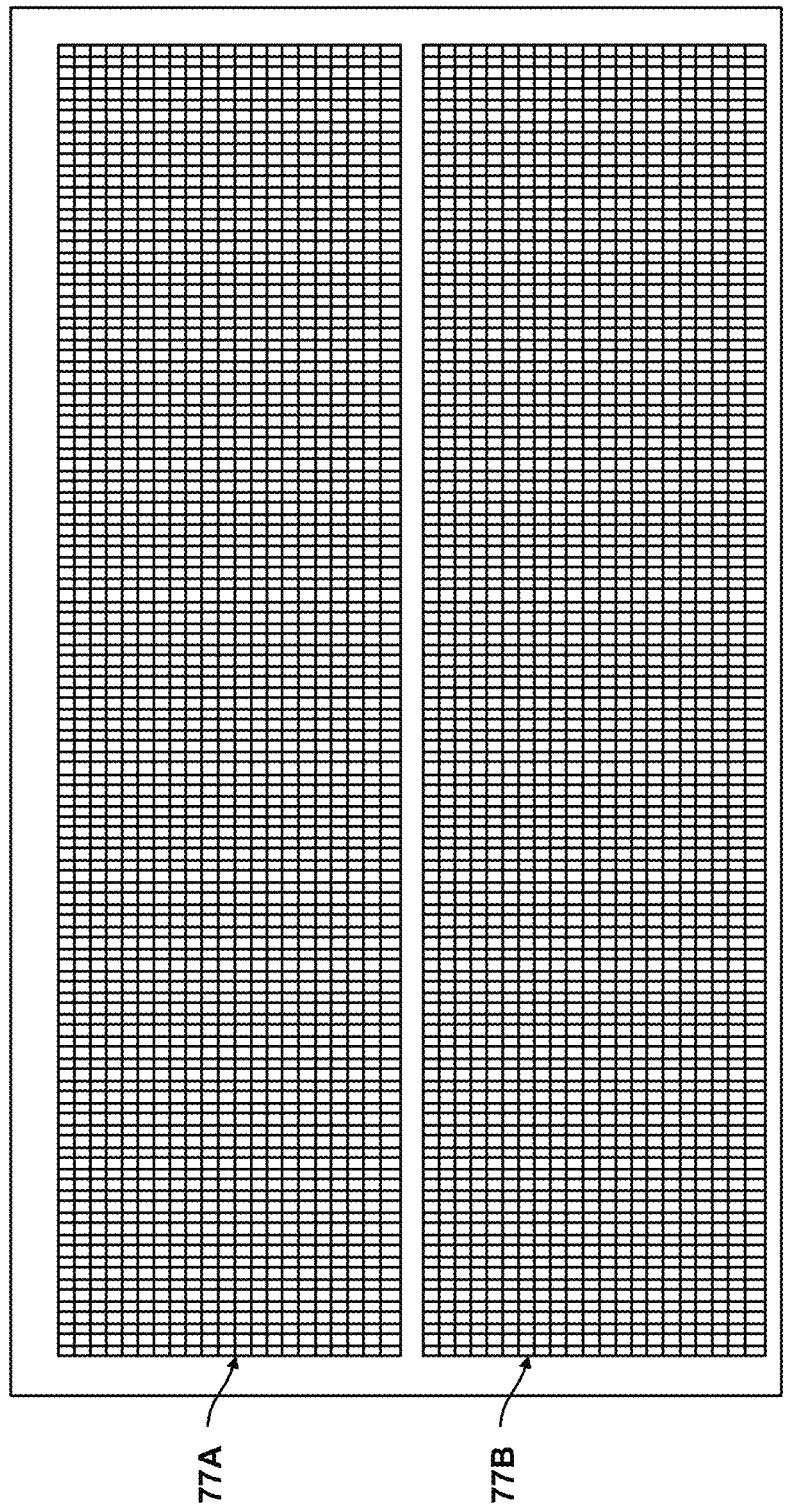
FIG. 11 is a conceptual diagram illustrating two mesh models.

FIG. 11 is a conceptual diagram illustrating two mesh models. For example, FIG. 11 illustrates mesh model 77A and mesh model 77B. Mesh model 77A and 77B may have a rectangular shape, and are similar to the mesh models illustrated in FIGS. 6A and 6B. For example, for the first algorithm, to overlay first primitives, arranged as first concentric circles, in the first circular image onto mesh model 77A, GPU 18 may textured render polar coordinates of the first primitives of the first circular image located along a perimeter of the first circular image to a bottom border of the first mesh model, and textured render polar coordinates of primitives of the first circular image located connected to the center of the first circular image to a top border of the first mesh model to generate the first rectangular image. A bottom border of the first rectangular image is the bottom border of the first mesh model after the texture rendering.

Similarly, to overlay second primitives, arranged as second concentric circles, in the second circular image onto mesh model 77B, GPU 18 may textured render polar coordinates of the primitives of the second circular image located along a perimeter of the second circular image to a top border of the second mesh model, and textured render polar coordinates of primitives of the second circular image located connected to the center of the second circular image to a bottom border of the second mesh model to generate the second rectangular image. A top border of the second rectangular image is the top border of the second mesh model after the texture rendering.

Figure 12:
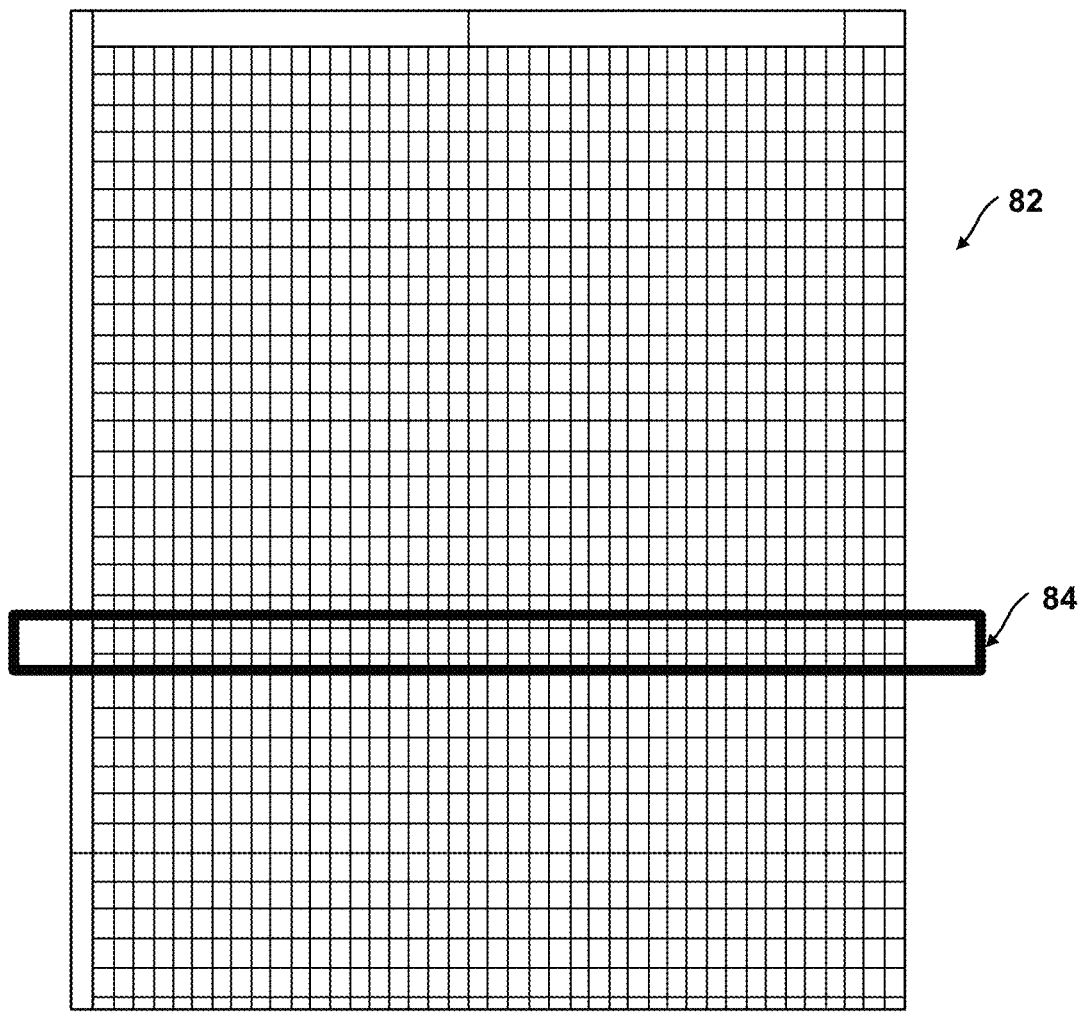
FIG. 12 is a conceptual diagram illustrating overlap between the two portions of FIG. 11.

FIG. 12 is a conceptual diagram illustrating overlap between the two portions of FIG. 11. For example, GPU 18 may stitch the first rectangular image generated from mesh model 77A and the second rectangular image generated from mesh model 77B to generate a stitched rectangular image 82 of FIG. 12. In generating stitched rectangular image 82, GPU 18 may have blended portions along bottom border and portions along the top border of the first and second rectangular images, respectively. For instance, the portions along bottom border of the first rectangular image and portions along the top border of the second rectangular image may include substantially the same image content. Accordingly, when stitching the first rectangular image and the second rectangular image, portions along the bottom border of the first rectangular image overlap with portions along the top border of the second rectangular image. In the example illustrated in FIG. 12, overlap region 84 is illustrated as the first rectangular image generated from mesh model 77A overlapping the second rectangular image generated from mesh model 77B. Overlap region 84, as illustrated in FIG. 12, may be used for blending and alignment of the two fisheye images.

Figure 13:
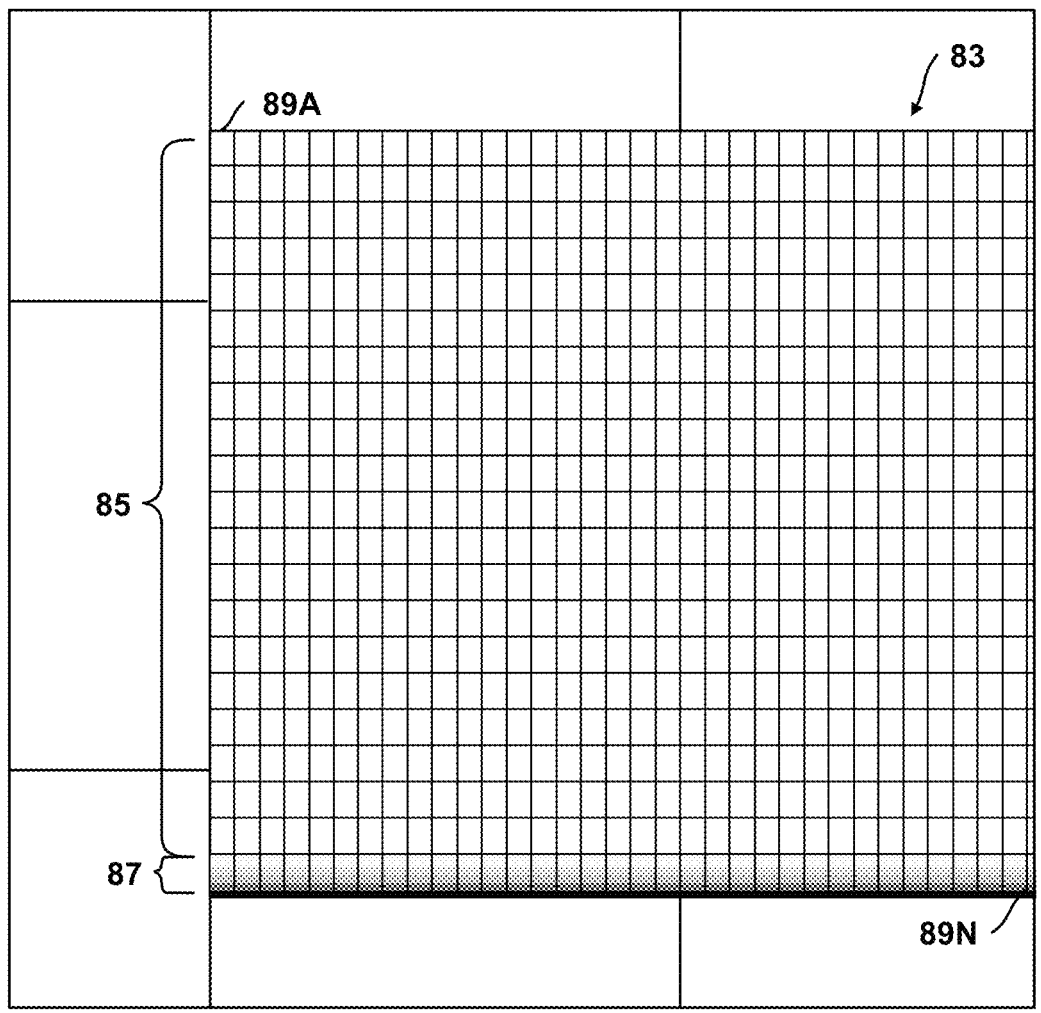
FIG. 13 is a conceptual diagram illustrating a mask used for the 360-degree images.

FIG. 13 is a conceptual diagram illustrating a mask 83 used for rendering the 360-degree video. The mask 83, such as illustrated in FIG. 13, may be used to assign blending factors used for blending the first and second rectangular images. GPU 18 may generate a very precise mask by rendering a color per vertex disk, where GPU 18 may use texture hardware circuit to perform such operations.

For example, the primitives 89A-89N of mask 83 may be same as the primitives of mesh model 77A or 77B (e.g., mesh model 77A in this example). Primitives 89A-89N of mask 83 are located in the same position as the primitives of the first rectangular image or the second rectangular image because the first rectangular image or the second rectangular image primitives are defined by primitives of mesh model 77A or 77B. Therefore, mask 83 may be a very accurate mask for assigning blending factors. Because the texture coordinates define the relationship of the geometry to pixels, this blending mask 83 will be very accurate.

In the example illustrated in FIG. 13, mask 83 includes two mask regions: first mask region 85 and second mask region 87. The values of the mask ranges from 0 (transparent) to 1 (opaque). In the example illustrated in FIG. 13, a value of 1 may be considered as white and a value of 0 may be considered as black. Again, FIG. 13 is not illustrating an actual image that is rendered, but instead what the mask would appear like if rendered.

As illustrated, in the first mask region 85, the color is white. This is because none of the image content of a first rectangular image or a second rectangular image will be blended in the first mask region (e.g., the image content is opaque). In the second mask region 87, however, the color gradually changes from white, to gray, to dark gray, and then to black. In this example, in the second mask region 87, as the region gradually changes to black, more and more blending occurs with the other portion (e.g., in areas where the value of the second mask region is 0.5, there is equal contribution from the first rectangular image and the second rectangular image in blending the image content).

Figure 14A:
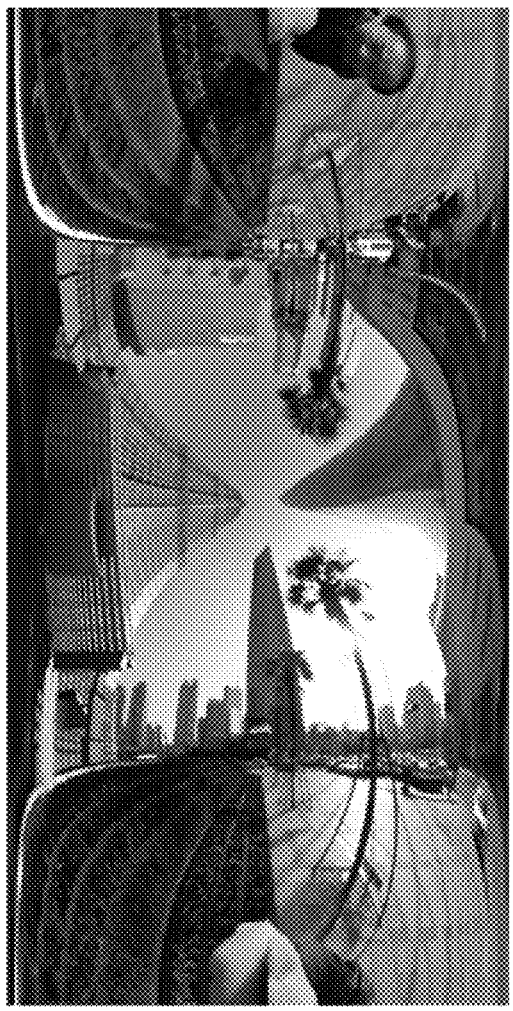
FIG. 14A is a resulting image from stitching of two rectangular images.

FIG. 14A is a resulting image from stitching of two rectangular images. For example, if the rectangular images illustrated in FIG. 7 were stitched together, the result would be the example illustrated in FIG. 14A. However, while the result may be a flat image, the (0, 0) latitude and longitude values are not at the top-left, and instead at the middle-left.

Figure 14B:
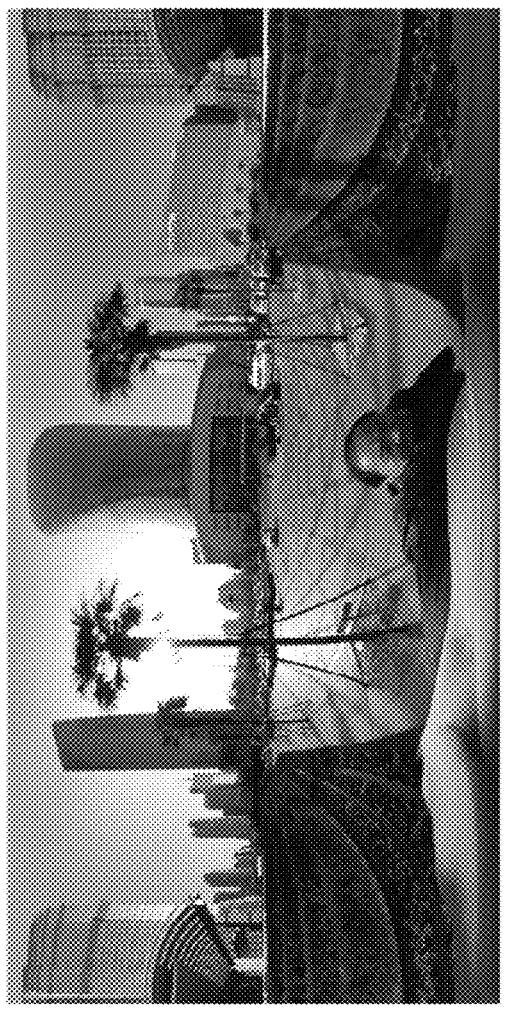
FIG. 14B is an equirectangular image from rotation applied to the image of FIG. 14A.

FIG. 14B is an equirectangular image from rotation applied to the image of FIG. 14A. For example, the image in FIG. 14B is a proper equirectangular image because the (0, 0) latitude, longitude value is at the upper-left corner.

One example way to rotate the image illustrated in FIG. 14A to generate the image illustrated in FIG. 14B is to perform the following operations. Utilize the coordinates in the intermediate image (e.g., image in FIG. 14A) as polar coordinates, convert the polar coordinates to Cartesian coordinates, rotate by 90-degrees around the x-axis, convert result from Cartesian coordinates back to polar coordinates, and set the x, y, z values accordingly.

For instance, to convert from polar to Cartesian, the equations may be x=radius*cos(phi)*sin(theta), y=radius*sin(phi)*sin(theta), and z=radius*cos(theta). The equations to rotate in the x-axis may be x=x, y=y*cos(angle)−z*sin(angle), and z=y*sin(angle)+z*cos(angle). The equations from Cartesian to spherical may be radius=sqrt(x*x+y*y+z*z), phi=atan(y/x), and theta=acos(z/radius).

However, the cost to perform all of the trigonometric functions may be too large. Accordingly, in some examples, rather than performing the trigonometric functions, memory 30 may store a table that indicates the (x, y, z) coordinates for the equirectangular image that correspond to the (x, y, z) coordinates for the intermediate image (e.g., image illustrated in FIG. 14A). For example, during manufacture or in operation, a processing circuitry may implement the equations above to rotate an intermediate rectangular image 90-degrees (e.g., for each coordinate in the intermediate rectangular image, the processing circuitry outputs a coordinate in the equirectangular rectangular image). Memory 30 may store a table that provides the corresponding coordinates based on the above calculations to convert from the intermediate rectangle to the equirectangular rectangle. GPU 18 may perform textured rendering to map primitives from the intermediate image to a mesh model used to convert the intermediate image to an equirectangular image.

FIG. 15 is a conceptual diagram illustrating mesh model used to convert the image of FIG. 14A to generate the image of FIG. 14B. For example, the left side of FIG. 15 illustrates primitives for an intermediate image, and the right side of FIG. 15 illustrates primitives that are 90-degrees rotated in the x-axis relative to corresponding primitives in the left side of FIG. 15. To rotate image content of the stitched rectangular image (e.g., image of FIG. 14A also referred to as intermediate image), GPU 18 may textured render the stitched rectangular image on a third mesh model, where the third mesh model includes primitives having vertex coordinates that are same as vertex coordinates of primitives in the blended rectangular image rotated along the x-axis by 90-degrees.

Figure 16:
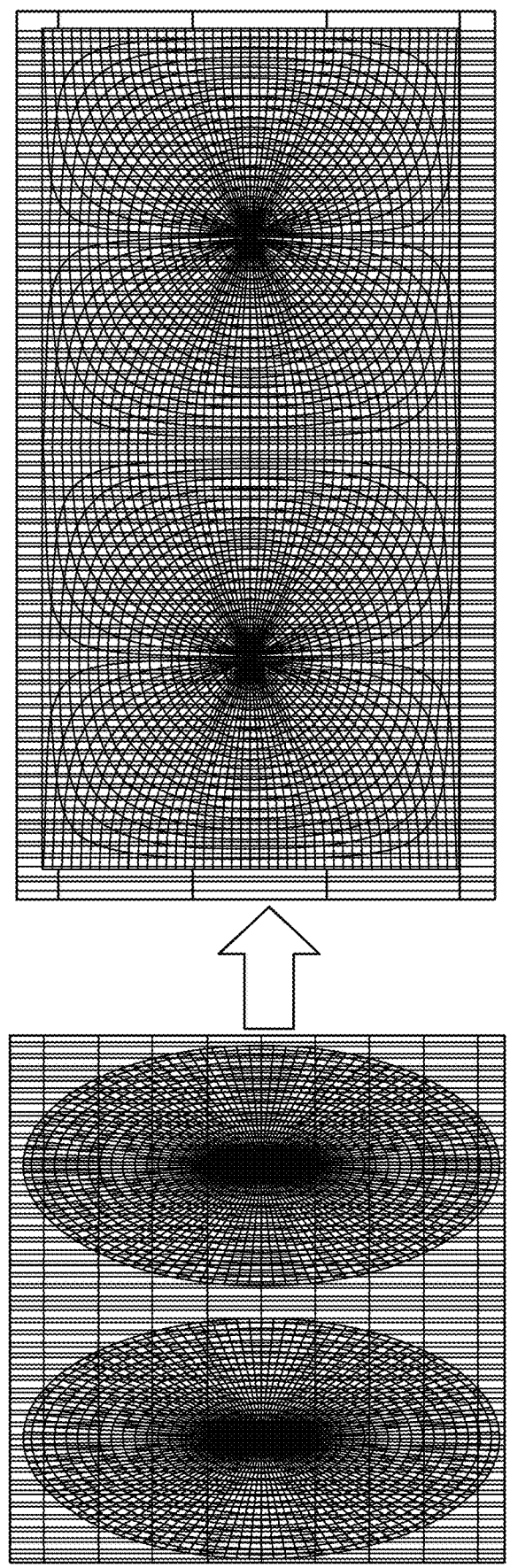
FIG. 16 is a conceptual diagram illustrating mesh models to convert directly to equirectangular projection.

FIG. 16 is a conceptual diagram illustrating mesh models to convert directly to equirectangular projection. As described, for the first algorithm, GPU 18 first generates an intermediate image and then rotates the intermediate image to generate the equirectangular image. To perform such operations, the above described equations form the mathematic relationship to determine which x, y, z coordinates correspond to which u, v coordinates (e.g., the value u equals theta*cos(phi), and the v equals theta*sin(phi), and phi equals x, and theta equals y). The above also described the equations to convert from the intermediate image to the equirectangular image (e.g., the above equations to convert from polar to Cartesian, rotate in x-axis, and convert back to polar).

In some cases, rather than first converting coordinates from primitives in concentric circles to intermediate image and then to equirectangular image, it may be possible to combine the above equations to convert (u, v) coordinates of the primitives in concentric circles directly to x, y, z coordinates of the equirectangular image. For example, if the equations for converting from u, v to intermediate image are combined with the equations to convert from intermediate image to equirectangular image, then the result may be one set of equations to directly convert from u, v coordinates to the x, y, z coordinates for the equirectangular image.

In this example, the vertices on the primitives arranged in concentric circles that correspond to vertices on the equirectangular image may have been pre-computed and stored. For example, FIG. 16 illustrates the mesh model to which GPU 18 may textured render a first circular image to directly generate a first equirectangular image. GPU 18 may similarly textured render a second circular image to directly generate a second equirectangular image. GPU 18 may blend the first and second equirectangular images to generate a stitched equirectangular image. In this way, GPU 18 may perform the second algorithm that bypasses the generating of an intermediate image.

Figure 17:
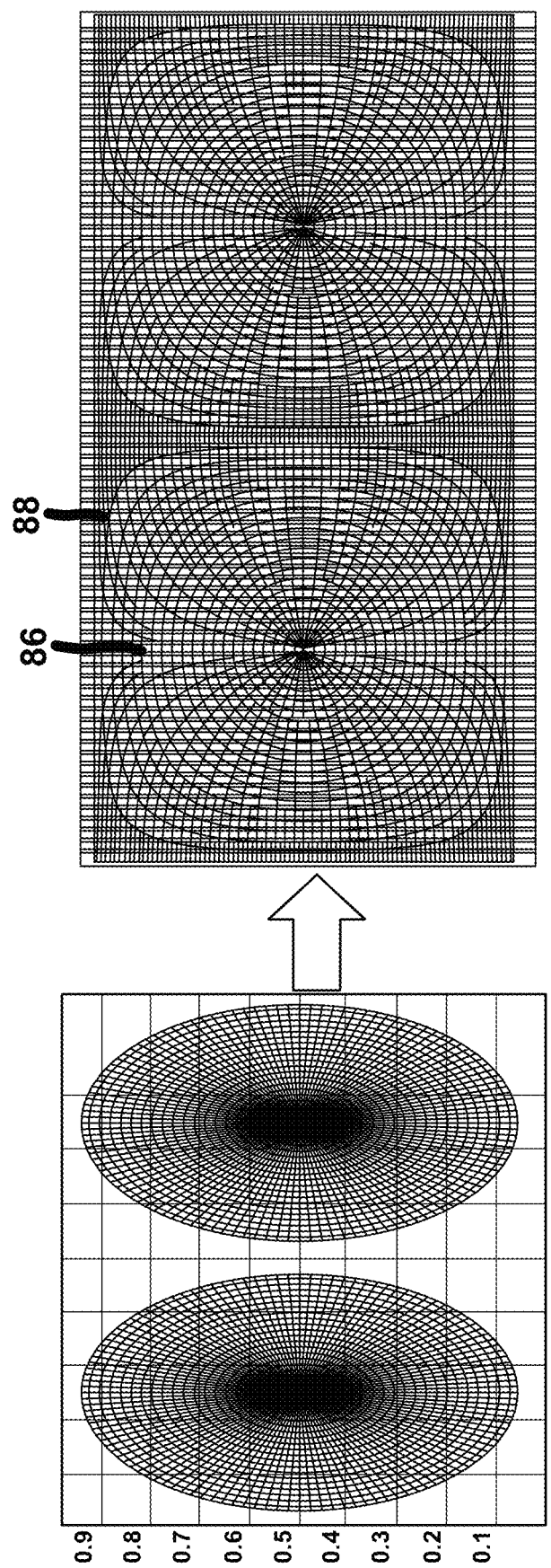
FIG. 17 is a conceptual diagram illustrating mesh models to convert directly to equirectangular projection with non-uniform angular spacing.

FIG. 17 is a conceptual diagram illustrating mesh models to convert directly to equirectangular projection with non-uniform angular spacing. In the examples of the first and second algorithms, the primitives in the mesh model each represent the same angular distance. However, as described above, by varying the angular distance (e.g., size) of groups of primitives, it may be possible to reduce the amount of processing that GPU 18 needs to perform.

In FIG. 17, the mesh model illustrated in FIG. 16 to directly convert to equirectangular images is illustrated. However, the angular distance of primitives in the example illustrated in FIG. 17 is non-uniform. For instance, FIG. 17 illustrates area 86 and area 88. When comparing area 86 to a corresponding area in FIG. 16, area 86 is illustrated as having a lower primitive density (e.g., number of primitives per unit area). Similarly, when comparing area 88 to a corresponding area in FIG. 16, area 88 is illustrated as having a lower primitive density. Also, the primitive density between area 86 and area 88 is different. Therefore, FIG. 17 illustrates a mesh model, where primitives of the mesh model are located in a plurality of areas. The angular distance of primitives in a first area (e.g., area 86) is different than the angular distance of primitives in a second area (e.g., area 88).

As described above, one possible effect of having primitives with different angular distances is potentially reducing the amount of computing. However, the image quality for portions of the first equirectangular image that correspond to areas with lower primitive density may be lower than the image quality for portions of the first equirectangular image that correspond to areas with higher primitive density. Also, the image quality for portions of the second equirectangular image that correspond to areas with lower primitive density may be lower than the image quality for portions of the second equirectangular image that correspond to areas with higher primitive density.

If CPU 16 selects areas having lower primitive density, which results in lower image quality, for areas with low viewer interest, and selects areas having higher primitive density, which results in higher image quality, for areas with high viewer interest, GPU 18 may generate the equirectangular image in less time with minimal impact on viewer experience. In this way, CPU 16 and GPU 18 may perform the third algorithm where the angular distance of the primitives is non-uniform.

Figure 18:
FIG. 18 is a pictorial diagram illustrating distortion in conversion to equirectangular projection.

FIG. 18 is a pictorial diagram illustrating distortion in conversion to equirectangular projection. In the first, second, and third algorithms, GPU 18 may perform the above operations on a per-vertex basis. FIG. 18 is a pictorial diagram illustrating a result from per-vertex calculations. Per-vertex calculations can save on computation processing costs and can run faster as compared to pixel-by-pixel processing. However, per-vertex calculations produce visual artifacts at extreme image sampling situations. There can be extreme stretch and shearing in texture coordinates, which causes uneven pixel sampling, or pinched geometry causes a different texture sampling artifact. Boxes 91A and 91B in FIG. 18 illustrate portions where there are visual artifacts.

Because per-vertex operations may result in unwanted artifacts in the images, in some examples, GPU 18 may perform the above operations on a per-pixel basis. However, this is more computationally intensive. The computations may involve five cosines, four sines, one arctangent, and one square root, per pixel.

Figure 19:
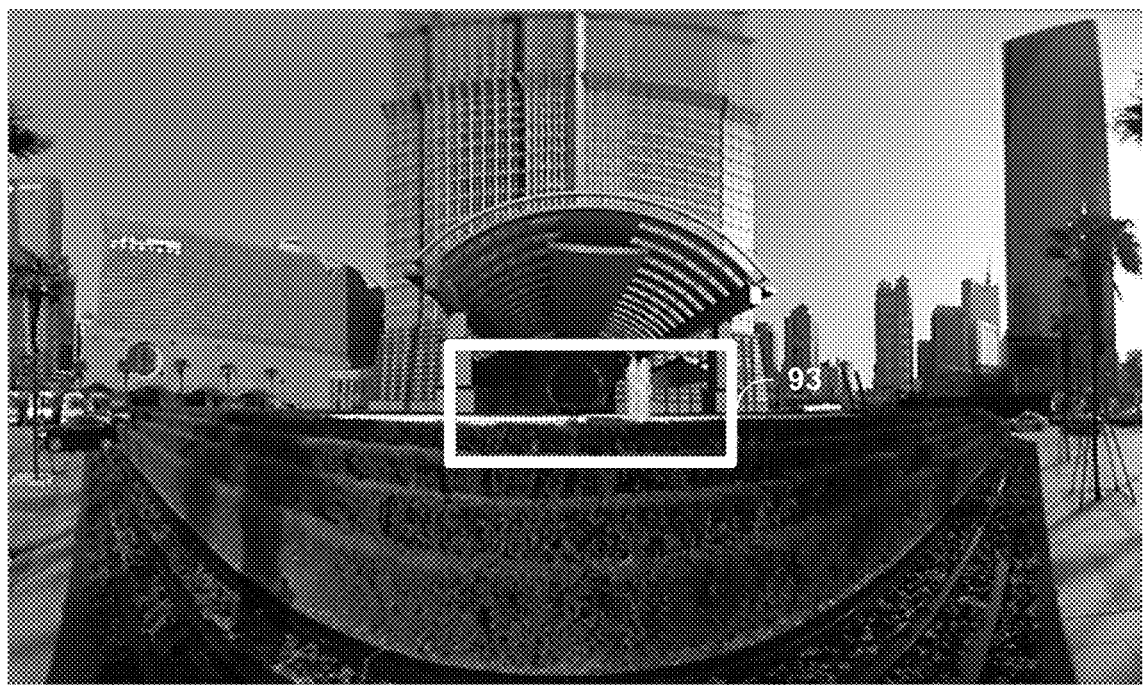
FIG. 19 is a pictorial diagram illustrating result from per-pixel correction of an area with distortion.

In some examples, GPU 18 may combine the two techniques and perform per-vertex correction for correction at the primitive level and perform per-pixel correction at the pixel level. FIG. 19 is a pictorial diagram illustrating a result from per-vertex and per-pixel correction (shown for half of the image relative to FIG. 18). Such an approach results in higher performance, without artifacts. For instance, GPU 18 may compute overall image per-vertex, and compute problem areas per pixel. For example, for portions identified by CPU 16 that need further processing (e.g., the portion in the white box 93 illustrated in FIG. 19), GPU 18 may execute pixel shaders to determine color values for pixels in the portion based at least on color values of neighboring pixels (e.g., based on color values determined for the pixels and color values of neighboring pixels). As illustrated by box 93, execution of the pixel shader for the pixels in box 93 may correct for visual artifacts that may be present such as in boxes 91A and 91B in FIG. 18.

Figure 20A:
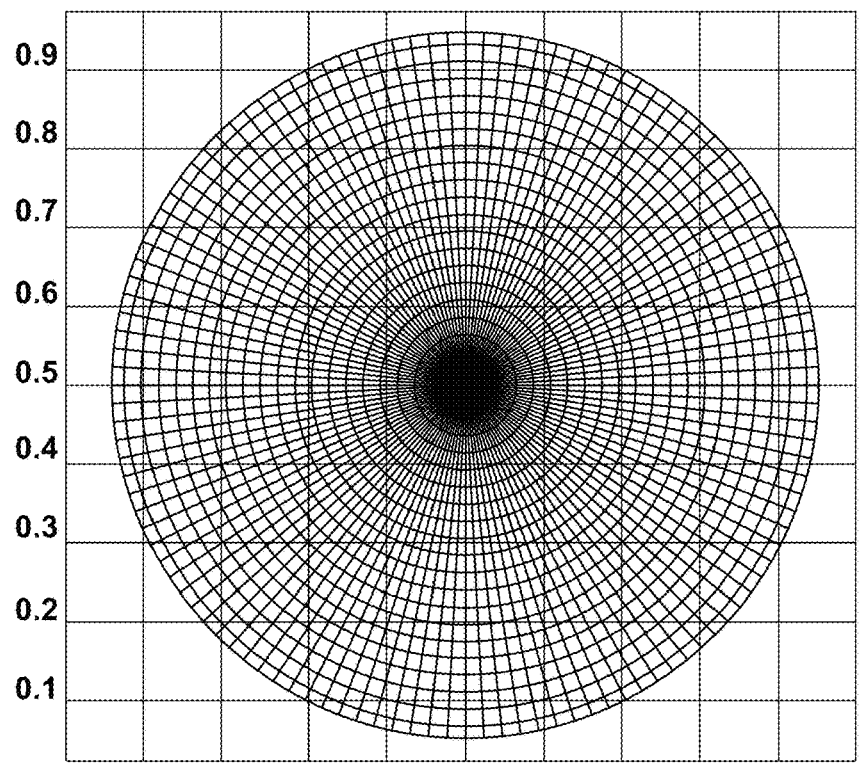
FIG. 20A is a conceptual diagram illustrating an example of two-dimensional (2D) texture coordinates, similar to FIG. 5.
Figure 20B:
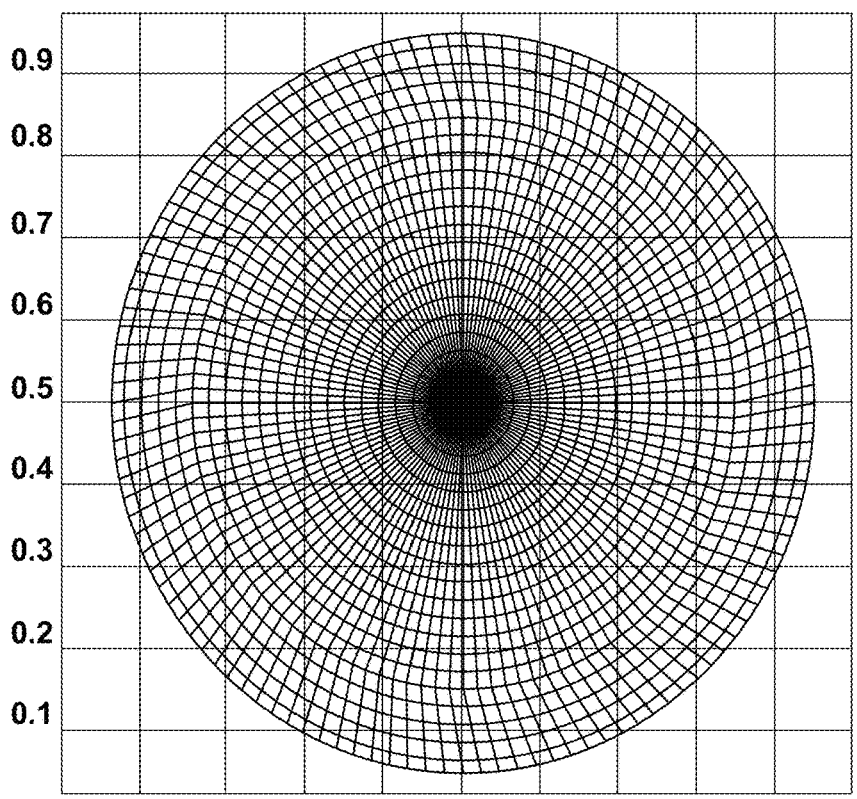
FIG. 20B is a conceptual diagram illustrating an example of 2D texture coordinates of one or more primitives of FIG. 20A adjusted by 3-degrees.
Figure 20C:
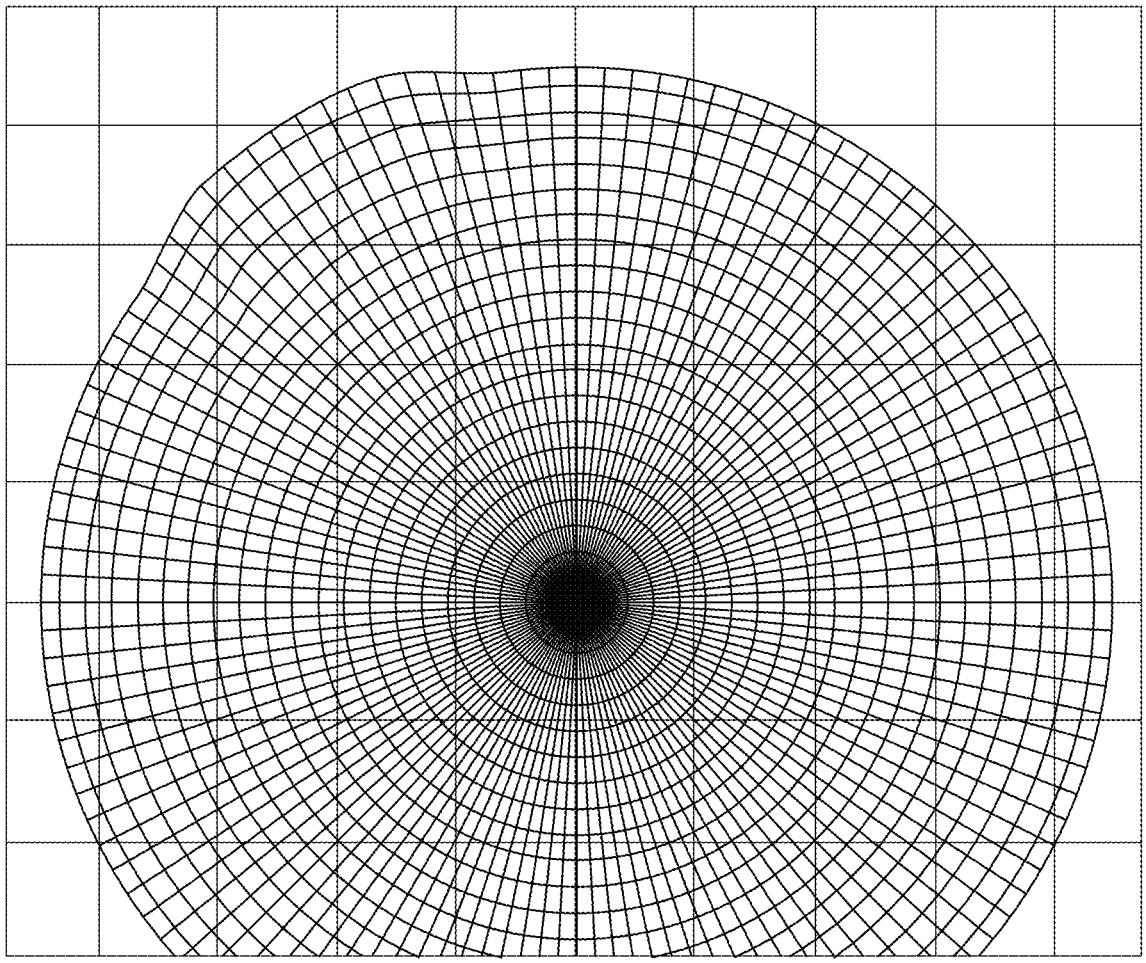
FIG. 20C is a conceptual diagram illustrating an example of 2D texture coordinates of one or more primitives of FIG. 20A pulled out by 5%.

FIG. 20A is a conceptual diagram illustrating an example of two-dimensional (2D) texture coordinates. The example in FIG. 20A may be similar to that of FIG. 5. As described above, if, prior to the blending, GPU 18 determines that there is not similarity where the first and second rectangular images are aligned, then CPU 16 may adjust primitives, such as along one or more rings near the perimeter. FIG. 20B is a conceptual diagram illustrating an example of 2D texture coordinates of one or more primitives of FIG. 20A adjusted by 3-degrees. FIG. 20C is a conceptual diagram illustrating an example of 2D texture coordinates of one or more primitives of FIG. 20A pulled out by 5%.

System memory 30 may store the vertex coordinates for the texture maps illustrated in FIGS. 20A-20C. CPU 16 and GPU 18 may first start with the texture map illustrated in FIG. 20A. If, prior to blending, GPU 18 determines that the first and second rectangular images are not aligned, CPU 16 may adjust the size or shape of primitives in the concentric circles. One way to adjust the size or shape is to use a different texture map. GPU 18 may repeat the operations and if alignment of overlapping region is within similarity threshold, GPU 18 may proceed with the rest of the operations. GPU 18 may keep repeating these operations until the alignment of overlapping region is within similarity threshold.

The above examples may be considered as performing image-based stitching or blending. However, in some examples, CPU 16 and/or GPU 18 may perform calibration-based stitching or blending. For instance, in calibration-based stitching or blending, during manufacturing, a test machine or some other device may determine calibration parameters for the first and second cameras. The calibration parameters may be indicative of the position of the second camera relative to the first camera, and examples of the calibration parameters include pan, tilt, and roll (Y-rotation, X-rotation, and Z-rotation) and/or shift. The calibration parameters may be camera calibration information produced during the camera manufacturing and/or assembly process.

For instance, in the above examples, the positions of the cameras that include lenses 12A and 12B may be considered as being such that the cameras are oriented back-to-back. However, the example techniques are not so limited. The following describes example techniques that may be performed in combination or separately with the above example techniques to address the situation where the cameras may not be exactly oriented back-to-back. For example, the cameras may be fixed in non-ideal orientations as a result of manufacturing tolerances, or may have moved away from ideal orientations after manufacturing (e.g., due to active user control or manipulation or due to passive movements such as shocks, bumps etc.)

Each of the cameras in which lenses 12A and 12B, respectively, reside may be coupled back-to-back. Each camera includes a lens (e.g., one of lenses 12A or 12B) plus an image sensor, which may include a chip on a mini PCB board and captures the pixels. In some examples, the movement of the cameras refers to the whole camera (e.g., lens and sensor) being rotated or shifted (e.g., about one axis or multiple axes). The lenses may be bolted onto the camera body. In some examples, the image sensors may be rotated relative to each other.

Figure 37:
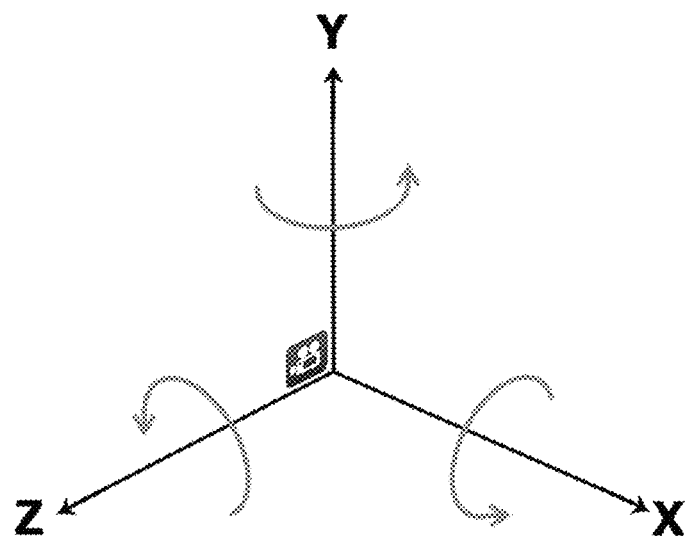
FIG. 37 is a conceptual diagram illustrating pan, tilt, and roll of a camera device around different axes.

Pan, tilt, and roll are examples of camera rotations along different optical axes. An example of the pan, tilt, roll are illustrated in FIG. 37.

There may be various reasons for the rotation between the cameras. As one example, it may not be feasible for the cameras to line up perfectly during manufacturing. There may be tolerance ranges for the rotation along each of the optical axes (e.g., pan, tilt, and roll). Therefore, although the cameras may be connected correctly, they may not be precisely back-to-back, but with some rotation about one or more axes relative to one another (e.g., a vendor may need to meet a tolerance within certain rotation). As another example, there may be shifting in the screws or bolts that hold the cameras, causing possible rotation about one or more axes. This disclosure describes example techniques to compensate for the variances in the rotations of the cameras.

For example, in a dual fisheye camera system, each camera (e.g., one for lens 12A and other for lens 12B) can be rotated about an X, Y, and/or Z axis relative to each other. X-rotation refers to tilt, Y-rotation refers to pan, and Z-rotation refers to roll. In examples where the fisheye cameras rotate, the cameras may be back-to-back, as illustrated in FIG. 1, but the techniques are not so limited. In order to stitch the two circular fisheye images, and minimize seam, this XYZ rotation may need to be accounted for. In some examples, the compensation for the rotation may be performed using texture coordinates in a 3D mesh, similar to the techniques described above, but with modified texture coordinates.

Figure 21:
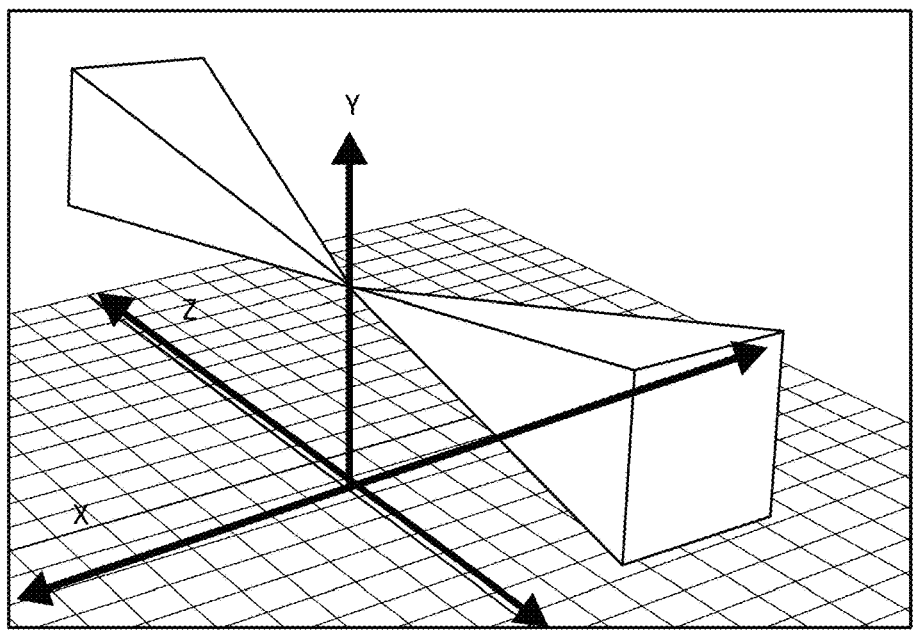
FIG. 21 is a conceptual diagram illustrating different fields of view for dual cameras.

FIG. 21 is a conceptual diagram illustrating different fields of view for dual cameras. For instance, from the center extending backwards may be the field of view of a first camera for lens 12A, and extending outwards may be the field of view of a second camera for lens 12B. However, there may be pan, tilt, or roll rotation offsets between the cameras. These pan, tilt, or roll (which may also be referred to as twist) rotations may manifest in the resulting circular images on which the example operations described above are performed. Accordingly, in some examples, CPU 16 and GPU 18 may compensate for the pan, tilt, or roll in the circular images so that the blending or stitching is performed on images having the pan, tilt, and roll offsets removed (e.g., there is no pan, tilt, or roll rotation in the images, that are to be blended, relative to one another).

The pan, tilt, and roll or shift of the cameras that includes lenses 12A and 12B may be determined during manufacturing. For example, assume that a first camera that includes lens 12A is aligned at location (0, 0, 0) with no pan, tilt, or roll (e.g., rotation (0, 0, 0)). In this example, assume there is a first optical axis that starts from the center of the sensor of the first camera and extends outwards. Similarly, assume there is a second optical axis that starts from the center of the sensor of a second camera that includes lens 12B and extends outwards.

During manufacturing, a test machine may determine the angular differences between the first optical axis and second optical axis to determine the pan, tilt, or roll of the second camera relative to the first camera. For instance, if the rotation of the first camera is assigned as (0, 0, 0), then the rotation of the second camera may be (A, B, C), where A, B, C are zero or non-zero, positive or negative values, with degrees as units.

The roll information may not be based on the angle between the first optical axis and the second optical axis, but may be based on locations of corresponding points in the first and second cameras. For example, the first camera and the second camera may each include a test point marked on the cameras. The roll information may be angle between the test point on the first camera and the test point on the second camera.

The test machine may also determine the shift between the first camera and the second camera based on distances between the first optical axis and the second optical axis. For instance, if the second camera is left or right of the first camera, the x-value of the location parameter may be greater than or less than zero to indicate shift relative to the first camera. If the second camera is above or below the first camera, the y-value of the location parameter may be greater than or less than zero to indicative shift relative to the first camera. The z-value of the location parameter for the second camera may indicate whether the second camera is located further away or closer to the housing of device 10 relative to the first camera, and may not be determined based on distances of the first optical axis and the second optical axis.

System memory 30 may store information indicative of the pan, tilt, and roll. For example, system memory 30 may store as calibration parameters the location parameters (0, 0, 0) and rotation parameters (0, 0, 0) for the first camera, and store as calibration parameters the location parameters (x, y, z) and rotation parameters (A, B, C) for the second camera. The location parameters and the rotation parameters are examples of the calibration parameters for the first and second cameras.

The above is one example way in which the calibration parameters are determined and stored in system memory 30. However, the example techniques are not limited to the above example techniques, and other ways in which to determine and store the calibration parameters may be possible.

As illustrated in FIG. 21, each of the cameras rotation may be defined by axes such as the X, Y, and Z-axes illustrated in FIG. 21. There may be rotation along any of these axes such that the cameras are no longer perfectly aligned. As described, the rotation of the cameras (from an ideal or relative to one another) may be defined by pitch, yaw, and roll.

FIG. 37 is a conceptual diagram illustrating pan, tilt, and roll of a camera device around different axes. For example, rotation along the y-axis is referred to as pan, rotation along the x-axis is referred to as tilt, and rotation along the z-axis is referred to as roll. In the example in FIG. 37, the camera is oriented along the z-axis.

As described in more detail, in some examples, for roll rotation (Z-rotation), processing circuitry (such as CPU 16 but other circuits may be used alone or in combination with CPU 16) may rotate the texture UV coordinates around the center coordinate by the roll angle from a camera calibration data file. As described, system memory 30 may store information (e.g., in a camera calibration data file) indicative of whether the camera of lenses 12A or 12B was rotated (e.g., calibration parameters). The UV coordinates refer to the coordinates on the color texture (e.g., textured image) that is to be mapped. For example, FIGS. 2A and 2B represent examples of the color texture.

As also described in more detail, for X and Y rotation (tilt and pan), CPU 16 may calculate the offset needed to shift texture coordinates based on texture offset per degree, which is calculated as one example based on the 85-90 degree ring texture coordinate values, divided by 5 degrees (90-85 is 5) to determine texture offset per degree of X and Y rotation. The ring texture coordinate values refers to the example concentric rings illustrated in FIGS. 5 and 8 as two examples. The 85-90 degree values are based on one example of the ring texture coordinate values, but other values are possible for different examples of concentric rings.

CPU 16 may multiply the texture offset per degree by camera extrinsic rotation value X and Y (e.g., based on information stored in calibration data file, similar to Z-rotation). CPU 16 may shift the texture coordinates (e.g., u and v coordinates) vertically (for rotation X) and horizontally (for rotation Y). GPU 18 may compensate for unwanted perspective distortion that was introduced by X, Y rotation shift described above. In this way, CPU 16 and/or GPU 18 may compensate for the rotational shift in the images captured by lenses 12A and 12B.

Figure 22:
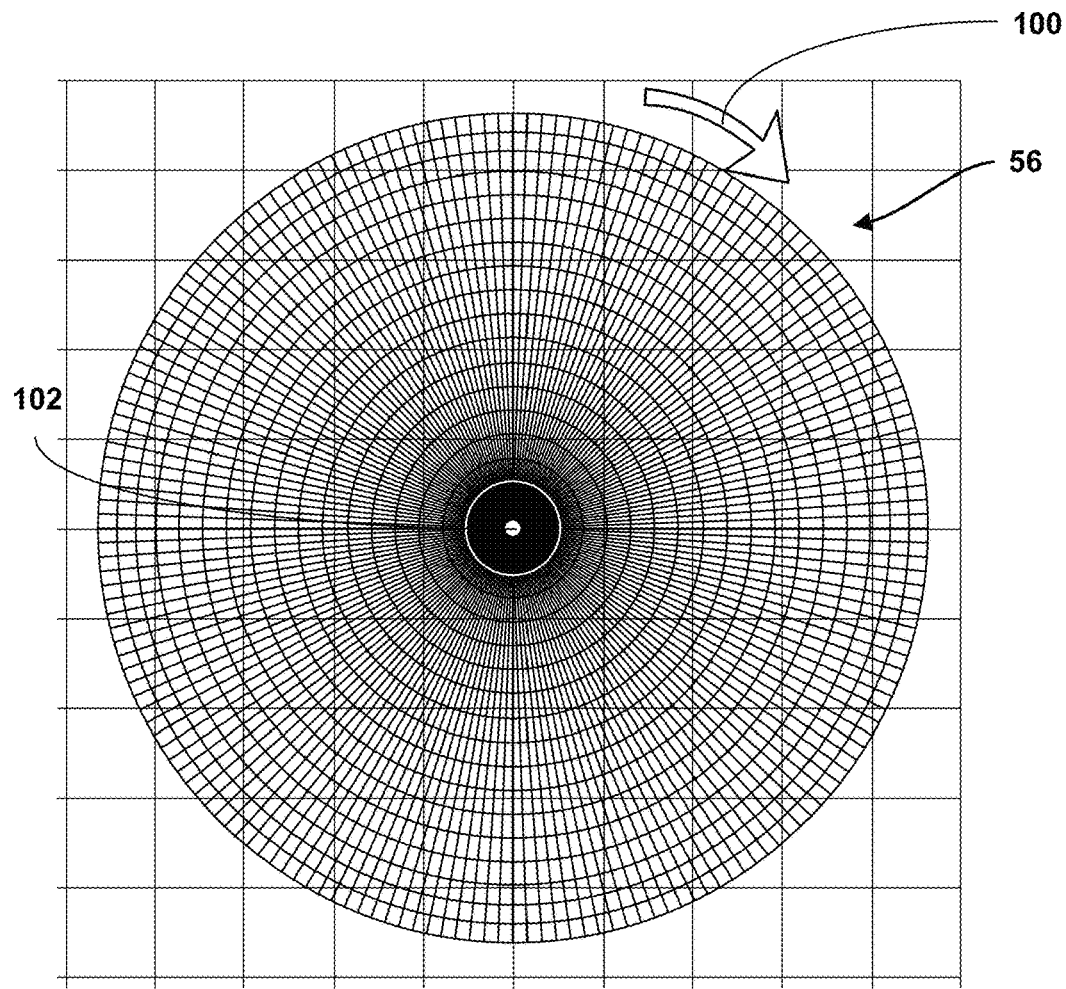
FIG. 22 is a conceptual diagram illustrating application of a Z-rotation.

FIG. 22 is a conceptual diagram illustrating application of a Z-rotation. For instance, FIG. 22 illustrates that rotation would be applied to texture map 56 based on the Z-rotation (roll angle). For instance, arrow 100 shows the change to texture map 56 based on a Z-rotation relative a center point 102 of texture map 56. In general, for compensating for the roll between the first and second cameras, CPU 16 may rotate the texture coordinates of the vertices of the concentric rings illustrated in FIG. 22 based on the roll parameter of the calibration parameters. For example, each of the vertices in the concentric rings in texture map 56 of FIG. 22 may be associated with a u-value and a v-value. As an example, and as described above, each of the concentric rings of texture map 56 is divided into texture primitives (e.g., the rectangles in texture map 56 similar to those of FIGS. 5 and 8). Each of the texture primitives include texture coordinates (e.g., u, v-coordinates) that define the vertices of the texture primitives in the concentric rings.

The following is example pseudo-code that CPU 16 may implement to roll the texture coordinates of the vertices of the texture primitives. CPU 16 may first determine that the texture coordinates are relative to 0, 0 before roll, then move the texture coordinates based on the Z-rotation parameter (e.g., roll parameter), and then move them relative to their original coordinate system.

The equation to determine the modified texture coordinate for u is u'=u*cos(Z-rotation parameter)−v*sin(Z-rotation parameter), and the equation to determine the modified texture coordinate for v is v'=u*cos(Z-rotation parameter)+v*sin(Z-rotation parameter). In this example, (u', v') are the modified texture coordinates for the primitives. CPU 16 may perform the above operations to determine the modified texture coordinates for the primitives. In some examples, CPU 16 may first move the texture coordinates (u, v) such that they are centered relative to (0, 0) since the center of the concentric circles may be located at (0.5, 0.5) or some other non-zero location. CPU 16 may move the texture coordinates back to their original center location. To move the texture coordinates relative to (0, 0) and to move them back, CPU 16 may subtract and add the coordinates of the center point (e.g., (0.5, 0.5)). The actual desired center may be based on information provided by the camera calibration information.

CPU 16 may repeat these operations for each of the texture primitives to generate modified texture coordinates that are modified based on the calibration parameters of the camera (e.g., Z-rotation parameter or roll parameter in this example). CPU 16 may determine primitives in an image captured by a sensor of the camera based on the modified texture coordinates. For instance, similar to FIG. 10, CPU 16 may use the modified texture coordinates to determine the relationship with the image pixels of the corresponding circular image (e.g., FIG. 2A or 2B). GPU 18 may then map the image content of the circular image onto a mesh model to generate a textured image, as described above.

The pivot of rotation is the center point 102 of the texture coordinates. This center is also derived from the camera intrinsic information such as the camera image parameters of cameras that include lenses 12A and 12B described above. Examples of the camera image parameters, as described above, include the amount of image content captured by lenses 12A and 12B (e.g., 200-degrees of image content). The camera image parameters may include the optical center of the captured fisheye images (e.g., circular image). The optical center is not necessarily at 0.5, 0.5 in the texture coordinate space (e.g., in texture map 56).

As illustrated with the arrow in FIG. 22, the Z-rotation causes texture map 56 that includes the texture primitives arranged in concentric circles to rotate (e.g. roll). The resulting modified texture coordinates are what GPU 18 uses to map (e.g., overlay) image content from a circular image to the mesh model similar to the description above for overlaying image content onto a mesh model. However, the difference here is that the entire texture map is rolled.

In this way, GPU 18 may generate a first image. GPU 18 may generate a second image using the overlaying techniques described above, but may not perform any modification to the texture coordinates. GPU 18 may blend the first and second image to generate a final image for display. Accordingly, GPU 18 may use the calibration parameters to compensate for the difference in the rotation of the first and second cameras relative to one another.

The above described one example way in which CPU 16 and/or GPU 18 compensate for a difference in the Z-rotation between the first camera and the second camera. However, there may be differences in the X-rotation (e.g., tilt) and/or the Y-rotation (e.g., pan) as well. The following describes example ways in which to modify the texture coordinates of texture map 56 to compensate for the differences in the X-rotation and the Y-rotation.

To compensate for the differences in the X-rotation and the Y-rotation (e.g., tilt and pan, respectively), CPU 16 may modify the texture coordinates of texture primitives in texture map 56 to generate modified texture coordinates. However, unlike the roll example for compensating for Z-rotation, compensating for the X-rotation and the Y-rotation may cause texture map 56 to shift left, right, up, or down.

To modify the texture coordinates, CPU 16 may determine a texture offset per degree (TOPD) value for Y-rotation, and a TOPD value for X-rotation. Each of the concentric rings in texture map 56 corresponds, in degrees, to how much image content is captured up to that concentric ring (e.g., field of view). For instance, the center of texture map 56 may be considered as being at 0° (e.g., zero-degrees field of view), and the last concentric ring of texture map 56 may correspond to 90° or 95° field of view based on how much image content is captured by each one of lens 12A and 12B. For instance, if lens 12A captures 200-degrees of image content, then texture map 56 may extend from −95° to +95°. In some examples, the texture map used for image content captured by lens 12B may extend from −90° to +90° even if the texture map used for image content captured by lens 12A is from −95° to +95°.

CPU 16 may determine the (u, v) coordinates for points on texture map 56 at two different angles. CPU 16 may select angles that represent portions along the circular images where the blending is performed. Accordingly, CPU 16 may determine the (u, v) coordinates for points on texture map 56 at 90° and 89°, or 95° and 90°, and so forth. Again, points on texture map 56 at 90° and 89°, or 95° and 90° are along the boundary of texture map 56 that correspond to location on the circular images where blending occurs.

In some examples, each of the concentric rings is approximately 5°. As described above with respect to FIG. 4, texture coordinates buffer 52 may store (u, v) coordinates for primitives of texture map 56. Accordingly, in one example, CPU 16 may use the (u, v) coordinates stored in texture coordinates buffer 52 for the last ring in texture map 56, which corresponds to 90°, and the second to last ring in texture map 56, which corresponds to 85°. In some examples, CPU 16 may determine the (u, v) coordinates for two points at any given angles (e.g., (u,v) coordinates 90° and (u,v) coordinates at 89°). In examples where CPU 16 determines the u, v coordinate for arbitrary angles, CPU 16 may perform the following operations.

The following are equations to determine (u, v) coordinates for any point:

$$u = \text{fisheye}.fx * P\_\text{image}[0] + \text{fisheye.skew} * P\_\text{image}[1] + \text{fisheye}.cx;$$

$$v = \text{fisheye}.fy * P\_\text{image}[1] + ((\text{float})\text{fisheye.sensor\_height} - \text{fisheye}.cy),$$

$$P\_\text{image}[0] = \text{distorted\_altitude} * P\_\text{lens}[0]/\text{magnitude}, \text{ and } P\_\text{image}[1] = d\_\text{elevation} * P\_\text{lens}[1]/\text{magnitude},$$

$$P\_\text{lens}[0] = \sin(\text{altitude}) * \cos(\text{azimuth}), \text{ and } P\_\text{lens}[1] = \sin(\text{altitude}) * \sin(\text{azimuth}).$$

The other variables indicate position on the fisheye lenses. For example, fisheye_fx and fisheye_fy refer to coordinates of points on the fisheye lenses. Fisheye.fx equals horizontal focal length of lens, and Fisheye.fy equals vertical focal length of lens. Fisheye.cx equals horizontal optical center of image captured by lens, and Fisheye.cy equals vertical optical center of image captured by lens. Skew equals skew coefficient of lens.

The 5 numbers described above are collectively called the "Intrinsic Parameters" of a camera lens, and are often placed in a 3×3 matrix called the "Camera Intrinsic matrix." Another 3 numbers, K1, K2, K3, are also intrinsic parameters, called the radial distortion coefficients. Distorted_altitude is the input altitude angle after being modified by the radial distortion coefficients K1, K2, K3 of the lens into account.

The "magnitude" is the projection of the input point (which was the azimuth and altitude angles on a unit sphere of radius 1), converted to XYZ cartesian coordinates, then projected onto an image plane. The image is the length of the XY vector.

As an example, the input into the above operations may be the altitude, which ranges from 0 to 90-degrees, and azimuth, which ranges from 0 to 360-degrees. The operations cover altitude and azimuth, which are spherical coordinates, into X, Y (cartesian coordinates), and normalize the coordinates to be between 0 and 1. These cartesian coordinates are distorted based on the K1, K2, and K3 values to generate the u, v coordinates.

Another example method for determining (u, v) coordinates is described in https://www.mathworks.com/help/vision/ug/camera-calibration.html?requestedDomain=www.mathworks.com&requestedDomain=www.mathworks.com.

In some examples, CPU 16 may normalize the u, v coordinates to the texture coordinate space, where the values of u and v range from 0 to 1. Accordingly, CPU 16 may perform the operation of u/=(float) fisheye.sensor_width, and v/=(float)fisheye.sensor_height, where fisheye.sensor_width and fisheye.sensor_height are width and height, respectively, of the fisheye lenses.

Because (u, v) coordinates for 90° and 85° may be available in texture coordinates buffer 52, CPU 16 may use the (u, v) coordinates for 90° and 85° to determine the TOPD values for the Y- and X-rotations. As one example, assume that the (u, v) coordinate for 90° is (u1, v1), and the (u, v) coordinate for 85° is (u2, v2). For the Y-rotation, the (u1, v1) and (u2, v2) points correspond to where the azimuth is 0° (e.g., in above example equation azimuth=0), and the 90° and the 85° correspond to the altitude angle (e.g., in above example equation altitude=90° or 85°), and are located in the horizontal left end, center of texture map 56. For the X-rotation, the (u1, v1) and (u2, v2) points correspond to where the azimuth is 90°, and the 90° and the 85° correspond to the altitude angle, and are located in the vertical top, center of texture map 56

In this example, for the Y-rotation (camera pan), CPU 16 may determine a delta u value, which is u1 minus u2. Since the TOPD values are "per degree," CPU 16 may divide delta u by (90°–85°), and the result is the TOPD for the Y-rotation. CPU 16 may then multiply the Y-rotation parameter (e.g., camera pan) with the TOPD for the Y-rotation, and add the result to the u-coordinate of each of the vertices of the texture primitives. A rotation along the Y (vertical axis) makes texture map 56 shift horizontally left or right. Since "u" is the horizontal axis coordinate, for Y-rotation, CPU 16 may adjust the u-coordinate.

In this example, for the X-rotation (camera tilt), CPU 16 may determine a delta v value, which is v1 minus v2. Since the TOPD values are "per degree," CPU 16 may divide delta v by (90°–85°), and the result is the TOPD for the X-rotation. CPU 16 may then multiply the X-rotation parameter (e.g., the tilt or roll) with the TOPD for the X-rotation, and add the result to the v-coordinate of each of the vertices of the texture primitives. A rotation along the X (horizontal axis) makes texture map 56 shift vertically up or down. Since "v" is the vertical axis coordinate, for X-rotation, CPU 16 may adjust the v-coordinate.

Figure 23:
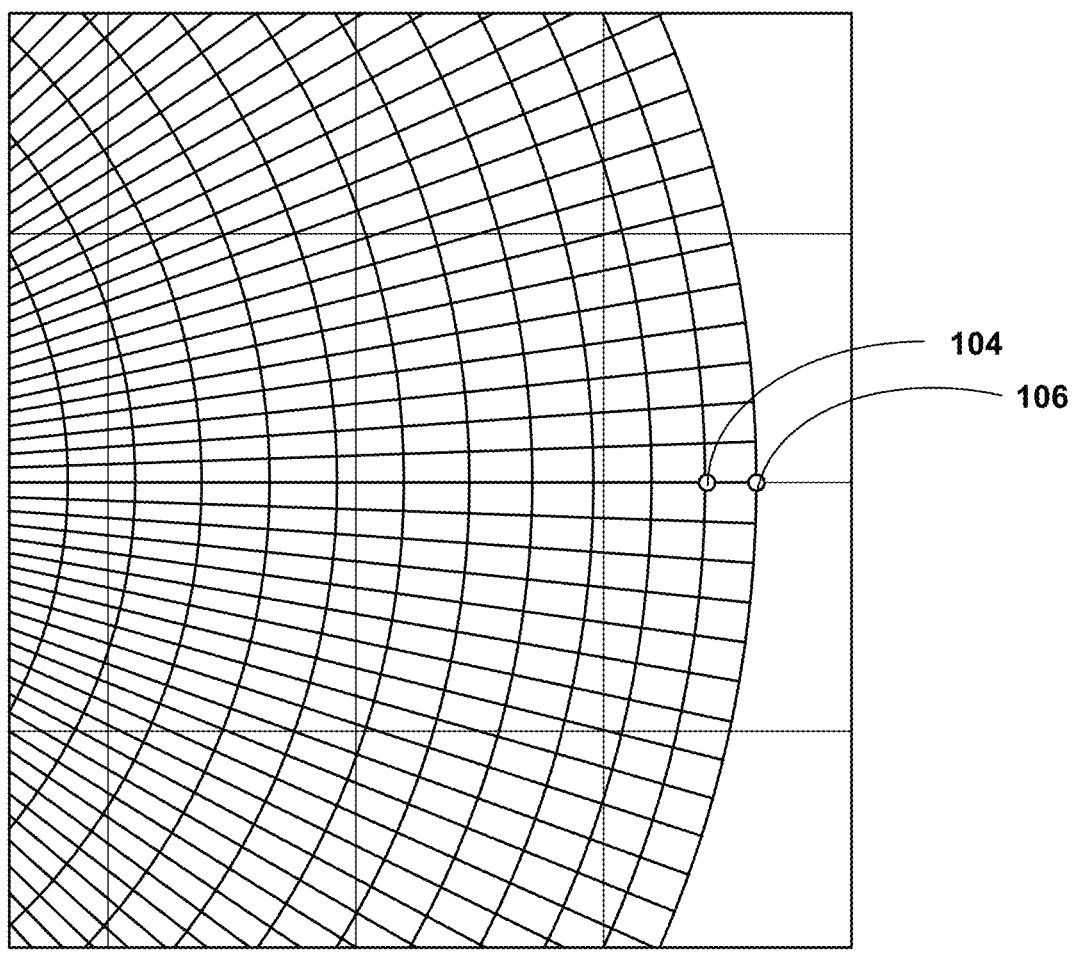
FIG. 23 is a conceptual diagram illustrating application of a X-rotation or Y-rotation.

FIG. 23 is a conceptual diagram illustrating application of a X-rotation or Y-rotation. FIG. 23 illustrates the example of modifying the texture coordinates for the X-rotation and Y-rotation. FIG. 23 illustrates sample 104 and sample 106. The azimuth of sample 104 is 0 degrees, and the altitude angle is 85 degrees. The azimuth of sample 106 is 0 degrees, and the altitude angle is 90 degrees. The texture space angle delta for 5-degree spread between sample 106 and sample 104 is one example, and other sizes are possible. For example, the angle delta between sample 106 and sample 104 is 5 degrees (90–85), but other sizes are possible.

For example, the 85 to 90-degree angle may correspond to the perimeter of the circular images where the blending is to occur. The 85 to 90-degree angle may be based on the amount of image content lenses 12A and 12B capture. If lenses 12A and 12B capture more than 200-degrees of image content, the range may be greater than 85 to 90-degrees. Also, the length of each of the primitives is illustrated as being 5-degrees. For example, the distance from 60A to 60C in FIG. 5 may be 5-degrees, but in other examples may be greater than or less than 5-degrees.

For Y-rotation, CPU 16 may calculate u, v for sample 104 and sample 106 (e.g., which may be based on stored information as described above in texture coordinates buffer 52). CPU 16 may subtract U2 from U1, where U2 is the u-coordinate for sample 106 and U1 is the u-coordinate for sample 104, to generate delta U. CPU 16 may determine the texture offset per degree by dividing the delta U by 5. CPU 16 may multiply the texture offset per degree with the Y-rotation, referred to as Rotation Y (e.g., pan angle), which may be the amount of pan as stored in camera calibration data file. CPU 16 may add the result to all u, v coordinates (e.g., the u-values) of texture map 56 to generate modified texture coordinates with which GPU 18 may perform the texture mapping.

For X-rotation (e.g., tilt angle), CPU 16 may repeat the above steps vertically for rotation X (tilt). In this example, the azimuth of sample 104 is 90 degrees, and the altitude angle is 85 degrees. The azimuth of sample 106 is 90 degrees, and the altitude angle is 90 degrees. The texture space angle delta for 5-degree spread is one example, and other sizes are possible.

In some examples, because the sampling is done at the 85 to 90-degree (or alternatively in the 90-95 degree) range, the fisheye lens compression effect is taken into account, at the outer rim of the circular image. For example, as described above, the rings such as those illustrated in FIGS. 5 and 8 may not be equal width, and are based on the camera intrinsic parameters (e.g., lens distortion or compression). Because the example techniques may stitch (e.g., blend) along the perimeter of the circular images (e.g., outer rim of the fisheye), CPU 16 may calculate the texture offset per degree in the field of view of the overlap area, or as close as possible.

Figure 24:
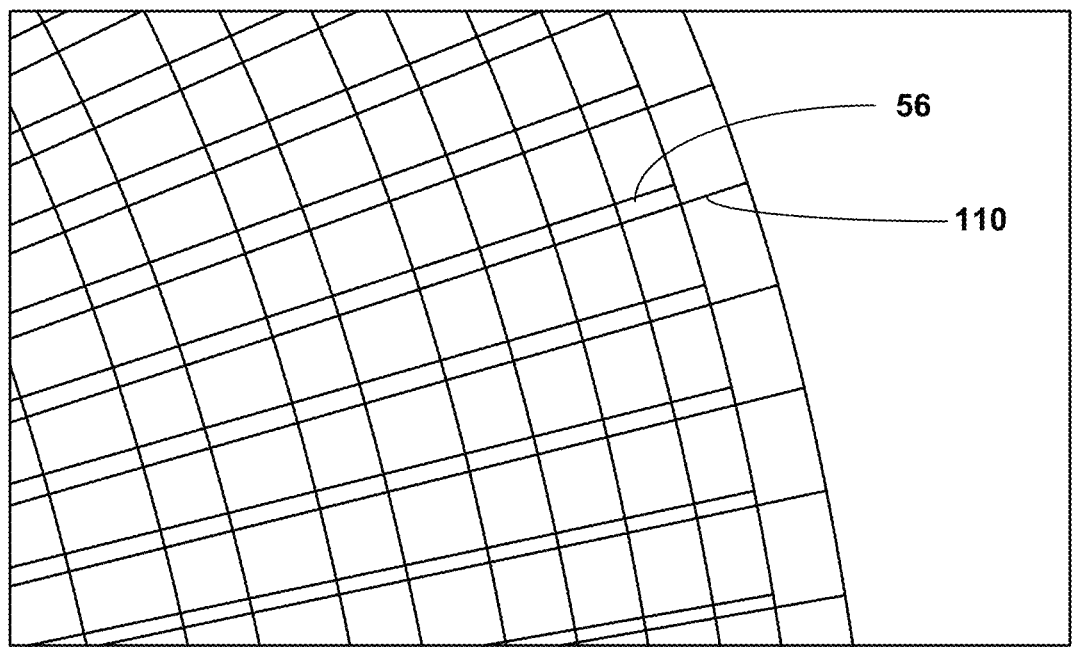
FIG. 24 is a conceptual diagram illustrating shifted texture coordinates.

FIG. 24 is a conceptual diagram illustrating shifted texture coordinates. For instance, in FIG. 24, the modified (e.g., shifted) texture coordinates are illustrated next to the original texture coordinates. As illustrated, the shifted texture map 110 is shifted to the right and bottom relative to the original texture map 56. GPU 18 may then determine corresponding image content for each of the texture primitives with the modified texture coordinates in a circular image (e.g., FIG. 2A or 2B), and perform texture mapping (e.g., overlay the circuit image on to a mesh model) to generate an image. GPU 18 may use the original texture map 56 for performing the texture mapping for the other one of the circular images (e.g., other one of FIGS. 2A and 2B).

Accordingly, in one example, to modify texture coordinates to generate modified texture coordinates, CPU 16 may shift texture coordinates of texture primitives arranged as concentric rings in texture map 56 based on a tilt angle (e.g., X-rotation parameter) of the calibration parameters. For example, CPU 16 may determine a difference between coordinates of two points on texture map 56 at two different angles (e.g., 90° and 85° or 90° and 89°) on texture map 56. CPU 16 may determine a first texture offset per degree (TOPD) value based on the difference, and may determine a first offset based on the first TOPD value and the tilt angle (e.g., the first offset=(first TOPD value)*X-rotation parameter). CPU 16 may add the first offset to the texture coordinates (e.g., v-coordinate) of the texture primitives to generate the modified texture coordinates of modified texture map 110.

In one example, to modify texture coordinates to generate modified texture coordinates, CPU 16 may shift texture coordinates of texture primitives arranged as concentric rings in texture map 56 based on a pan-angle (e.g., Y-rotation parameter) of the calibration parameters. For example, CPU 16 may determine a difference between coordinates of two points on texture map 56 at two different angles (e.g., 90° and 85° or 90° and 89°) on texture map 56. CPU 16 may determine a second TOPD value based on the difference, and may determine a second offset based on the second TOPD value and the pan-angle (e.g., the second offset=(second TOPD value)*Y-rotation parameter). CPU 16 may add the second offset to the texture coordinates (e.g., u-coordinate) of the texture primitives to generate the modified texture coordinates. CPU 16 may determine the first TOPD and second TOPD values at different azimuth angles (e.g., first TOPD at 0° azimuth angle, and second TOPD at 90° azimuth angle).

In this way, CPU 16 and GPU 18 may compensate for the rotation of cameras that include lenses 12A and 12B (e.g., relative rotations of the sensors and lenses 12A and 12B, or just sensors of the cameras). For example, if the calibration parameters indicate that there is X, Y, and Z-rotations, then CPU 16 may perform the above example operations for the X, Y, and Z-rotations to modify the texture coordinates to generate modified texture coordinates that GPU 18 then uses to texture map the image content in the images to a mesh model.

As an example, for purposes of illustration, assume that calibration parameters are relative to a first camera that includes lens 12A so that the calibration parameters indicate the rotation of the second camera that includes lens 12B relative to the first camera. Also, assume that the first camera generated a first image (e.g., circular image of FIG. 2A), and the second camera generated a second image (e.g., circular image of FIG. 2B).

In one example, CPU 16 may perform the example techniques for the X, Y, and Z-rotations to generate the modified texture coordinates. GPU 18 may then use the original texture coordinates to texture map the first image onto the mesh model to generate a first textured image, and use the modified texture coordinates to texture map the second image onto the mesh model to generate a second textured image. GPU 18 may then blend portions of the first and second textured images to generate a stitched image for display.

In another example, CPU 16 may perform the example techniques of the Z-rotation to generate a first set of modified texture coordinates, and GPU 18 may then use the first set of modified texture coordinates to texture map the first image onto the mesh model to generate a first textured image. CPU 16 may perform the example techniques of the X- and Y-rotation to generate a second set of modified texture coordinates, and GPU 18 may then use the second set of modified texture coordinates to texture map the second image onto the mesh model to generate a second textured image. GPU 18 may then blend portions of the first and second textured images to generate a stitched image for display.

In examples where CPU 16 generates first and second sets of modified texture coordinates, CPU 16 may perform the techniques of the Z-rotation in an angle that is the opposite of the angle given by the Z-rotation parameter. For example, the Z-rotation parameter may indicate the Z-rotation of the second camera relative to the first camera. Therefore, by rotating the image content of the first camera in the opposite direction (e.g., negative Z-rotation parameter), the result of the modification is the same as if CPU 16 rotated the image content of the second camera based on the Z-rotation parameter.

Accordingly, in some examples, CPU 16 may determine calibration parameters of a camera (e.g., a camera that includes lens 12A or 12B) based on stored calibration parameters in system memory 30 that were determined during manufacturing. The camera is one of two or more cameras (e.g., device 10 includes a first camera with lens 12A and a second camera with lens 12B), and the calibration parameters are indicative of a position or rotation of at least one of the camera or a sensor of the camera. For example, the calibration parameters include one or more of a pan-angle, tilt-angle, roll-angle, or shift of the first camera relative to a second camera.

CPU 16 may modify texture coordinates of texture primitives based on the calibration parameters to generate modified texture coordinates. As one example, CPU 16 may rotate texture coordinates of texture primitives arranged as concentric rings in texture map 56 around a center of the texture map based on a roll-angle of the calibration parameters. As another example, CPU 16 may shift texture coordinates of texture primitives arranged as concentric rings in texture map 56 based on a pan-angle of the calibration parameters. As another example, CPU 16 may shift texture coordinates of texture primitives arranged as concentric rings in texture map 56 based on a tilt-angle of the calibration parameters.

In some examples, CPU 16 may rotate the texture coordinates based on roll-angle, and shift the texture coordinates based on the pan- and tilt-angles to generate modified texture coordinates. CPU 16 may determine primitives in a first image (e.g., circular image) based on the modified texture coordinates, and GPU 18 may generate a first textured image based on mapping of the primitives in the first image onto a mesh model. CPU 16 may also determine primitives in a second image (e.g., other circular image) based on the texture coordinates without modification, and GPU 18 may generate a second textured image based on mapping of the primitives in the second image onto the mesh model. GPU 18 may then blend a portion of the first textured image with a portion of the second textured image to generate a stitched image. GPU 18 may then generate image content for display based on the stitched image.

In some examples, CPU 16 may shift the texture coordinates based on the pan- and tilt-angles to generate a first set of modified texture coordinates, and rotate the texture coordinates based on the roll-angle to generate a second set of modified texture coordinates. GPU 18 may use the first set of modified texture coordinates to generate a first textured image, and use the second set of modified textured coordinates to generate a second textured image. For example, CPU 16 may determine primitives in a first image (e.g., circular image) based on the first set of modified texture coordinates, and GPU 18 may generate the first textured image based on mapping of the primitives in the first image onto a mesh model. CPU 16 may also determine primitives in a second image (e.g., other circular image) based on the second set of modified texture coordinates, and GPU 18 may generate the second textured image based on mapping of the primitives in the second image onto the mesh model. GPU 18 may then blend a portion of the first textured image with a portion of the second textured image to generate a stitched image. GPU 18 may then generate image content for display based on the stitched image.

The shifting of texture map 56 to generate modified texture coordinates may compensate for the X-rotation (tilt), and the Y-rotation (pan). However, in some examples, if GPU 18 maps image content from a circular image using the shifted texture coordinates (e.g., using the shifted texture map illustrated in FIG. 24), there may be warping in the resulting textured image. To address the warping, CPU 16 may further modify the modified texture coordinates to generate further modified texture coordinates.

As described above, CPU 16 and/or GPU 18 may determine primitives in an image (e.g., circular image) based on the modified texture coordinates. In examples where CPU 16 further modifies the modified texture coordinates, CPU 16 and/or GPU 18 may determine primitives in an image (e.g., circular image) based on the further modified texture coordinates. In this disclosure, when CPU 16 and/GPU 18 is described as determining primitives in an image based on the modified texture coordinates, such disclosure encompasses examples where no further modification of the modified texture coordinates is performed and examples where further modification of the modified texture coordinates is performed, unless specifically stated otherwise.

Furthermore, although the phrase "further modification" or "further modified texture coordinates" is used, the description should not be considered being limited to separate processes. For example, CPU 16 may generate the further modified texture coordinates in the same process used to modify the texture coordinates. In other words, CPU 16 may combine the process to modify the texture coordinates and the process to further modify the texture coordinates into one process. However, it is also possible that in some examples, CPU 16 first modifies the texture coordinates to generate modified texture coordinates, and then performs subsequent operations to generate the further modified texture coordinates, in separate processes.

Figure 25B:
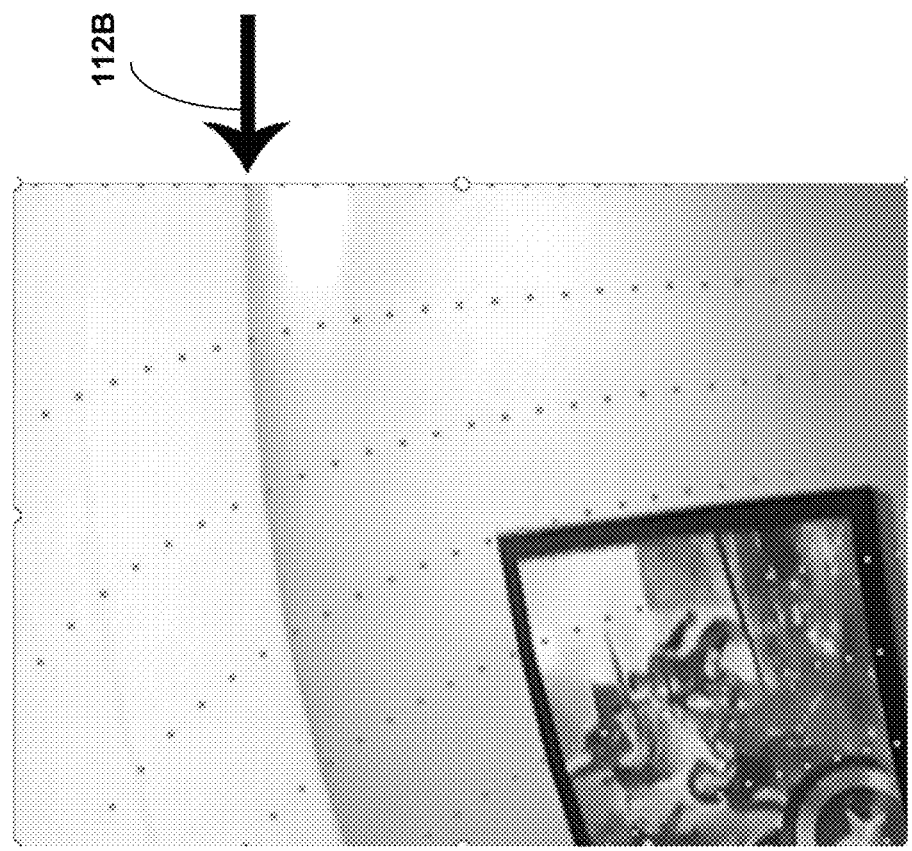
FIGS. 25A and 25B are picture diagrams illustrating vertical shift in image.
Figure 25A:
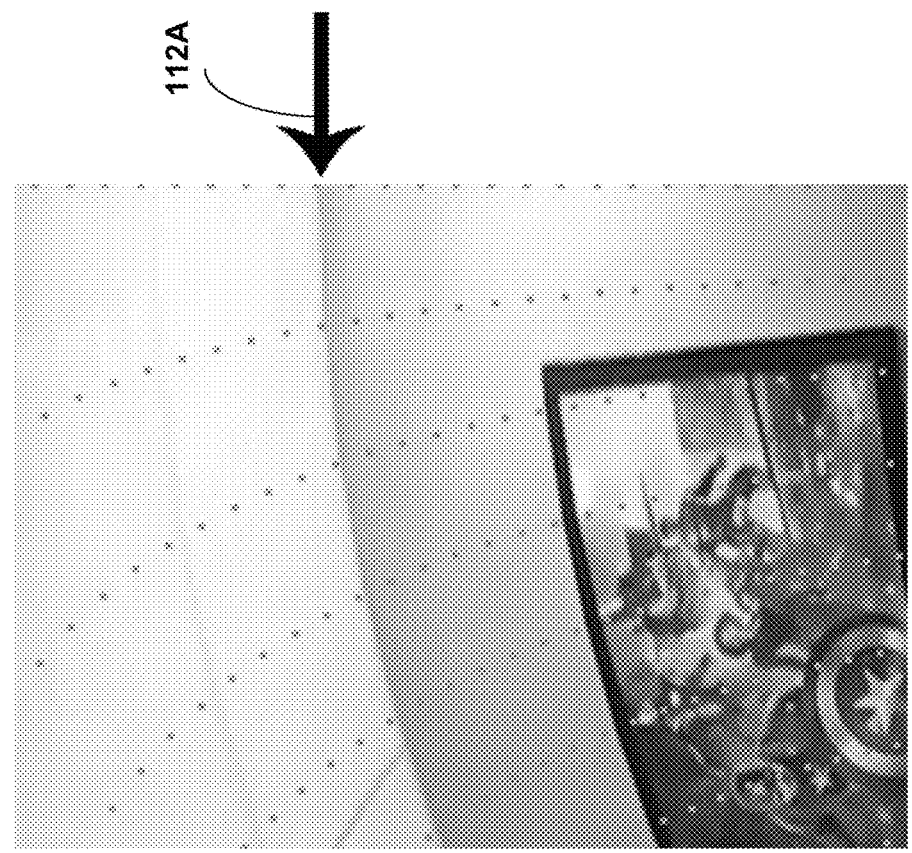

FIGS. 25A and 25B are picture diagrams illustrating vertical shift in image. FIG. 25A is generated before 5-degree pan is added. In other words, FIG. 25A is generated based on original texture map 56. FIG. 25B is generated by adding a 5-degree pan. In other words, FIG. 25B is generated based on shifting texture map 56 with a 5-degree horizontal camera pan.

In FIGS. 25A and 25B, arrow 112A and arrow 112B, respectively, point to the same image content (e.g., the location of the corner between wall and ceiling). However, arrow 112B is vertically higher than arrow 112A. A 5-degree horizontal camera pan should only shift the image horizontally, but as illustrated in FIGS. 25A and 25B, there is vertical shift was well.

In FIGS. 25A and 25B, there is 5-degree of animating pan. This may cause the objects to only move horizontally. With simulation of 5-degree pan, using shifting (e.g., modifying) UV coordinates described above may result, in some but not all cases, in unwanted vertical shift, as illustrated in FIG. 25B. FIG. 25B illustrates warping that may happen when an image is generated from just the shifted texture coordinates.

Figure 26:
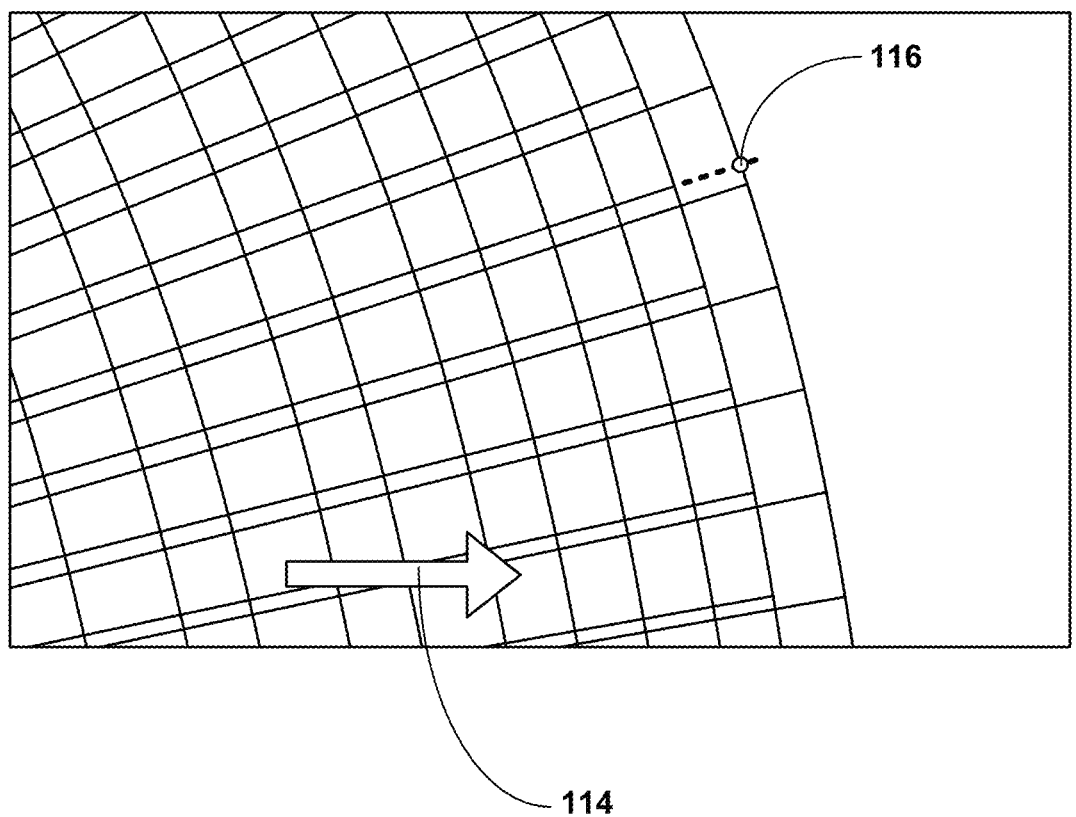
FIG. 26 is a conceptual diagram illustrating spreading of radial lines in direction of shift.
Figure 27:
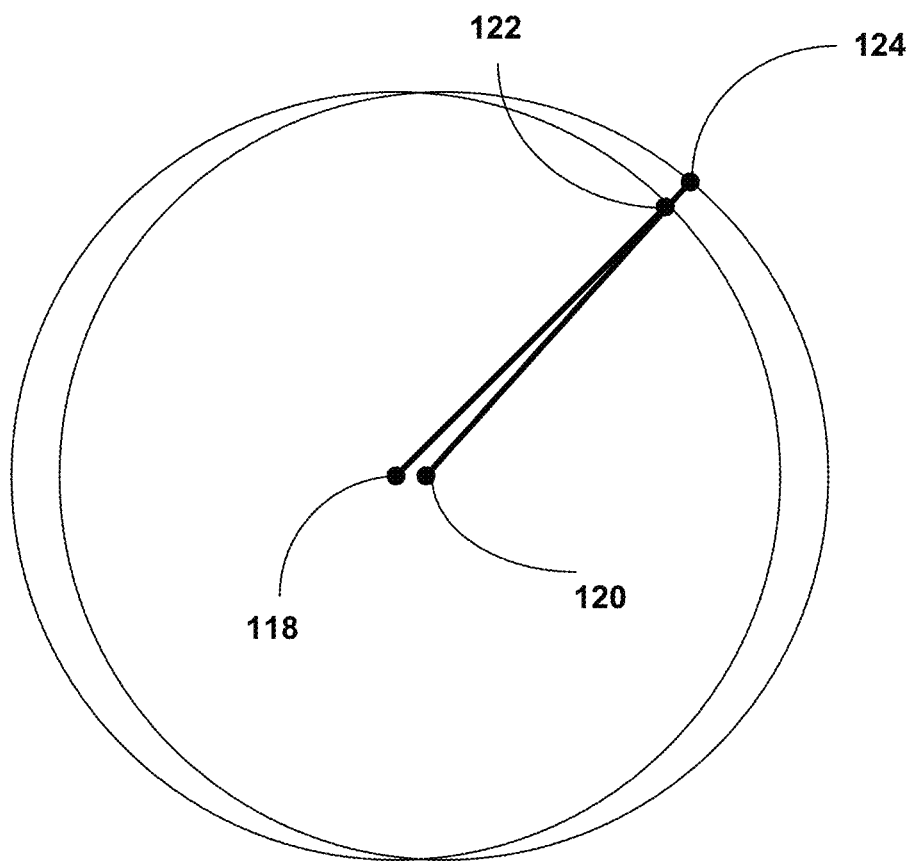
FIG. 27 is a conceptual diagram illustrating shifting of coordinates.

To address this unwanted shifting, in some examples, CPU 16 may spread the radial lines apart in the direction of the shift. FIG. 26 is a conceptual diagram illustrating spreading of radial lines in a direction of shift. FIG. 27 is a conceptual diagram illustrating shifting of coordinates.

In FIG. 26, the "before shift" portion is the original texture primitives, similar to those of FIG. 5. The "after shift" portions refers to the shift in the texture primitives after accounting for the rotation change (e.g., X-rotation and Y-rotation used to generate the shifted texture coordinates). For example, arrow 114 illustrates the direction of the shift, which is similar to those of FIG. 24. The intersection point 116 is an intersection between a line extending from the original (unshifted) texture primitives to texture primitives in the shifted texture primitives.

For example, for each original, unshifted point along 90-degree outer rim, CPU 16 may calculate intersection between two line segments defined by two sets of two points. Line segment 1 may be from the original center to original point on the 90-degree outer rim, with length extended (as illustrated with the dashed line in FIG. 26). Line segment 2 may be the closest intersecting line segment along the shifted (e.g., modified) texture coordinate set (e.g., modified texture map that is modified based on the X, Y, and/or Z-rotation). This results in an intersection point, illustrated in FIG. 26, of the original texture coordinate set (e.g., original texture map 56 has texture coordinates stored in the texture coordinates buffer 52) and the shifted (e.g., modified) set for a given sample point.

This new intersection point is connected to the shifted center, as illustrated in FIG. 27. For example, in FIG. 27, original center 118 is shifted to shifted center 120. Original point 122 is on the rim, and if extended reaches point 124 on the shifted circle having the center of shifted center 120.

The texture coordinate rings of altitude angle 0 to 90 have their points defined along this line. This has the effect of sampling vertically higher along the circular fisheye (in the case of rotation y (e.g., pan)), and compensating for the "rising ceiling" artifact in FIGS. 25A and 25B.

Figure 28:
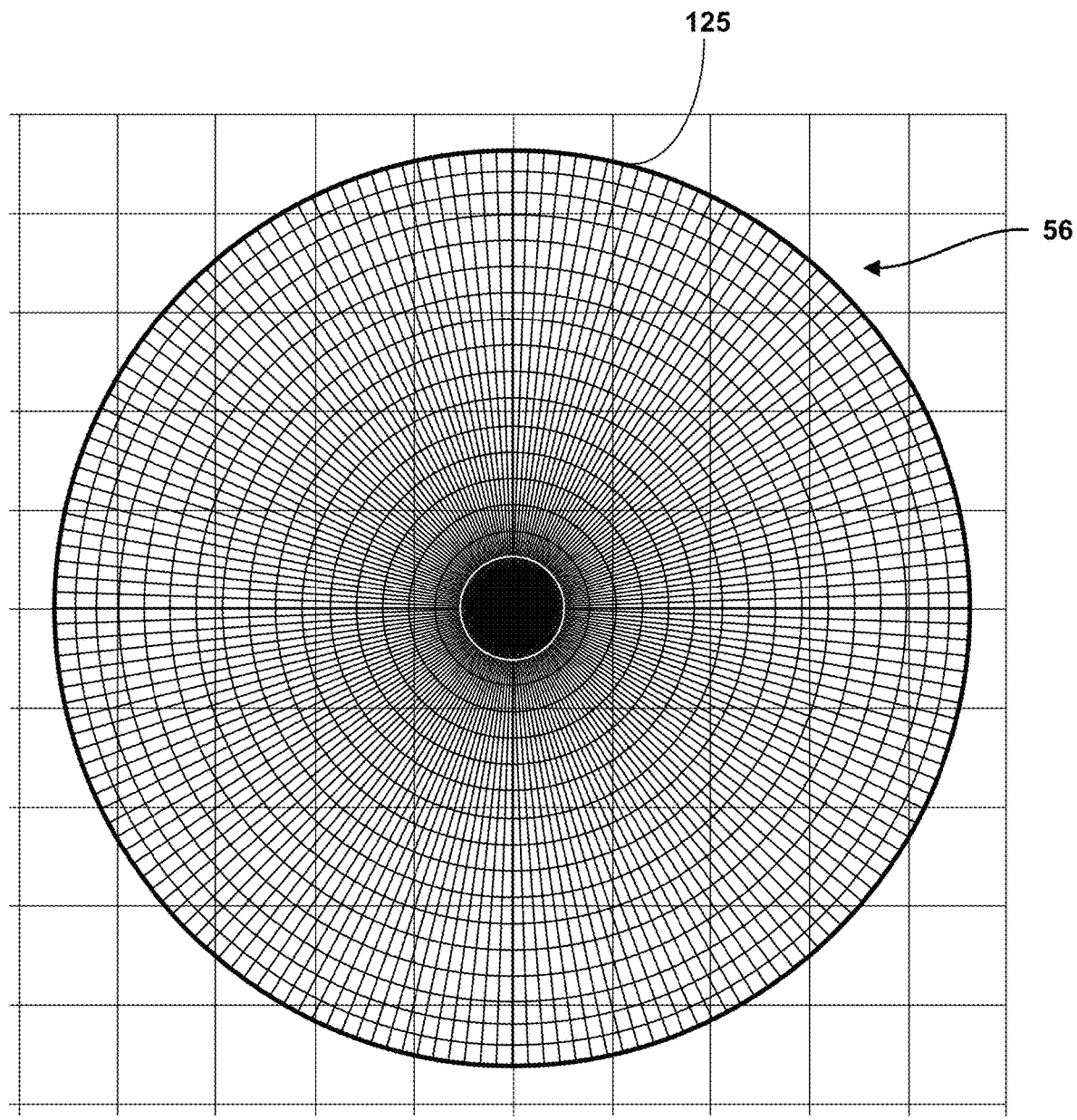
FIG. 28 is a conceptual diagram illustrating an example of a rim of a texture map.
Figure 29:
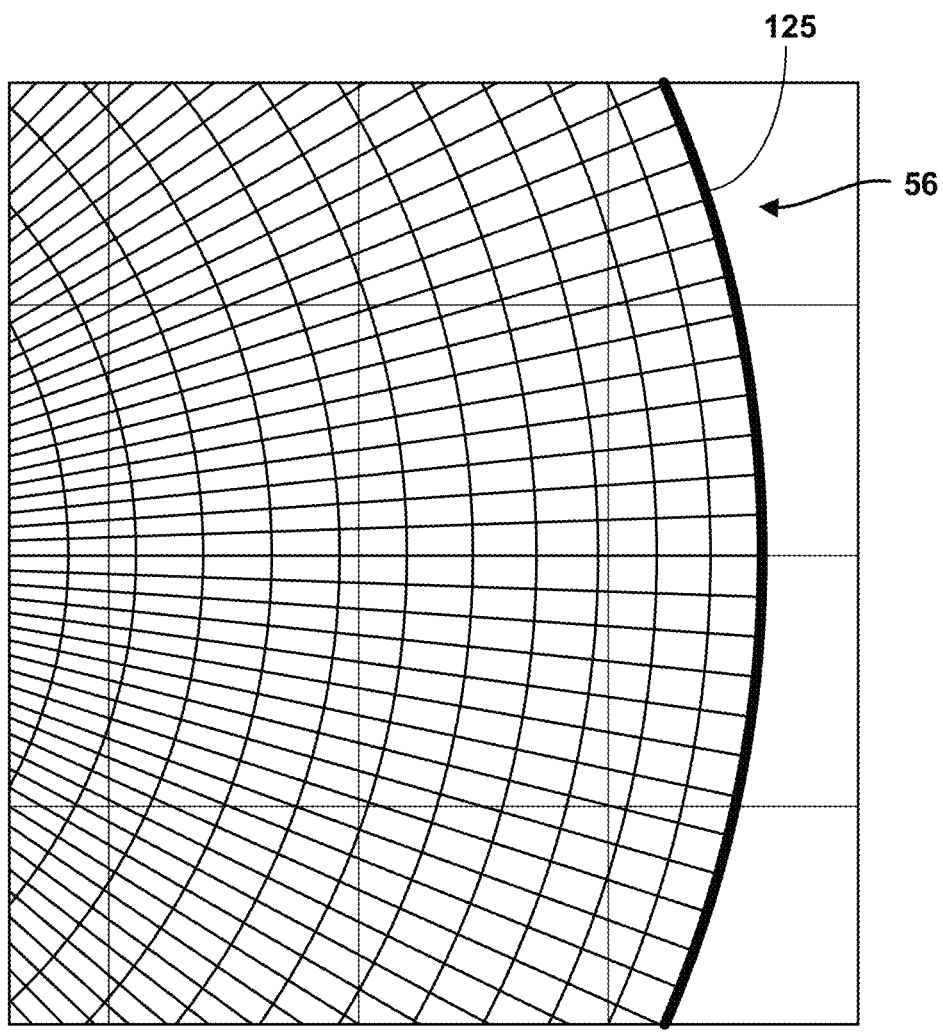
FIG. 29 is a conceptual diagram illustrating a closeup of the rim of FIG. 28.

The example techniques described above for further modifying the modified texture coordinates is described in further detail with respect to FIGS. 28-34. FIG. 28 is a conceptual diagram illustrating an example of an outer rim of a texture map. For example, in FIG. 28, the bolded outermost ring 125 of the concentric rings of texture map 56 is the rim. FIG. 29 is a conceptual diagram illustrating a closeup of the outermost rim 125 of FIG. 28.

Figure 30:
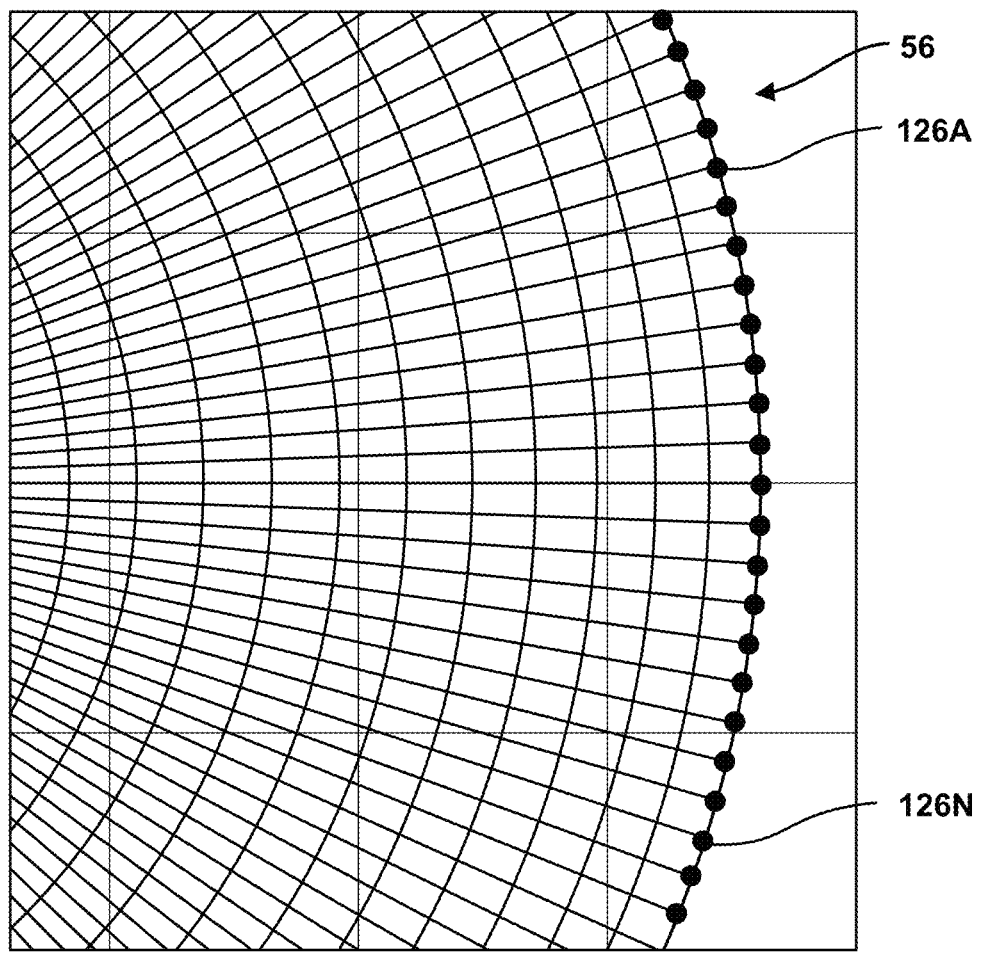
FIG. 30 is a conceptual diagram illustrating rim points along the rim of FIG. 28.
Figure 31:
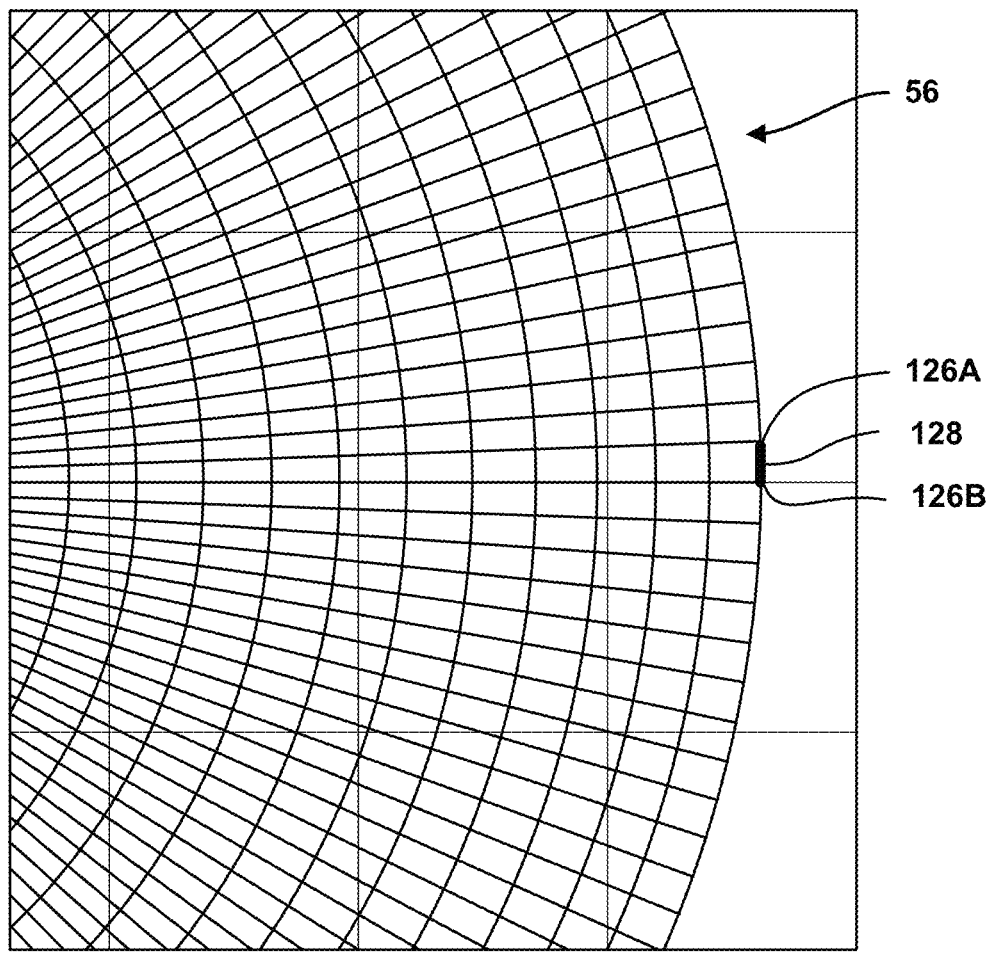
FIG. 31 is a conceptual diagram illustrating an example rim segment between rim points of the texture map of FIG. 28.

FIG. 30 is a conceptual diagram illustrating rim points along the rim of FIG. 28. For example, FIG. 30 illustrates rim points 126A-126N, which are points along the rim of FIG. 28. FIG. 31 is a conceptual diagram illustrating an example rim segment between rim points of the texture map of FIG. 28. For example, FIG. 31 illustrates rim segment 128, which is a segment that connects two rim points (e.g., rim points 126A and 126B).

Figure 32:
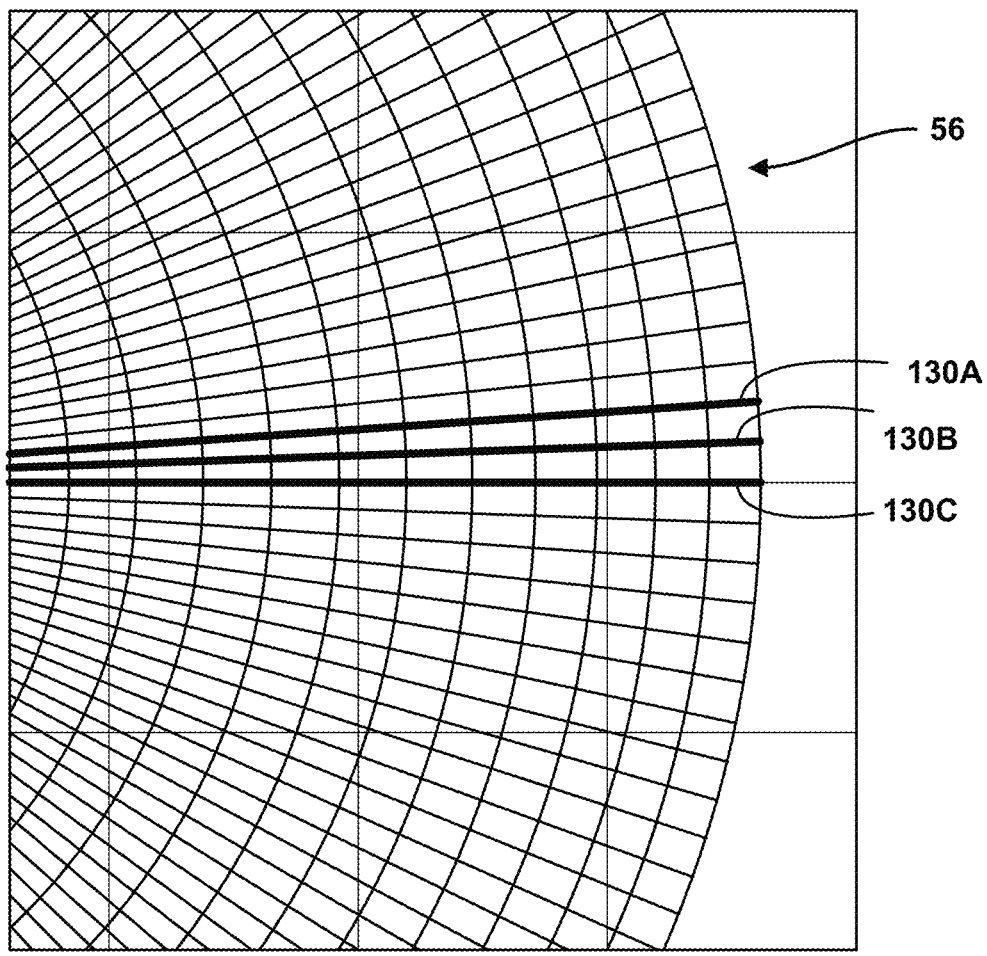
FIGS. 32 and 33 are conceptual diagrams illustrating examples of spans in the texture map of FIG. 28.
Figure 33:
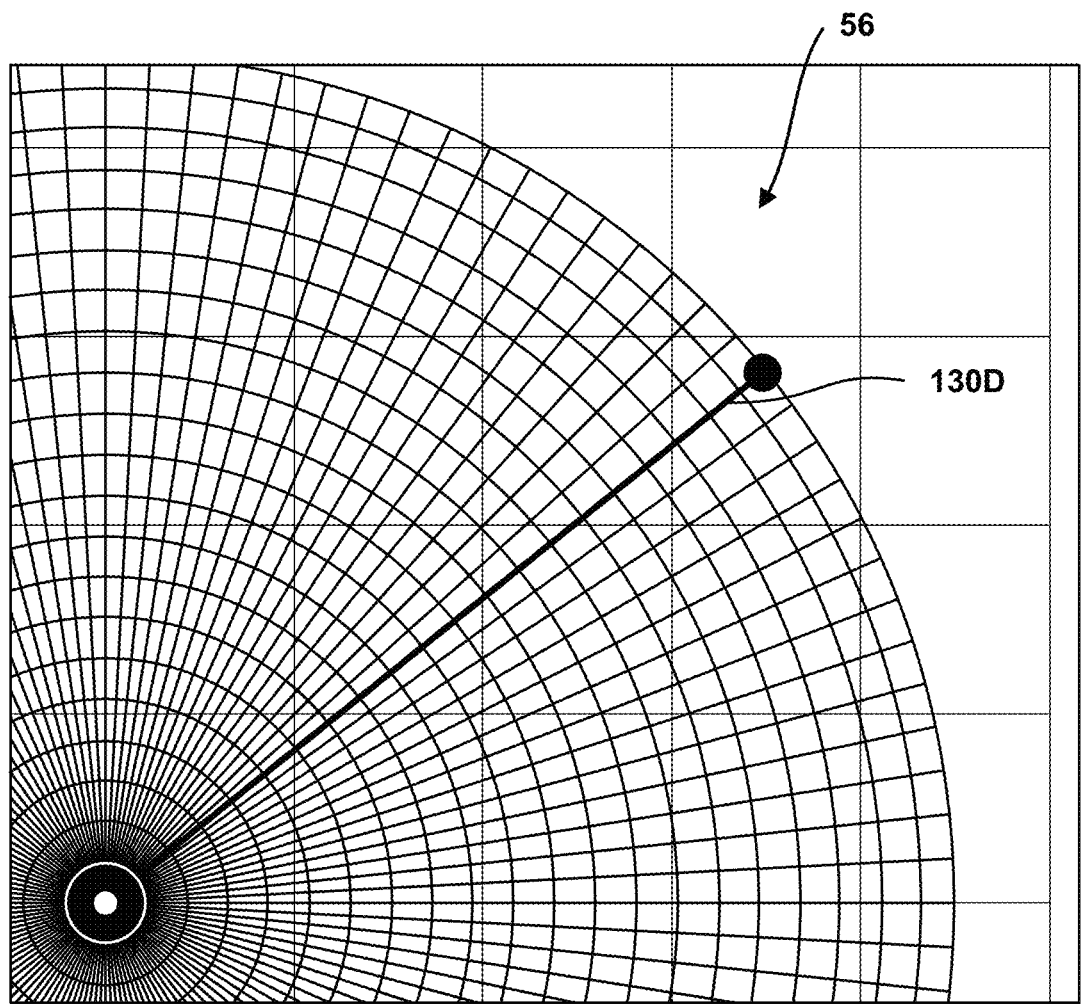
Figure 34:
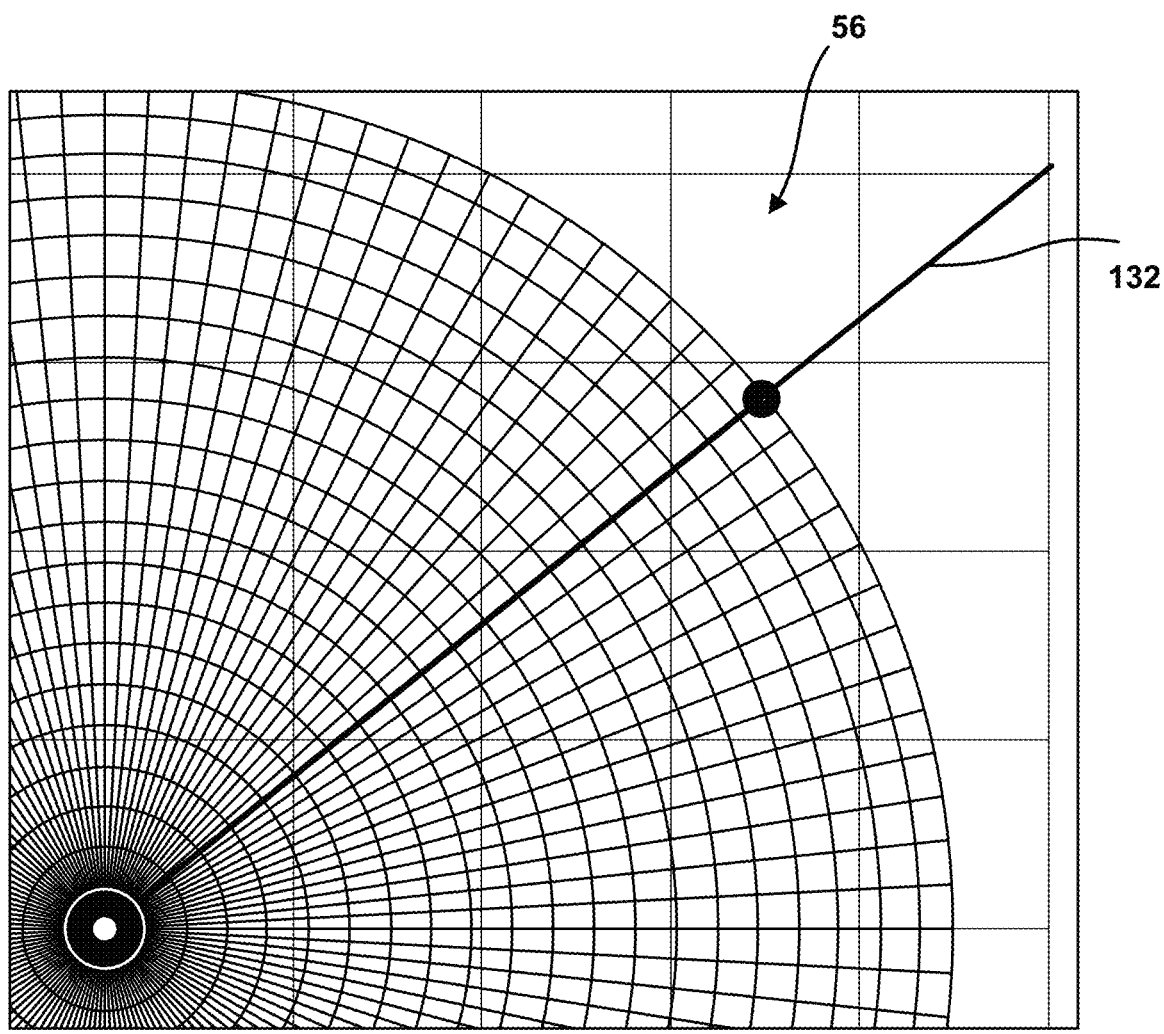
FIG. 34 is a conceptual diagram illustrating an example of an extended span in the texture map of FIG. 28.

FIGS. 32 and 33 are conceptual diagrams illustrating examples of spans in the texture map of FIG. 28. For example, FIG. 32 illustrates spans 130A, 130B, and 130C, and FIG. 33 illustrates span 130D in texture map 56. A span is a line between the center point of texture map 56 and a rim point (e.g., such as one of rim points 126) of texture map 56. FIG. 34 is a conceptual diagram illustrating an example of an extended span in the texture map of FIG. 28. For example, FIG. 34 illustrates extended span 132 of texture map 56. Extended span 132 is a span that is extended beyond the rim of texture map 56, and may be referred to as extended original span. Extended span 132 may the original span but longer by moving the rim point and keeping the original point the same. CPU 16 may determine extended span 132 by subtracting rim point from the origin to determine a ray, multiplying by a constant (e.g., 10), and then adding the value back to the origin value.

There may be various ways in which to determine texture map 56, and the following describes one example way in which to determine texture map 56. There may be other ways in which to determine texture map 56. Although the following techniques for compensating for the warping are described with respect to one example of texture map 56, the techniques are applicable for other ways in which to generate the texture map 56.

In the example texture map 56, each ring represents 5-degrees of field of view. The field of view of the center of texture map 56 is zero, and each ring is then 5-degrees more than the last one, with 90-degrees for the outermost ring (e.g., the rim), resulting in 18 rings. This 5-degree increment in the rings is the altitude angle. Also, each of the rings is divided into primitives based on an azimuth angle ranging from 0 to 360-degrees. In texture map 56, each span is separated by approximately 2-degrees (e.g., 1.94 or 2.05-degrees). Because the 360-degrees of azimuth angles are divided by 2-degree spans, there are approximately 180 spans or 180 rim line segments.

In this disclosure, the points after the texture coordinates are shifted vertically or horizontally due to the compensation for the tilt-angle (e.g., X-rotation) and pan-angle (e.g., Y-rotation) are referred to as shifted rim and shifted rim points. For instance, the outer rims in FIGS. 26 and 27 illustrate the shifted rim and shifted rim points of shifted texture map relative to the rim and rim points of the original texture map. Similar to rim segments, the line segments that connect two adjacent shifted rim points are referred to as shifted rim segments. To avoid confusion, original rim and original rim points refer to rim and rim points of texture map 56 before any modification of texture coordinates. Spans for the original rim and original rim points, such as spans 104A-104D, are referred to as original spans.

The term "intersected rim points," also called goal rim points, ideal rim points, or extrinsic calibration-applied rim points, are rim points where the extended original span intersects with the shifted rim. For instance, referring back to FIGS. 26 and 27, the original center 118 and original point (or original rim point) 122 in FIG. 27 refer to the rim point of texture map 56 before any modification of texture coordinates. Then, based on the X- and Y-rotations, CPU 16 may determine shifted texture coordinates based on the shifting of texture map 56 and a shifted span from the shifted center 120 that reaches the shifted rim point 124 at the point labeled as intersection point. If the span for the original span that reaches the original point 122 were extended, the extended span (e.g., like extended span 132) would intersect with the shifted rim at the intersection point 124, as illustrated in FIGS. 26 and 27.

In one example, CPU 16 may determine the original center point 118 (e.g., the center of texture map 56), and determine the shifted center point 120. For instance, CPU 16 may add the coordinates of the original center point to the first and second offsets, where the first offset is equal to horizontal TOPD value (e.g., first TOPD value) multiplied by pan-angle, and the second offset is equal to the vertical TOPD value (e.g., second TOPD value) multiplied by the tilt-angle to determine the shifted center point.

CPU 16 may determine the original rim points, which may be stored in texture coordinates buffer 52, and may be based on the coefficient of distortion, skew value, optical image center, and image width and height, in pixels. Based on the original rim points and the original center point, CPU 16 may determine extended original spans, similar to the example illustrated in FIG. 34. CPU 16 may repeat these operations to determine a plurality of extended original spans, one for each of the spans.

As part of generating the modified texture coordinates, CPU 16 may determine shifted texture coordinates for the original rim points to generate shifted rim points. CPU 16 may determine the intersection points based on the shifted rim points and the extended original spans. CPU 16 may determine the shifted rim segments based on the intersection points and the shifted rim points.

CPU 16 may determine new angles between the spans based on the shifted center and the intersection rim points determined above. For example, original spans connect to the original center with original rim points, and shifted spans connect to the shifted center with shifted rim points. CPU 16 may determine new spans, and hence, new angles between spans based on the connection between the shifted center point and the intersection points.

To determine the new spans, and new angles, CPU 16 may determine an angle between two rays. The first ray is 1, 0, 0, which is a horizontal ray, facing right. The second ray is the subtraction of an intersected rim point from the shifted center. To calculate the angle between the two rays, CPU 16 may perform the vector dot product. The result is a new texture map generated from the modified texture coordinates, that were modified by shifting the texture coordinates of texture map 56. In this way, CPU 16 may further modify the modified texture coordinates to generate further modified texture coordinates that GPU 18 uses to map image content onto a mesh model to generate textured images. The result of the further modified texture coordinates may be that in the new texture map, certain portions are squeezed and other portions are spread out, and when the squeezed and spread out portions are used for mapping, the resulting textured image may not include the warping caused by the shifting of the texture coordinates of the texture primitives of texture map 56.

Figure 35:
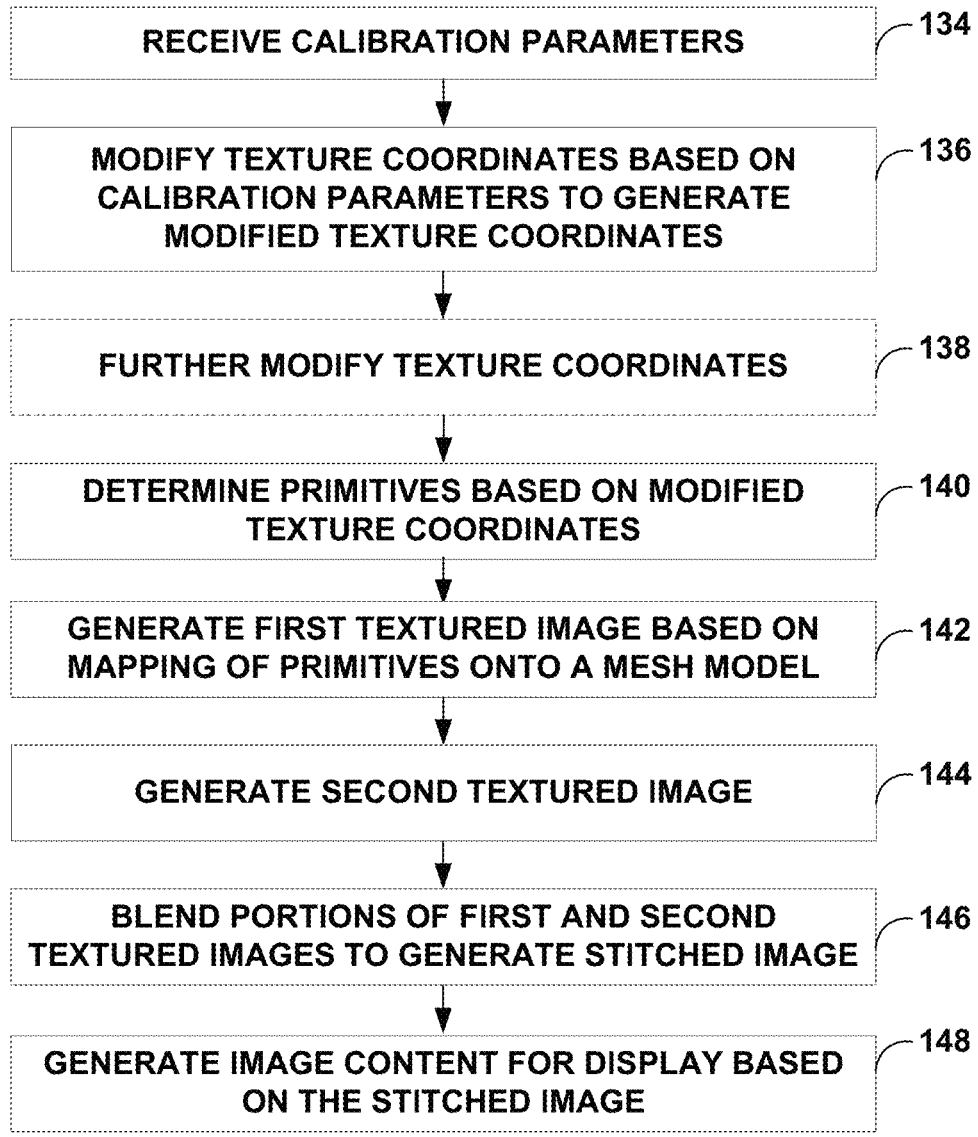
FIG. 35 is a flowchart illustrating an example method of operation according to one or more example techniques described in this disclosure.

FIG. 35 is a flowchart illustrating an example method of operation according to one or more example techniques described in this disclosure. As illustrated, processing circuitry (e.g., CPU 16) may receive calibration parameters of a camera (134). The camera is one of two or more cameras, and the calibration parameters are indicative of a position or rotation of at least one of the camera or sensor of the camera. The calibration parameters may be predetermined during manufacturing and stored in system memory 30. As one example, the camera may be a first camera, and the calibration parameters may include one or more of a pan-angle, tilt-angle, roll-angle, or shift of the first camera relative to a second camera.

The processing circuitry (e.g., CPU 16) may modify texture coordinates of texture primitives based on the calibration parameters to generate modified texture coordinates (136). There may be various ways in which CPU 16 may modify texture coordinates based on the calibration parameters to generate modified texture coordinates.

As one example, to modify the texture coordinates, the processing circuitry may rotate texture coordinates of texture primitives arranged as concentric rings in texture map 56 around a center of the texture map based on a roll-angle of the calibration parameters, as described above with respect to FIG. 22, to generate the modified texture coordinates. For example, the processing circuitry may determine u' and v', where u'=u*cos(Z-rotation parameter)−v*sin(Z-rotation parameter), and v'=u*cos(Z-rotation parameter)+v*sin(Z-rotation parameter). In this example, (u', v') are the modified texture coordinates for the texture coordinate (u, v). CPU 16 may perform the above operations to determine the modified texture coordinates for the texture primitives of texture map 56.

As another example, to modify the texture coordinates, the processing circuitry may shift texture coordinates of texture primitives arranged as concentric rings in texture map 56 based on a pan-angle of the calibration parameters. For instance, the processing circuitry may determine a different between coordinates of two points on texture map 56 at two different angles (e.g., altitude of 90-degrees and 85-degrees) and azimuth of 90-degrees. The processing circuitry may determine a first texture offset per degree (TOPD) value based on the difference, and determine a first offset based on the first TOPD value and the roll-angle (e.g., first offset=(first TOPD value)*(pan-angle)). The processing circuitry may add the first offset to the texture coordinates (e.g., u-coordinate) of the texture primitives to generate the modified texture coordinates.

As another example, to modify the texture coordinates, the processing circuitry may shift texture coordinates of texture primitives arranged as concentric rings in texture map 56 based on a tilt-angle of the calibration parameters. For instance, the processing circuitry may determine a difference between coordinates of two points on texture map 56 at two different angles (e.g., altitude of 90-degrees and 85-degrees) and azimuth of 0-degrees. The processing circuitry may determine a second TOPD value based on the difference, and determine a second offset based on the second TOPD value and the pitch-angle (e.g., second offset=(second TOPD value)*(tilt-angle)). The processing circuitry may add the second offset to the texture coordinates (e.g., v-coordinate) of the texture primitives to generate the modified texture coordinates.

It may not be necessary for the processing circuitry to both rotate and shift the texture coordinates to generate the modified texture coordinates. In some examples, the processing circuitry may rotate the texture coordinates or shift the texture coordinates. As one example, the processing circuitry may only rotate the texture coordinates, and then GPU 18, which may be part of the processing circuit, may use the rotated texture coordinates for mapping a first image. The processing circuitry may then only shift the texture coordinates, and GPU 18 may use the shifted texture coordinates for mapping a second image.

In some examples, as indicated by the dashed lines, the processing circuitry may optionally further modify the modified texture coordinates to generate further modified texture coordinates (138). The further modification may be to compensate for warping that may occur from the shifting the texture coordinates. In this disclosure, the modifying and further modifying may be done in the same process or done sequentially. Therefore, further modifying should not be considered as limiting the techniques to requiring a sequential process of first modifying the texture coordinates and then further modifying, but such sequential process is possible.

One example way to perform the further modification is by the processing circuitry determining an intersection point between a line (e.g., span) formed from the texture coordinates without modification and a line (e.g., span) formed from the modified texture coordinates. The processing circuitry may determine a shifted center based on the intersection point, and may further modify the modified texture coordinates based on the shifted center and the intersection point to generate further modified texture coordinates.

The processing circuitry may determine primitives in a first image captured by the camera based on the modified texture coordinates (140). In this example, the modified texture coordinates refer to the modified texture coordinates without further modification or the further modified texture coordinates based on whether the process for generating the further modified texture coordinates is performed by the processing circuit. One example of the first image is the circular image generated by a camera processor that receives image content information form the sensor of the camera, but other types of images are possible. For example, each of the modified texture coordinates for the texture primitives corresponds to a pixel on the circular image, and the texture primitives correspond to image content of the circular image, and thus form primitives in the circular image.

GPU 18, which is part of the processing circuit, may generate a first textured image based on mapping of the primitives in the image onto a mesh model (142). The mapping of primitives in the image may generate a rectangular image, but other types of images are possible, such as a sub-sphere.

In addition to the first textured image, GPU 18 may also generate a second textured image (144). If GPU 18 generated the first textured image based on a first circular image, then GPU 18 may generate the second textured image based on a second circular image. In one examples, GPU 18 may generate the second textured image based on the texture coordinates for the texture primitives without modification. For example, the texture primitives without modification may define primitives in the second image.

In one example, GPU 18 may generate the second textured image based on a set of modified texture coordinates. For example, the modified texture coordinates that GPU 18 used for generating the first textured image may be a first set of modified texture coordinates, and the primitives in the first image may be a first set of primitives. CPU 16 may modify texture coordinates of texture primitives based on the calibration parameters to generate a second set of modified texture coordinates. CPU 16 may determine a second set of primitives in a second image based on the second set of modified texture coordinates, and GPU 18 may generate the second textured image based on mapping of the second set of primitives in the second image onto the mesh model.

For instance, CPU 16 may rotate the texture coordinates to generate rotated texture coordinates, which may be one example of the first set of modified texture coordinates. GPU 18 may use the first set of modified texture coordinates to map image content of the first image onto the mesh model to generate the first textured image. CPU 16 may shift the texture coordinates to generate shifted texture coordinates, which may be one example of the second set of modified texture coordinates. GPU 18 may use the second set of modified texture coordinates to map image content of the second image onto the mesh model to generate the second textured image.

GPU 18 may blend a portion of the first textured image with a portion of the second textured image to generate a stitched image (146). GPU 18 may then generate image content for display based on the stitched image (148).

Figure 36:
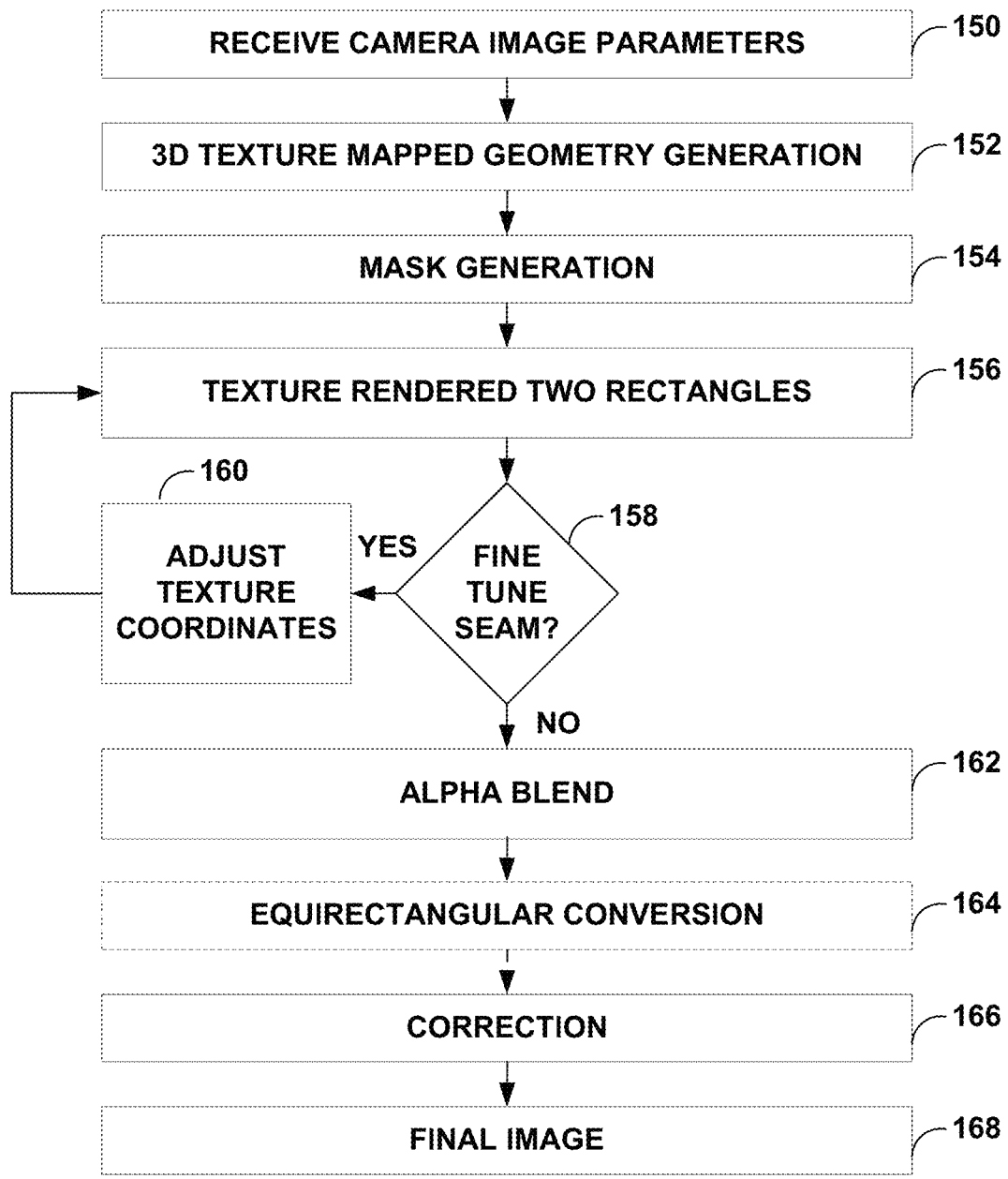
FIG. 36 is a flowchart illustrating an example method of operation according to one or more example techniques described in this disclosure.

FIG. 36 is a flowchart illustrating an example method of operation according to one or more example techniques described in this disclosure. CPU 16 (e.g., via camera processor 14) may receive camera image parameters (150). The camera image parameters may be information such as a number of pixels in image, the center point of the images, and other such information. The information may be available in a table that CPU 16 accesses. The camera image parameters need not always be available.

CPU 16 may perform operations for 3D texture mapped geometry generation (152). For example, CPU 16 may generate the texture coordinates, vertex position, and connectivity information that are to be used by GPU 18 for the texture mapping. As an example, CPU 16 may generate a first set of vertex coordinates for a first rectangular mesh model, and generate a second set of vertex coordinates for a second rectangular mesh model. As described above, one example way to generate the first and second sets of vertex coordinates is that application 34 defines the primitives for a 3D mesh model and stores the vertex coordinates in vertex coordinates buffer 46.

In addition to the 3D mesh model, CPU 16 may generate the texture map and store the texture coordinates for the texture map in texture coordinates buffer 52. In some examples, the texture map and its texture coordinates for the texture primitives may be pre-stored in texture coordinates buffer 52. In other examples, CPU 16 may utilize the camera image parameters information, if available, to determine the texture coordinates for the texture primitives for storage in texture coordinates buffer 52. The texture coordinates may be based on vertices of primitives that form a pattern of concentric circles. In some examples, a width of one or more outer rings of the concentric circles is less than a width of other circles of the concentric circles.

Furthermore, CPU 16 may be configured to modify the texture coordinates for the texture map based on rotation along the x-axis, y-axis, and/or z-axis of lenses 12A and 12B relative to one another. CPU 16 may also spread the radial lines in the direction of shift to address other unwanted artifacts form the modifying of the texture coordinates.

As one example, CPU 16 may determine texture coordinates of texture primitives that form a pattern of concentric circles (e.g., such as those illustrated in FIG. 5 or 8). CPU 16 may also determine rotation of a camera, the camera being one of a plurality of cameras, along at least one rotational axis (e.g., based on calibration data). For instance, CPU 16 may determine a Z-rotation having a roll angle for the camera, an X-rotation having a tilt angle for the camera, or a Y-rotation having a pan angle for the camera. The example rotations may be relative to a fixed ideal orientation, or relative to the other camera.

CPU 16 may modify the texture coordinates based on the rotation of the camera. As one example, for Z-rotation, CPU 16 may rotate the texture coordinates around a center coordinate based on the yaw angle to generate the modified texture coordinates. As another example, for X-rotation, CPU 16 may determine a difference between two of the texture coordinates (e.g., U1-U2 or V1-V2, described above), and determine a texture offset per degree based on the difference (e.g., divide the difference by 5). CPU 16 may determine an offset based on the texture offset per degree and the tilt angle (e.g., multiply Rotation X (tilt angle) with the texture offset per degree). CPU 16 may add the offset to the texture coordinates to generate the modified texture coordinates (e.g., add results to all U,V values). CPU 16 may perform similar operations for Y-rotation but with the pan angle (e.g., pan angle) instead of the tilt angle. Also, where there is rotation along two or more of X, Y, and Z, CPU 16 may perform a combination of the above to generate the modified texture coordinates.

In some examples, such as illustrated in FIGS. 26 and 27, further modifying of the modified texture coordinates may be needed. For example, CPU 16 may determine an intersection point between a line formed from texture coordinates and a line formed from the modified texture coordinates (e.g., as illustrated in FIG. 26). CPU 16 may determine a shifted center based on the intersection point, and further modify the modified texture coordinates based on the shifted center and the intersection point.

CPU 16 may also generate mask texture 54 and store mask texture 54 in system memory 30 (154). For example, application 34 or another application called by operating system 39 may generate and store mask texture 54 in system memory 30.

GPU 18 may textured render the two rectangles (156). For example, GPU 18 may perform the texture mapping to overlay the images from lenses 12A and 12B based on texture coordinates illustrated in FIG. 5, and GPU 18 may perform mask mapping to generate the mask that indicates the percentage of the video content that is to be included when blending between the overlapping image content of the two portions.

As an example, controller 40 may receive an instruction of a plurality of instructions from application 34 (e.g., via graphics API 36 and GPU driver 38) to retrieve a first set of vertex coordinates for a first rectangular mesh model. In response, controller 40 may receive the first set of vertex coordinates from vertex coordinates buffer 46.

Controller 40 may also receive instructions from application 34 to cause shader core 42 to execute a vertex shader, and in response, the programmable circuitry of shader core 42 executes the vertex shader for processing the first set of vertex coordinates. Part of the instructions to process the first set of vertex coordinates includes the coordinates of a primitive of the first mesh model and corresponding texture coordinates from texture coordinates buffer 52 for a corresponding texture primitive. This corresponding texture primitive may be a primitive within first circular image 48.

For example, shader core 42 may execute instructions, issued by application 34, that cause GPU 18 to load the texture primitive from first circular image 48 based on the texture coordinates retrieved from texture coordinates buffer 52. A texture hardware circuit (e.g., one of fixed-function units 44) may overlay the loaded texture primitive on top of the primitive of the first rectangular mesh model defined by vertex coordinates of the first set of vertex coordinates. Shader core 42 and the texture hardware circuit may repeat these operations for different primitives of the first 3D mesh model to overlay a first image (e.g., first circular image 48) based on the first set of vertex coordinates to generate a first rectangular image. Accordingly, GPU 18 may overlay first primitives, arranged as first concentric circles, in a first circular image onto a first mesh model to generate a first rectangular image.

In this way, shader core 42 may receive a first set of texture coordinates that correspond to the first set of vertex coordinates for the first 3D mesh model, where the first set of texture coordinates are coordinates of pixels within a first image (e.g., first circular image 48). To overlay the first image on the first rectangular mesh model based on first set of vertex coordinates, the texture hardware circuit may texture map the first circular image 48 on the first rectangular mesh model based on the first set of texture coordinates. CPU 16 may have generated the first set of texture coordinates based on vertices of primitives that form a pattern of concentric circles, where a width of one or more outer rings of the concentric circles is less than a width of other circles of the concentric circles. The mapping of vertices of primitives in the one or more outer circles of the concentric circles to vertices in the first set of vertex coordinates for the first rectangular mesh model causes image content in the first image (e.g., first circular image 48) that corresponds to the one or more outer rings to be stretched.

Controller 40 may receive an instruction of a plurality of instructions from application 34 (e.g., via graphics API 36 and GPU driver 38) to retrieve a second set of vertex coordinates for a second rectangular mesh model. In response, controller 40 may receive the second set of vertex coordinates from vertex coordinates buffer 46.

Controller 40 may also receive instructions from application 34 to cause shader core 42 to execute a vertex shader, and in response, the programmable circuitry of shader core 42 executes the vertex shader for processing the second set of vertex coordinates. Part of the instructions to process the second set of vertex coordinates includes the coordinates of a primitive of the second mesh model and corresponding texture coordinates from texture coordinates buffer 52 for a corresponding texture primitive. This corresponding texture primitive may be primitive within second circular image 50.

For example, shader core 42 may execute instructions, issued by application 34, that cause GPU 18 to load the texture primitive from second circular image 50 based on the texture coordinates retrieved from texture coordinates buffer 52. A texture hardware circuit (e.g., one of fixed-function units 44) may overlay the loaded texture primitive on top of the primitive of the second rectangular mesh model defined by vertex coordinates of the second set of vertex coordinates. Shader core 42 and the texture hardware circuit may repeat these operations for different primitives of the second rectangular mesh model to overlay a second image (e.g., second circular image 50) based on the second set of vertex coordinates to generate a second rectangular image. Accordingly, GPU 18 may overlay second primitives, arranged as second concentric circles, in a second circular image onto a second mesh model to generate a second rectangular image.

In this way, shader core 42 may receive a second set of texture coordinates that correspond to the second set of vertex coordinates for the second rectangular mesh model, where the second set of texture coordinates are coordinates of pixels within a second image (e.g., second circular image 50). To overlay the second image on the second rectangular mesh model based on second set of vertex coordinates, the texture hardware circuit may texture map the second circular image 50 on the second rectangular mesh model based on the second set of texture coordinates. CPU 16 may have generated the second set of texture coordinates based on vertices of primitives that form a pattern of concentric circles, where a width of one or more outer circles of the concentric circles is less than a width of other rings of the concentric circles. The mapping of vertices of primitives in the one or more outer circles of the concentric circles to vertices in the first set of vertex coordinates for the second rectangular mesh model causes image content in the second image (e.g., second circular image 50) that corresponds to the one or more outer circles to be stretched.

GPU 18 may render the first portion and the second portion to generate a first rendered portion and a second rendered portion. As part of the rendering, GPU 18 may convert the 3D pixel coordinates into 2D screen coordinates, and execute a pixel shader to determine color values for each of the pixels on display 28 based on the overlapping image content to generate the sphere of image content.

GPU 18 may determine if there is need to fine tune the seam (158). For instance, fine tuning the seam may be a quality control. Given 3D render camera look direction, GPU 18 may determine if the two portions are both visible. If so, GPU 18 may determine the area of overlap, which is narrow. For example, the area of overlap may be pixels in the first and second rendered portions having the same <x,y> coordinates. GPU 18 may compute a metric to determine the similarity between the two overlapping rendered pixels (e.g., sum of absolute differences or maxim of absolute differences). If similar, GPU 18 may determine and in some examples output "Quality Accepted," else "Quality Not Accepted." Because the overlap area is narrow, the computation time may be relatively fast, possibly at real-time speeds.

If the quality is accepted, GPU 18 may perform alpha blending (162) (NO of 158). For example, the blender circuit of GPU 18 may scale the pixels of the first and second reference portions based on the respective opacity values determined from the texture mapping of mask texture 54. GPU 18 may then add the two pixel values together or perform some other blending technique to generate blended pixel values for the overlapping image content in the first and second rendered portions. In this way, GPU 18 may generate a sphere of image content based at least in part on blending the first and second rendered portions based on the overlapping image content.

If, however, the quality is not accepted, there may be a visual seam. If there is a visual seam, the texture coordinates of one or more both portions may be adjusted by CPU 16 by warping them (160) (YES of 158). The warping may be done by CPU 16 by leveraging GPU/OpenGL rendering using texture coordinates. By shifting, rotating and/or scaling the appropriate texture coordinates, adjustments can be made. Once an adjustment is made (via guessing within a range), the image can be sent back for textured rendering (156) and to determine whether to fine tune for further analysis (158). The removal of the seam need not necessarily be complete since the blending mask hides many of the seams. A seam of a few pixels is not very noticeable to the human eye, depending on the image content.

Accordingly, in some examples, GPU 18 (e.g., ALUs or EFUs of GPU 18) may determine a similarity between the overlapping image content. CPU 16 may adjust at least one of the first set of texture coordinates or the second set of texture coordinates. In such examples, GPU 18 may texture map the first image on the first rectangular mesh model based on an adjusted first set of texture coordinates in response to the first set of texture coordinates being adjusted, or GPU 18 may texture map the second image on the second rectangular mesh model based on the adjusted second set of texture coordinates in response to the second set of texture coordinates being adjusted.

For the first algorithm, the blended image may be an intermediate image. GPU 18 may convert the intermediate image to an equirectangular image (164). For example, GPU 18 may textured render the intermediate image onto a third mesh that is specifically calculated to have vertices that are 90-degrees rotated relative to corresponding vertices in the intermediate image. The result may be an equirectangular image.

For the second algorithm, the first and second generated rectangular images may be equirectangular images. Therefore, after blending, the result may be that the blended image is an equirectangular image. For this example, the equirectangular conversion may not be needed. The third algorithm may be similar to the first or second algorithms but without uniformly spaced primitives.

For the first, second, and third algorithms, after generating the equirectangular image, GPU 18 may execute instances of a pixel shader to correct for portions of the image having visual artifacts (166). For example, the portions that will include visual artifacts may be determined ahead based on test images, and GPU 18 may correct for visual artifacts in those portions. In some examples, rather than performing the correction on the equirectangular image, GPU 18 may execute pixel shaders on the first and second generated images to correct for visual artifacts. The result may be the final image that is stored in memory 30 or outputted for later display (168).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating image content, the method comprising:
   receiving calibration parameters of a first camera, wherein the first camera is one of two or more cameras, and the calibration parameters are indicative of a position or rotation of at least one of the first camera or a sensor of the first camera relative to a second camera or a sensor of the second camera;
   modifying texture coordinates of texture primitives arranged as concentric rings in a texture map based on the calibration parameters to generate modified texture coordinates, wherein modifying the texture coordinates comprises at least one of rotating or shifting the texture coordinates;
   determining primitives in an image captured by the first camera based on the modified texture coordinates; and
   generating a textured image based on a mapping of the primitives in the image onto a mesh model.

2. The method of claim 1, wherein the calibration parameters comprise one or more of a pan-angle, tilt-angle, roll-angle, or shift of the first camera relative to the second camera.

3. The method of claim 1, wherein the textured image comprises a first textured image, the method further comprising:
   blending a portion of the first textured image with a portion of a second textured image to generate a stitched image; and
   generating image content for display based on the stitched image.

4. The method of claim 3, further comprising:
generating the second textured image based on the texture coordinates of the texture primitives without modification of the texture coordinates.

5. The method of claim 3, wherein the image comprises a first image, wherein the primitives comprise a first set of primitives, and wherein the modified texture coordinates comprise a first set of modified texture coordinates, the method further comprising:
modifying the texture coordinates of the texture primitives based on the calibration parameters of the first camera to generate a second set of modified texture coordinates;
determining a second set of primitives in a second image based on the second set of modified texture coordinates; and
generating the second textured image based on mapping of the second set of primitives in the second image onto the mesh model.

6. The method of claim 1, wherein modifying the texture coordinates comprises rotating the texture coordinates around a center of the texture map based on a roll-angle of the calibration parameters.

7. The method of claim 1, wherein modifying the texture coordinates comprises shifting the texture coordinates based on a tilt-angle of the calibration parameters.

8. The method of claim 7, wherein shifting the texture coordinates comprises:
determining a difference between coordinates of two points on the texture map at two different angles on the texture map;
determining a texture offset per degree based on the difference;
determining an offset based on the texture offset per degree and the tilt-angle; and
adding the offset to the texture coordinates of the texture primitives to generate the modified texture coordinates.

9. The method of claim 1, wherein modifying the texture coordinates comprises shifting the texture coordinates based on a pan-angle of the calibration parameters.

10. The method of claim 9, wherein shifting the texture coordinates:
determining a difference between coordinates of two points on the texture map at two different angles on the texture map;
determining a texture offset per degree based on the difference;
determining an offset based on the texture offset per degree and the pan-angle; and
adding the offset to the texture coordinates of the texture primitives to generate the modified texture coordinates.

11. The method of claim 1, further comprising:
determining an intersection point between a line formed from the texture coordinates without modification and a line formed from the modified texture coordinates;
determining a shifted center based on the intersection point; and
further modifying the modified texture coordinates based on the shifted center and the intersection point to generate further modified texture coordinates,
wherein determining primitives in the image comprises determining primitives in the image based on the further modified texture coordinates.

12. A device for generating image content, the device comprising:
a memory configured to store calibration parameters of a first camera and an image captured by the first camera; and
processing circuitry configured to:
receive the calibration parameters of the first camera from the memory, wherein the first camera is one of two or more cameras, and the calibration parameters are indicative of a position or rotation of at least one of the first camera or a sensor of the first camera relative to a second camera or a sensor of the second camera;
modify texture coordinates of texture primitives arranged as concentric rings in a texture map based on the calibration parameters to generate modified texture coordinates, wherein to modify the texture coordinates, the processing circuitry is configured to at least one of rotate or shift the texture coordinates;
determine primitives in the image captured by the first camera based on the modified texture coordinates; and
generate a textured image based on a mapping of the primitives in the image onto a mesh model.

13. The device of claim 12, wherein the calibration parameters comprise one or more of a pan-angle, tilt-angle, roll-angle, or shift of the first camera relative to the second camera.

14. The device of claim 12, wherein the textured image comprises a first textured image, and wherein the processing circuitry is configured to:
blend a portion of the first textured image with a portion of a second textured image to generate a stitched image; and
generate image content for display based on the stitched image.

15. The device of claim 14, wherein the processing circuitry is configured to:
generate the second textured image based on the texture coordinates of the texture primitives without modification of the texture coordinates.

16. The device of claim 14, wherein the image comprises a first image, wherein the primitives comprise a first set of primitives, and wherein the modified texture coordinates comprise a first set of modified texture coordinates, and wherein the processing circuitry is configured to:
modify the texture coordinates of the texture primitives based on the calibration parameters of the first camera to generate a second set of modified texture coordinates;
determine a second set of primitives in a second image based on the second set of modified texture coordinates; and
generate the second textured image based on mapping of the second set of primitives in the second image onto the mesh model.

17. The device of claim 12, wherein to modify texture coordinates, the processing circuitry is configured to rotate the texture coordinates around a center of the texture map based on a roll-angle of the calibration parameters.

18. The device of claim 12, wherein to modify texture coordinates, the processing circuitry is configured to shift the texture coordinates based on a tilt-angle of the calibration parameters.

19. The device of claim 18, wherein to shift the texture coordinates, the processing circuitry is configured to:
determine a difference between coordinates of two points on the texture map at two different angles on the texture map;

determine a texture offset per degree based on the difference;
determine an offset based on the texture offset per degree and the tilt-angle; and
add the offset to the texture coordinates of the texture primitives to generate the modified texture coordinates.

20. The device of claim 12, wherein to modify texture coordinates, the processing circuitry is configured to shift the texture based on a pan-angle of the calibration parameters.

21. The device of claim 20, wherein to shift texture coordinates of texture primitives, the processing circuitry is configured to:
determine a difference between coordinates of two points on the texture map at two different angles on the texture map;
determine a texture offset per degree based on the difference;
determine an offset based on the texture offset per degree and the pan-angle; and
add the offset to the texture coordinates of the texture primitives to generate the modified texture coordinates.

22. The device of claim 12, wherein the processing circuitry is configured to:
determine an intersection point between a line formed from the texture coordinates without modification and a line formed from the modified texture coordinates;
determine a shifted center based on the intersection point; and
further modify the modified texture coordinates based on the shifted center and the intersection point to generate further modified texture coordinates,
wherein to determine primitives in the image, the processing circuitry is configured to determine primitives in the image based on the further modified texture coordinates.

23. A device for generating image content, the device comprising:
means for receiving calibration parameters of a first camera, wherein the first camera is one of two or more cameras, and the calibration parameters are indicative of a position or rotation of at least one of the first camera or a sensor of the first camera relative to a second camera or a sensor of the second camera;
means for modifying texture coordinates of texture primitives arranged as concentric rings in a texture map based on the calibration parameters to generate modified texture coordinates, wherein the means for modifying the texture coordinates comprises at least one of means for rotating or means for shifting the texture coordinates;
means for determining primitives in an image captured by the first camera based on the modified texture coordinates; and
means for generating a textured image based on a mapping of the primitives in the image onto a mesh model.

24. The device of claim 23, wherein the calibration parameters comprise one or more of a pan-angle, tilt-angle, roll-angle, or shift of the first camera relative to the second camera.

25. The device of claim 23, wherein the means for modifying texture coordinates comprises means for shifting the texture coordinates based on a tilt-angle and a pan-angle of the calibration parameters.

26. The device of claim 23, further comprising:
means for determining an intersection point between a line formed from the texture coordinates without modification and a line formed from the modified texture coordinates;
means for determining a shifted center based on the intersection point; and
means for further modifying the modified texture coordinates based on the shifted center and the intersection point to generate further modified texture coordinates,
wherein the means for determining primitives in the image comprises means for determining primitives in the image based on the further modified texture coordinates.

27. A non-transitory computer-readable storage medium storing instructions that when executed cause one or more processors to:
receive calibration parameters of a first camera, wherein the first camera is one of two or more cameras, and the calibration parameters are indicative of a position or rotation of at least one of the first camera or a sensor of the first camera relative to a second camera or a sensor of the second camera;
modify texture coordinates of texture primitives arranged as concentric rings in a texture map based on the calibration parameters to generate modified texture coordinates, wherein the instructions that cause the one or more processors to modify the texture coordinates comprise at least one of instructions that cause the one or more processors to rotate or shift the texture coordinates;
determine primitives in an image captured by the first camera based on the modified texture coordinates; and
generate a textured image based on a mapping of the primitives in the image onto a mesh model.

28. The non-transitory computer-readable storage medium of claim 27, wherein the calibration parameters comprise one or more of a pan-angle, tilt-angle, roll-angle, or shift of the first camera relative to the second camera.

29. The non-transitory computer-readable storage medium of claim 27, wherein the instructions that cause the one or more processors to modify texture coordinates comprise instructions that cause the one or more processors to shift the texture coordinates based on a tilt-angle and a pan-angle of the calibration parameters.

30. The non-transitory computer-readable storage medium of claim 27, further comprising instructions that cause the one or more processors to:
determine an intersection point between a line formed from the texture coordinates without modification and a line formed from the modified texture coordinates;
determine a shifted center based on the intersection point; and
further modify the modified texture coordinates based on the shifted center and the intersection point to generate further modified texture coordinates,
wherein the instructions that cause the one or more processors to determine primitives in the image comprise instructions that cause the one or more processors to determine primitives in the image based on the further modified texture coordinates.

* * * * *